(12) United States Patent
Jennings et al.

(10) Patent No.: US 11,467,329 B2
(45) Date of Patent: Oct. 11, 2022

(54) OPTICAL FILM DEVICE

(71) Applicant: 3M INNOVATIVE PROPERTIES COMPANY, St. Paul, MN (US)

(72) Inventors: Robert M. Jennings, Shoreview, MN (US); Jo A. Etter, Kirkland, WA (US); Susan L. Kent, Shorewood, MN (US); Erin A. McDowell, Afton, MN (US); Timothy L. Wong, St. Paul, MN (US); Zhisheng Yun, Sammamish, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 172 days.

(21) Appl. No.: 15/733,257

(22) PCT Filed: Feb. 15, 2019

(86) PCT No.: PCT/IB2019/051262
§ 371 (c)(1),
(2) Date: Jun. 18, 2020

(87) PCT Pub. No.: WO2019/159139
PCT Pub. Date: Aug. 22, 2019

(65) Prior Publication Data
US 2020/0379154 A1 Dec. 3, 2020

Related U.S. Application Data

(60) Provisional application No. 62/632,033, filed on Feb. 19, 2018.

(51) Int. Cl.
*G02B 5/30* (2006.01)
*G02B 27/01* (2006.01)
(Continued)

(52) U.S. Cl.
CPC ............. *G02B 5/3033* (2013.01); *G02B 5/10* (2013.01); *G02B 5/3041* (2013.01);
(Continued)

(58) Field of Classification Search
CPC .. G02B 5/3033; G02B 5/3041; G02B 5/3066; G20B 5/10
(Continued)

(56) References Cited

U.S. PATENT DOCUMENTS 5,220,359 A * 6/1993 Roffman ................. G02C 7/02
351/159.03
5,349,396 A 9/1994 Roffman
(Continued)

FOREIGN PATENT DOCUMENTS

EP 0971166 1/2000
WO WO 2017-039714 3/2017
(Continued)

OTHER PUBLICATIONS

Azzam, "Ellipsometry and polarized light", North-Holland Pub. Co., 1977, Table of contents, 9pages.
(Continued)

*Primary Examiner* — Ricky D Shafer
(74) *Attorney, Agent, or Firm* — Robert S. Moshrefzadeh

(57) ABSTRACT

A reflective polarizing imaging lens includes at least one optical film having an active area that is curved in two orthogonal directions. Edges of the optical film are arranged to form seams between segments of the optical film in the active area of the reflective polarizing imaging lens.

18 Claims, 30 Drawing Sheets

(51) Int. Cl.
*G02B 5/10* (2006.01)
*G02B 3/00* (2006.01)

(52) U.S. Cl.
CPC ....... *G02B 5/3066* (2013.01); *G02B 27/0172* (2013.01); *G02B 2003/0093* (2013.01); *G02B 2027/013* (2013.01)

(58) Field of Classification Search
USPC .......................................... 359/483.1, 489.14
See application file for complete search history.

(56) References Cited

U.S. PATENT DOCUMENTS

| | | | |
|---|---|---|---|
| 6,046,859 | A | 4/2000 | Raj |
| 6,788,463 | B2 | 9/2004 | Merrill |
| 8,873,144 | B2 | 10/2014 | Davis |
| 8,894,797 | B2 | 11/2014 | He et al. |
| 9,551,818 | B2 | 1/2017 | Weber et al. |
| 9,581,827 | B1 | 2/2017 | Wong |
| 9,658,456 | B2 | 5/2017 | Wu |
| 9,835,777 | B2 * | 12/2017 | Ouderkirk ............ G02B 27/286 |
| 10,146,055 | B2 | 12/2018 | Ouderkirk |
| 2007/0177099 | A1 | 8/2007 | Begon |
| 2007/0273825 | A1 * | 11/2007 | Legerton ................ G02C 7/049 351/159.78 |
| 2008/0099128 | A1 | 5/2008 | Yamada et al. |
| 2010/0091236 | A1 | 4/2010 | Matera |
| 2012/0057123 | A1 * | 3/2012 | Mandler .................. G02C 7/02 351/159.74 |
| 2013/0004728 | A1 | 1/2013 | Boyd et al. |
| 2017/0068029 | A1 | 3/2017 | Yun |
| 2017/0139231 | A1 * | 5/2017 | Gerligand ............. G02C 7/028 |

FOREIGN PATENT DOCUMENTS

| | | |
|---|---|---|
| WO | WO 2017-040875 | 3/2017 |
| WO | WO 2017-213912 | 12/2017 |
| WO | WO 2017-213913 | 12/2017 |

OTHER PUBLICATIONS

Love, "A Treatise on the Mathematical Theory of Elasticity", Chapter XXIV, Dover Publications, 1927, Ed.04, pp. 515-519.
Adkins, "Large Elastic Deformations of Isotropic Materials, IX. The Deformation of Thin Shells", Phil. Trans. of the Royal Society A, 1948, vol. 240, pp. 505-531.
International Search report for PCT International Application No. PCT/IB2019/051262 dated May 21, 2019, 5 pages.
R. A. Chipman, "Polarimetry", in the Handbook of Optics, 2nd Ed, vol. II, McGraw-Hill Professional, 1995.

* cited by examiner

OPTICAL FILM DEVICE

BACKGROUND

Optical films having a three-dimensional dome-shaped surface can be particularly useful in a folded optics lens system. Folded optics systems can facilitate production of more compact and lighter virtual reality (VR) and augmented reality (AR) headsets. Flat displays such as cell phones are often used in VR and AR headsets. Images from these displays must be collimated and focused on the human eye. Some folded optics approaches make use of dome-shaped polarizing film lenses that alternatively reflect or transmit light depending on polarization state of the light. The lenses allow the flat display to be positioned closer to the eye and reduce the weight of the optics.

BRIEF SUMMARY

Some embodiments are directed to a device comprising at least one optical film with an active area having a surface that is curved in two orthogonal directions. The surface of the active area has a total curvature, C, greater than 0.1; there is at least one point, $p_0$, on the surface of the active area such that a surface normal direction at $p_0$ is parallel to a normal vector of a reference plane of the active area; each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and a difference between maximum and minimum linear polarization block axis orientation angles for all points, p, is less than 2 ln(1+12/π)*C degrees.

According to some embodiments, a device includes at least one optical film with an active area having a surface that is curved in two orthogonal directions. The surface of the active area has a total curvature, C, greater than 0.1; there is at least one point, $p_0$, on the surface of the active area such that a surface normal direction at $p_0$ is parallel to a normal vector of a reference plane of the active area; each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and a difference between maximum and minimum linear polarization pass axis orientation angles for all points, p, is less than 12.2*C degrees.

In accordance with some embodiments, a device includes at least one optical film having an active area that is curved in two orthogonal directions such that the active area has a total curvature, C, greater than 0.1. The active area has a minimum thickness, $t_{min}$, a maximum thickness, $t_{max}$, and an average thickness, $t_{ave}$. A variation in thickness, $(t_{max}-t_{min})/t_{ave}$ of the optical film in the active area is less than ln[1+(12/π)C]/20.

According to some embodiments, a device comprises at least one optical film having an active area that is curved in two orthogonal directions such that the active area has a total curvature, C, greater than 0.1. The active area has a minimum pass band edge, $\lambda_{Emin}$, a maximum pass band edge, $\lambda_{Emax}$, and an average pass band edge, $\lambda_{ave}$. A variation in upper pass band edge, $(\lambda_{Emax}-\lambda_{Emin})/\lambda_{Eave}$, in the active area is less than ln[1+(12/π)C]/20.

Some embodiments are directed to a device that includes at least one optical film having an active area that is curved along a first direction and along an orthogonal second direction. A portion of the active area has a sag to diameter ratio, S/D, greater than 0.025. There is at least one point, $p_0$, on the surface of the active area such that a surface normal direction at $p_0$ is parallel to a normal vector of a reference plane of the active area. Each point, p, on the surface of the active area has a linear polarization block axis orientation angle between a measured block axis tangent direction at p and a local reference tangent direction at p. The local reference tangent direction is coplanar with the normal vector of the reference plane and the measured block axis tangent direction at $p_0$. A maximum variation of linear polarization block axis angles for all points of the portion of the active area, $\beta_{max}-\beta_{min}$, is less than 22(S/D) degrees.

According to some embodiments, a device comprises at least one optical film having an active area that is curved along a first direction and along an orthogonal second direction. A portion of the active area has a sag to diameter ratio, S/D, greater than 0.025. There is at least one point, $p_0$, on the surface of the active area such that a surface normal direction at $p_0$ is parallel to a normal vector of a reference plane of the active area. Each point, p, on the surface of the active area has a linear polarization pass axis orientation angle between a measured pass axis tangent direction at p and a local reference tangent direction at p. The local reference tangent direction is coplanar with the normal vector of the reference plane and the measured pass axis tangent direction at $p_0$. A maximum variation of linear polarization pass axis angles for all points of the portion of the active area, $\alpha_{max}-\alpha_{min}$, is less than $550(S/D)^2+3.5(S/D)$ degrees.

In some embodiments, a device comprises at least one optical film having an active area that is curved along a first direction and along an orthogonal second direction. A portion of the active area has a sag to diameter ratio, S/D, greater than 0.025. The optical film in the portion of the active area has a minimum thickness, $t_{min}$, a maximum thickness, $t_{max}$, and an average thickness, $t_{ave}$. A variation in thickness, $(t_{max}-t_{min})/t_{ave}$ in the portion of the active area is less than ½*(S/D). The portion of the active area maps onto a largest circle inscribed within a boundary of a projection of the active area on a reference plane.

According to some embodiments, a device includes at least one optical film having an active area that is curved along a first direction and along an orthogonal second direction. A portion of the active area has a sag to diameter ratio, S/D, greater than 0.025. The optical film in the portion of the active area has a minimum pass band edge, $\lambda_{Emin}$, a maximum pass band edge, $\lambda_{Emax}$, and an average pass band edge, $\lambda_{ave}$. A variation in pass band edge, $(\lambda_{Emax}-\lambda_{Emin})/\lambda_{Eave}$, in the portion of the active area is less than ½*(S/D). The portion of the active area maps onto a largest circle inscribed within a boundary of a projection of the active area on a reference plane.

Some embodiments involve a reflective polarizing imaging lens that includes an optical film comprising a plurality of polymeric layers. Edges of the optical film are arranged to form one or more seams between segments of the optical film in an active area of the reflective polarizing imaging lens. According to some aspects, the active area is curved in two orthogonal directions.

Some embodiments are directed to a folded optical system. The system includes an image surface configured to emit an image, a stop surface having an exit pupil; and a reflective polarizer comprising an optical film as discussed in any of the preceding paragraphs disposed between the image surface and the stop surface.

Some embodiments involve a method of forming a reflective polarizing imaging lens. Segments of a reflective polarizer film are formed and are arranged to form seams between adjacent segments of the reflective polarizer film.

These and other aspects of the present application will be apparent from the description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Some embodiments disclosed herein are directed to optical films and to devices and systems that include optical films that are curved along one direction or curved along two orthogonal directions. In some embodiments, the curved optical films are curved reflective polarizing films that may be used in reflective polarizing devices such as reflective polarizing lenses (RPLs). The disclosed optical films can be employed in folded optical systems that provide virtual reality or augmented reality experiences, among other useful implementations. The optical films described herein can provide enhanced optical characteristics, such as decreased variation in block axis polarization angle, decreased variation in pass axis polarization angle, decreased variation in upper and/or lower pass band edges, and/or decreased variation in thickness, when compared to previous films.

Figure 1A:
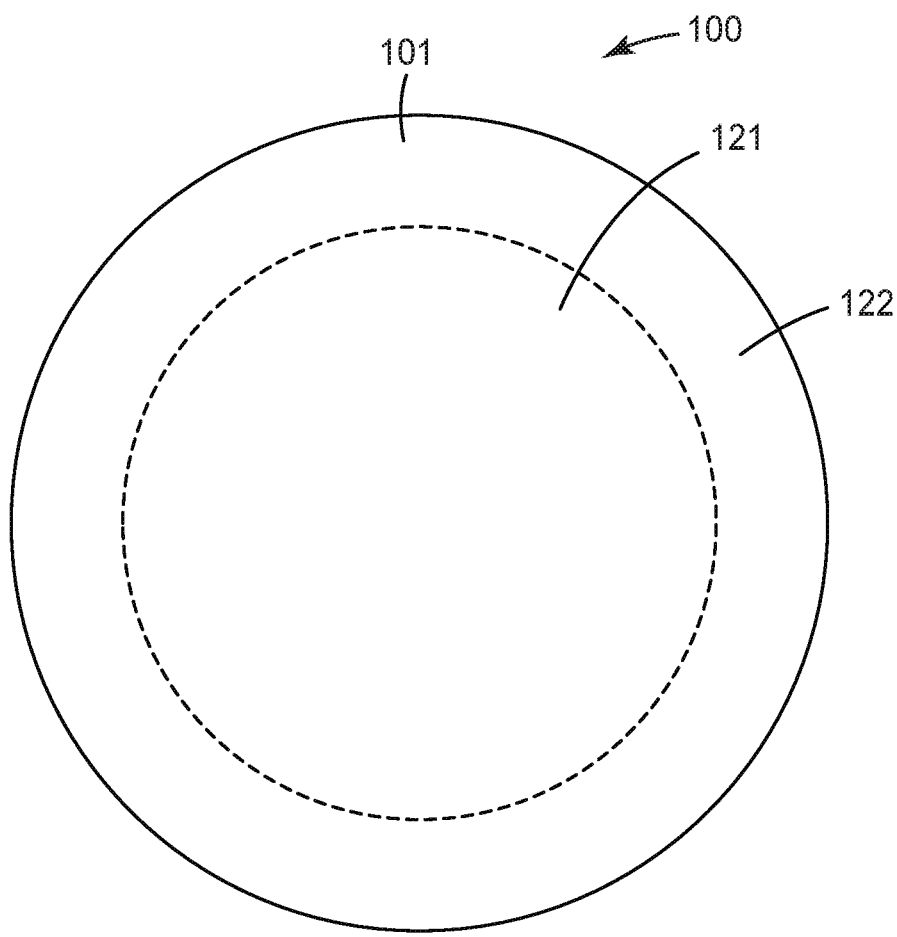
FIGS. 1A and 1B respectively depict schematic plan and cross sectional views of an optical film in accordance with some embodiments.
Figure 1B:
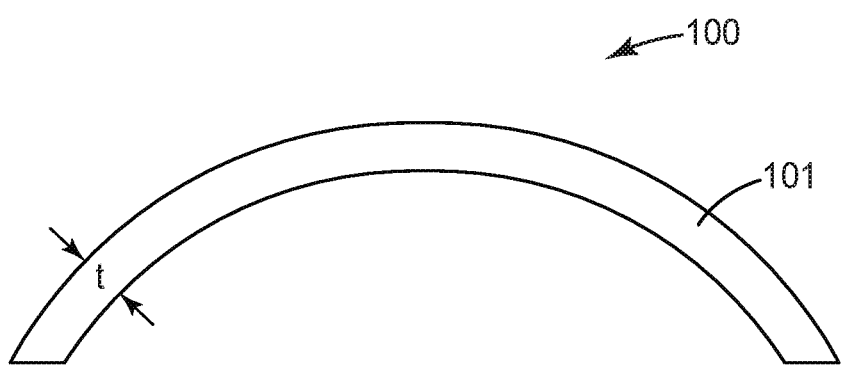

FIGS. 1A and 1B respectively depict schematic plan and cross sectional views of an device 100 in accordance with some embodiments. Although not shown in FIGS. 1A and 1B, the optical film 100 may comprise a single unitary piece of optical film and/or a number of discrete pieces of optical film. The segments of the optical film 100 may be arranged such that edges of the segments of optical film are adjacent. In some embodiments, the arrangement of segments may provide an optical film that is curved along at least one direction or is curved along two orthogonal directions. In some embodiments the arrangement of the segments provides an optical film that is in the form of a flat sheet.

In some implementations, the optical film 100 comprises a multi-layer optical film having a plurality of alternating polymeric interference layers that provide high contrast. Alternatively, the optical film may comprise a wire grid film, for example. Although the shape of the optical film 100 is depicted in FIGS. 1A and 1B as substantially spherical (circular in cross section), the approaches discussed herein apply generally to optical films having any shape in plan view and/or in cross section.

The optical film 100 has a thickness, t, as indicated in FIG. 1B. The active area 101 of the optical film is the area of the optical film 100 that reflects and/or transmits light for use in a folded optics imaging system. The active area may be the clear aperture of the optical film. In contrast, an inactive area of the optical film might be present to aid in lens mounting or other mechanical needs. There may be a different active area for reflected light compared to an active area for transmitted light. The optical film may include one or more inactive areas (not shown in FIGS. 1a and 1B) in addition to the active area 101. The active area 101 can be divided into central 121 and peripheral regions 122. According to some embodiments, the central region 121 of the active area is any portion of the optical film in a field of view that that is within "easy eye rotation range" which is about 20 degrees in any direction from a forward gaze (40 degree cone angle). According to some embodiments, the central region of the active area is about ⅓ of the active area which is closest to the optical axis of the optical film. According to some embodiments, the peripheral region 122 of the active area refers to about ⅓ of the active area that is farthest from the optical axis of the optical film.

The surface of the active area 101 of the optical film 100 is curved along two orthogonal axes and can be character- ized by a total curvature of the active area. Each point on the surface of the active area 101 has a Gaussian curvature which is product of the maximum and minimum curvatures at the point. The Gaussian curvature at any point, p, on the surface of the film is expressed mathematically as $K = \kappa_{max} * \kappa_{min}$, wherein $\kappa_{max}$ is the maximum curvature at p and $\kappa_{min}$ is the minimum curvature at p. Alternatively stated, $$K = \frac{1}{R_{max}} \frac{1}{R_{min}}.$$

wherein $R_{max}$ is the maximum radius of curvature at point, p, and $R_{min}$ is the minimum radius of curvature at point p.

The total curvature, C, of the active area, A, of the active area is the surface integral of the Gaussian curvature over the active area:

$$C = \int \int_A \frac{1}{R_{max}} \frac{1}{R_{min}} dA. \tag{1}$$

The optical films described herein may be mirror films or reflective polarizers, for example. In some embodiments, each location over at least 80%, or over 85%, or over at least 90%, or over at least 95% of the active area of the optical film has a reflectance greater than about 80% for normally incident light having the same predetermined wavelength and the same first polarization state. A polarization state can be characterized by the direction of the electric field vector which for normally incident light defines an axis tangent to the optical film. In some embodiments, each location on the curved optical film has a maximum reflectance and a corresponding minimum transmittance for normally incident light polarized along a block axis, and a maximum transmittance for normally incident light polarized along an orthogonal pass axis. The normally incident light may have a predetermined wavelength (e.g., about 550 nm) or may have wavelengths in a predetermined wavelength range (e.g., 450 nm to 650 nm, 400 nm to 700 nm, 400 nm to 800 nm, or 400 nm to 1000 nm).

Figure 2A:
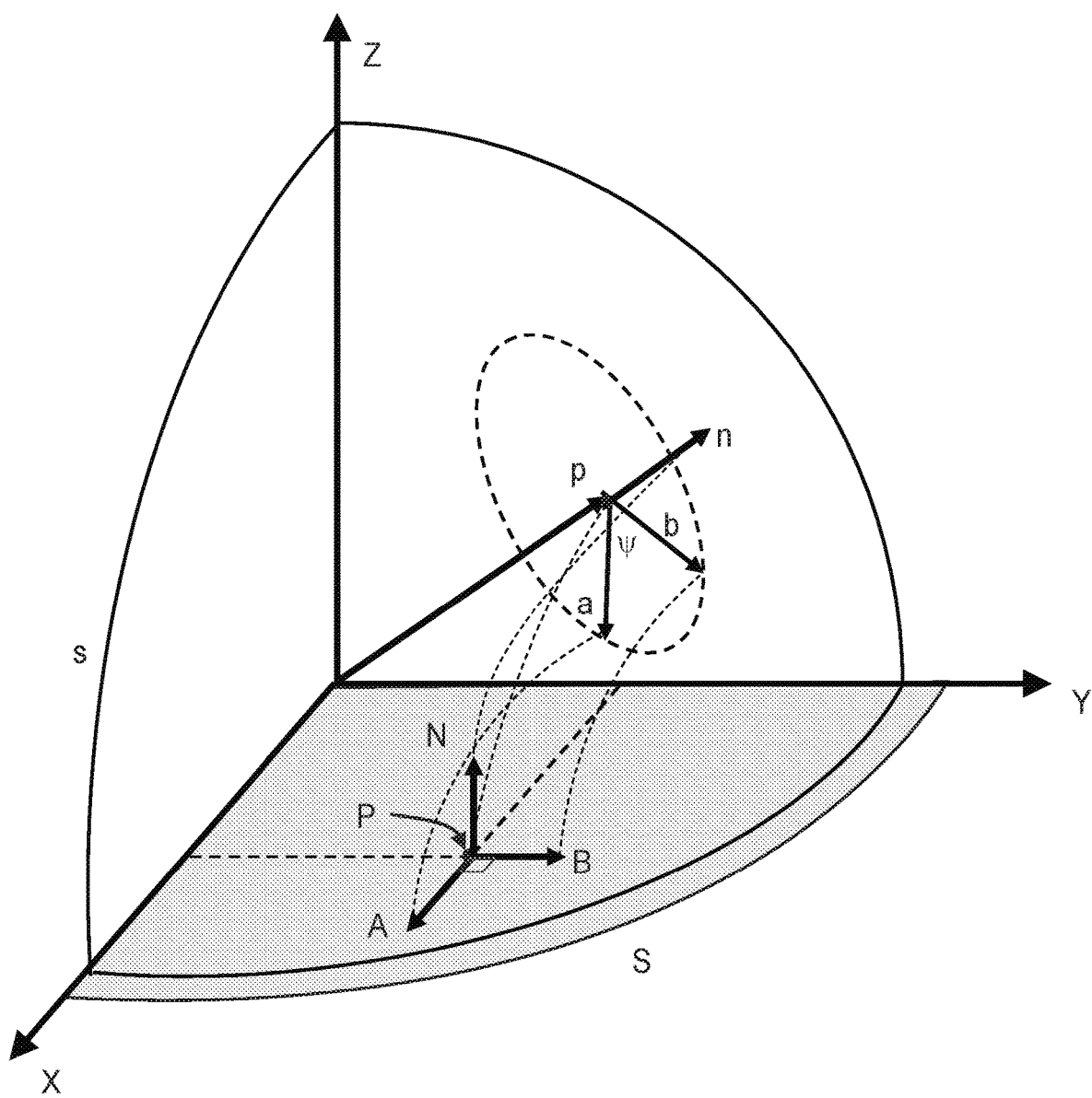
FIGS. 2A through 2C are diagrams illustrating how block and pass axis orientation angles for linear polarization can be measured.

The enhanced optical characteristics of the disclosed optical films, such as variation in the polarization block and pass axis orientations, can be maintained when the total curvature of the active area of the lens is relatively high. Consider a flat a piece of polarizing film with completely uniform optical properties over its entire surface. We will define the surface of that flat film as S and define a normal unit vector, N, orthogonal to the surface at a point P on S. We will also define two orthogonal surface tangent unit vectors, A and B laying parallel to the pass and block directions of the flat film respectively at P on S as shown in FIG. 2A. When S is deformed to conform to a new curved surface: s, the point, P, will move to a new location, p on s and our normal and tangent vectors will become three new vectors, n, a, and b respectively as shown in FIG. 2A. We will also define a Cartesian coordinate system on the lens with X, Y and Z axes parallel to the undeformed A, B and N axes respectively.

While the initial material vectors A, B, and N are mutually orthogonal, after forming, the deformed vectors, a, b and n may no longer be orthogonal except at points along particular planes of symmetry. The corresponding material pass and block axes however are always orthogonal which means that the true pass and block axes will not exactly lie parallel to the a and b vectors. In other words, if one physically draws two orthogonal lines at P on the flat film surface parallel to the pass and block axes of that film, after forming those two lines, intersecting at p, will, in most cases, no longer be orthogonal and no longer correspond exactly to the pass and block axes of the deformed film, especially when forming films to high curvature. This effect can be greatly reduced in the optical film devices disclosed herein.

Figure 2B:
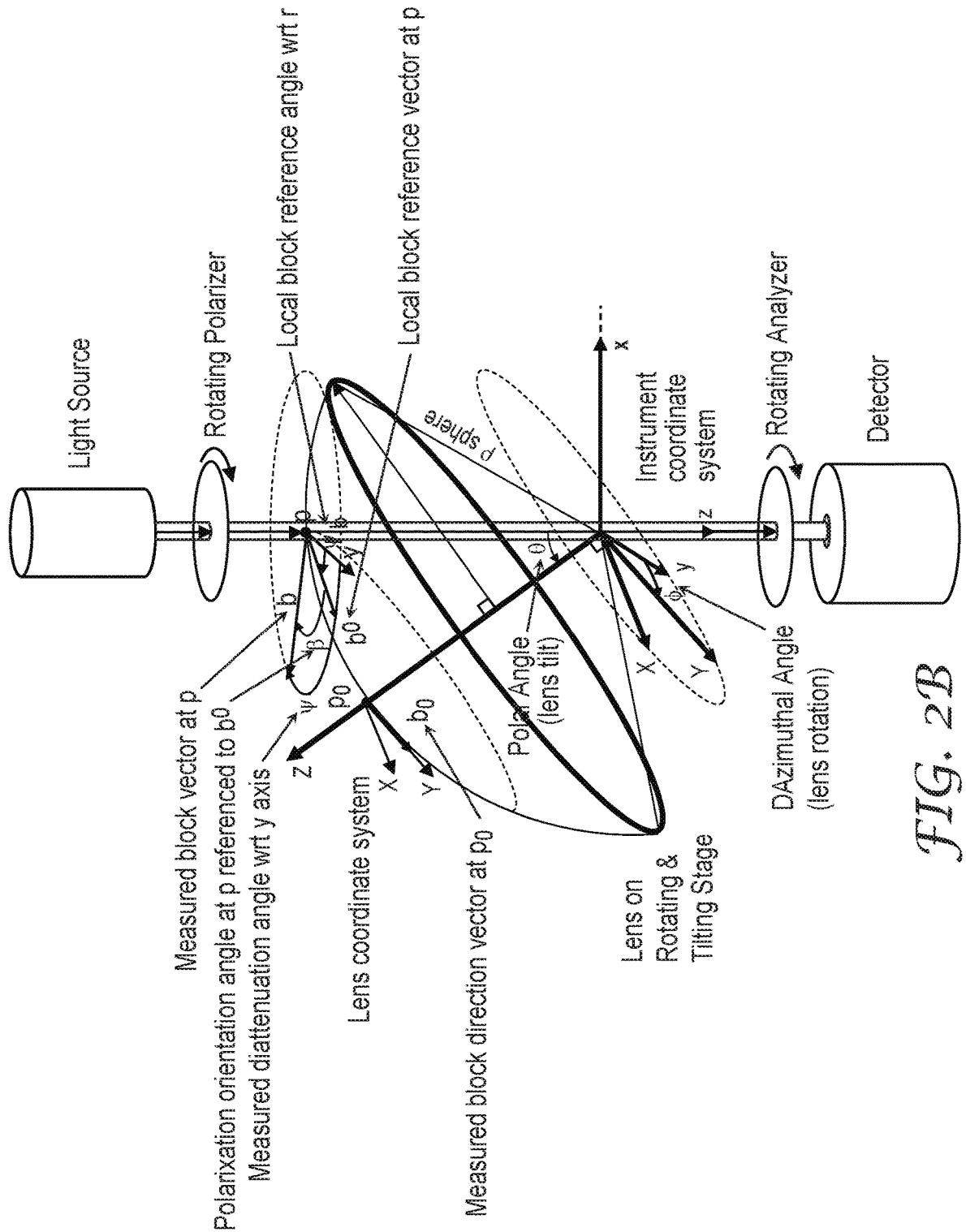

FIG. 2B is a diagram illustrating how block and pass axis orientation angles for linear polarization can be measured. In this case lens, polarization direction measurements were made using an Axometrics OPMF-2 polarimeter equipped with a tilting and rotating stage as shown in FIG. 2B. The polarimeter is equipped with a variable wavelength, non-coherent light source, a detector that measures transmitted light intensity, two rotating linear polarizers located on either side of the sample and two rotating retarders, also located on either side of the sample. The instrument measures polarization and retardation properties to construct a "Stokes vector" of transmitted light through the sample. When comparing to the Stokes vector of the light incident to the sample, the instrument reports the elements of a "Mueller matrix" describing the material optical properties of the sample. From the Mueller matrix, the orientation of the pass and block axes at a point in a sample can be determined with respect to a global instrument coordinate system. The rotating and tilting stage allows transmission measurements to be made orthogonal to the sample surface at any point, p, within the active area of a (spherically) curved lens mounted on the stage. Further information on ellipsometry and the measurement of polarized light can be found in Azzam and Bashara (1977) [R. M. A Azzam and N. M. Bashara, *Ellisometry and polarized light*, North-Holland Pub. Co., 1977] and Chipman (1995) [R. A. Chipman, "Polarimetry", in the *Handbook of Optics*, $2^{nd}$ Ed, Vol II, McGraw-Hill Professional, 1995.].

Figure 2C:
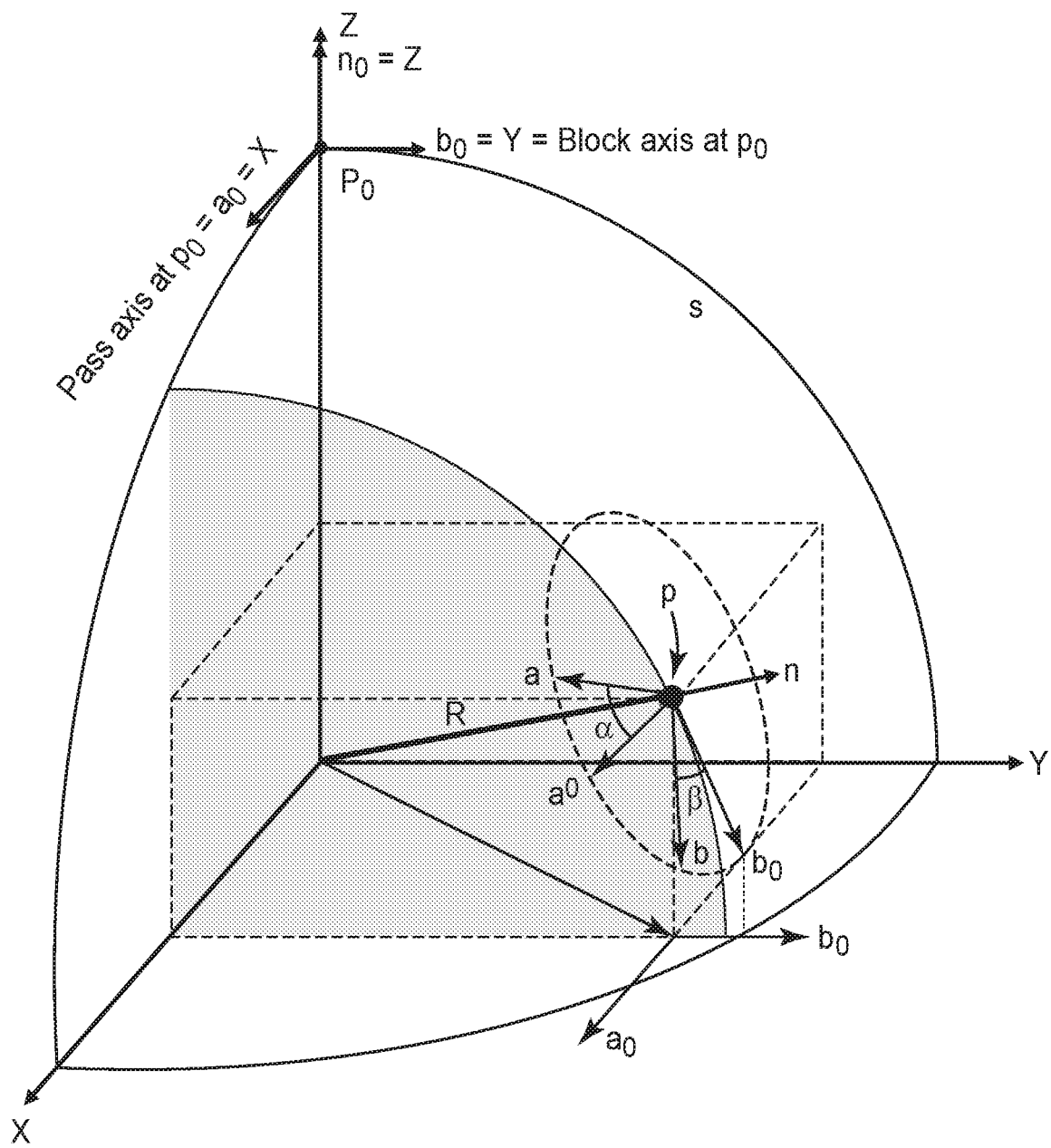

Characterizing polarization direction on compound curved surfaces is slightly more complex since the orientation measurement with respect to the instrument coordinate frame will depend on how points on the lens surface are tilted, rotated, and in some cases, translated into position in the instrument. As a result, it is helpful to define a uniform standard by which to compare different shaped lenses and those made by different forming methods. The orientation direction standard we chose for films formed to any arbitrarily shaped lens surface is the resulting block direction orientation profile produced by a perfect, simple, normal projection of a perfect flat polarizer laying parallel to the best fit plane to the lens surface. The diagram in FIG. 2C shows the projection of the pass and block axes of the flat film to the curves surface and the resulting local reference directions. The best fit plane is the plane with the minimum least squares average orthogonal distance from every point on the lens surface. The orientation direction of any point, p, on the standard projected lens surface, measured orthogonally to the lens surface at p, is defined as zero.

Using the standard above, the local reference direction, $b^o(p)$, at any point, p, on any real, measured, arbitrarily shaped lens surface is defined as the spatial vector laying orthogonal to the lens surface normal, $n(p)$, at p, (tangent to the film surface at p) and coplanar with the unit normal vector, Z, of the best fit plane to the lens surface and the block direction, $b_0$, measured at the point, $p_0$, on the lens surface, whose surface normal vector, $n(p_0)$ is parallel to Z. If we define a unit normal vector, Y, as laying parallel to $b_0(p_0)$ (and by extension, orthogonal to Z), and the unit vector, X, as orthogonal to both Y and Z, then the local reference direction, $b^o(p)$, can be defined mathematically from the vector cross product of $n(p)$ and X as follows:

$$b^0(p) = \frac{n(p) \times X}{\|n(p) \times X\|} \quad (2)$$

where $\|v\|$ defined as the magnitude of the vector, v. The polarizaiton orientation angle, $\beta(p)$, at p, is then defined as the angle between the lens surface tangent vector defined by measured block axis direction, $b(p)$, and the local reference direction, $b^o(p)$. This angle can be found mathematically from the vector cross products and dot products of $b(p)$ and $b^o(p)$ as follows:

$$\beta(p) = \arctan\left(\frac{\|b \times b^0\|}{b \cdot b^0}\right) \quad (3)$$

For the measurement shown in FIG. 2B, the lens is positioned to make a measurement, orthogonal to the lens surface at p. In this case the vectors, $b(p)$ and $b^o(p)$ lie within the xy plane of the instrument coordinate system. The instrument will report a diattenuation orientation angle, $\Psi_m$. This angle represents the angle, measured clockwise about the light path while facing the incident side of the lens, between the measured pass direction of the film at p and the instrument x axis. That angle is also equal to the angle between the measured block direction of the film $b(p)$, at p, and the instrument y axis. We can also find $\beta(p)$ by subtracting a block reference angle, $\psi_b$, calculated for the lens position, from the diattenuation orientation angle as follows:

$$\beta(p) = \Psi_m(p) - \psi_b(p) \quad (4)$$

where the block reference angle, $\psi_b$, is the angle between $b^o(p)$ and the instrument y axis and can be calculated as follows:

$$\psi_b(p) = \arctan\left(\frac{\|b^0 \times y\|}{b^0 \cdot y}\right). \quad (5)$$

The pass direction of the film at p will simply be orthogonal to the block axis direction and tangent to the film surface at p. The Mueller matrix reported by the instrument (in the instrument xyz coordinate frame) can be rotated into the lens coordinate frame using the following expression for a matrix rotation:

$$M_{lens} = RM_{instr}R^T \quad (6)$$

where $M_{inst}$ is the 4×4 Mueller matrix reported by the instrument, $M_{lens}$, is the Meuller matrix converted into the lens coordinate frame, $$R = \begin{bmatrix} 1 & 0 & 0 & 0 \\ 0 & \cos(2\psi_b) & \sin(2\psi_b) & 0 \\ 0 & -\sin(2\psi_b) & \cos(2\psi_b) & 0 \\ 0 & 0 & 0 & 1 \end{bmatrix} \text{ and} \quad (7)$$

$$R^T = \begin{bmatrix} 1 & 0 & 0 & 0 \\ 0 & \cos(2\psi_b) & -\sin(2\psi_b) & 0 \\ 0 & \sin(2\psi_b) & \cos(2\psi_b) & 0 \\ 0 & 0 & 0 & 1 \end{bmatrix}.$$

An alternative local reference can also be adopted based on the pass axis measured at $p_0$. In that case the local reference direction, $a^0(p)$, at any point, p, is defined as the spatial vector laying orthogonal to the lens surface normal, $n(p)$, at p, and coplanar with the unit normal vector, Z, of the best fit plane to the lens surface and the pass direction, $a_0$, measured at the point, $p_0$, on the lens surface, whose surface normal vector, $n(p_0)$ is parallel to Z. Using that alternative reference definition, the equations (2-5) are replaced with the following expressions to calculate the polarization rotation profile of the lens:

$$a^0(p) = \frac{n(p) \times Y}{\|n(p) \times Y\|} \quad (2')$$

$$\psi_a(p) = \arctan\left(\frac{\|a^0 \times x\|}{a^0 \cdot x}\right). \quad (5')$$

$$\alpha(p) = \arctan\left(\frac{\|a \times a^0\|}{a \cdot a^0}\right) = \Psi_m(p) - \psi_a(p) \quad (3', 4')$$

where $\alpha(p)$ is the polarization orientation angle based on the projected pass axis and $\psi_a(p)$ is the angle between $a^0(p)$ and the instrument x axis.

The following procedure can be used to express block direction orientation profiles consistent with the above definitions based on the projected block axis reference:
1) Define a fixed, right-handed, Cartesian xyz coordinate frame for the instrument with the z direction pointing in the direction of light travel from the source to the detector, and the x and y axes parallel to the pass and block directions of polarizer in the system when its measured diattenuation angle is zero.
2) Find the best fit plane of the lens surface
3) Find the point, $p_0$, on the lens surface that has a surface normal vector parallel to the normal vector of the best fit plane. In some cases (for example when a single film is formed into a binocular lens), more than one point on the lens might have a surface normal parallel to the best fit plane.
4) Measure the directions of the pass and block axes of the lens at $p_0$. If there is more than one $p_0$ then measure the block and pass directions at all such points.
5) Define a right handed Cartesian XYZ coordinate frame for the lens with the Z axis laying parallel to normal of the best fit plane, the X axis parallel to the pass direction at $p_0$ and the Y axis parallel to the measured block direction at $p_0$. If there is more than one $p_0$, then the X and Y axis directions are defined as the linear average of the orientations measured at all of the qualifying points.
6) Position the lens to measure the film polarization properties at p and determine the orientation of the lens XYZ coordinate frame with respect to the instrument xyz coordinate frame.
7) Calculate the local reference vector, $b^0(p)$ using equation (2) within the instrument xyz coordinate frame noting that the surface normal vector $n(p)$ is equal to z.
8) Calculate the block reference angle, $\psi_b$, using equation (5).
9) Measure the film polarization properties at p, and obtain the diattenuation angle, $\Psi_m$.
10) Calculate the block axis orientation angle, $\beta(p)$, by subtracting $\psi_b$ from $\Psi_m$, as shown in equation (4).

The calculation process above can be demonstrated by applying it to the characterization of a dome shaped spherical lens, as shown in FIG. 2B, as follows:
1) The xyz vectors comprising the instrument right-handed coordinate axes in the instrument coordinate frame are by definition:

$$x=[1,0,0],\ y=[0,1,0],\ \text{and}\ z=[0,0,1]. \quad (8)$$

Note that in FIG. 2B, light passes downward from the source to the detector and therefore in that diagram the instrument z axis points downward as well
2) The best fit XY reference plane for the lens will lie parallel to the plane encompassing the lens perimeter. We will define the Z axis as pointing from the eye-side of the lens outward towards the world side of the lens.
3) For a dome shaped, spherical lens, only one as a surface normal parallel to the best fit plane and that point, $p_0$, lies in the center of the lens as shown in FIGS. 2B and 2C.
4) The lens is mounted in the instrument and rotated until the diattenuation angle, $\Psi_0$, measured at $p_0$ is zero.
5) The X and Y axes coordinate axes of the lens are defined as parallel to pass and block axes of the film the measured at $p_0$, with the Y axis also pointing in the same direction as y.
6) To measure the properties of a point, p, on the lens surface, the lens will be tilted by an angle, $\theta$, about the instrument y axis and rotated by an angle, $\phi$, about the lens Z axis. Using FIG. 2B and some basic geometry it can be shown that the X, Y and Z unit vectors comprising the lens coordinate system are:

$$X=[-\cos(\theta)\cos(\phi),\ -\sin(\phi),\ \sin(\theta)\cos(\phi)]$$

$$Y=[-\cos(\theta)\sin(\phi),\ \cos(\phi),\ \sin(\theta)\sin(\phi)]$$

$$Z=[-\sin(\theta),\ 0,\ -\cos(\theta)] \quad (9)$$

7) Using equation (2) to calculate $b^0(p)$ and noting that $n(p)=z=[0,0,1]$ we find:

$$b^0(p) = \frac{n(p) \times X}{\|n(p) \times X\|} = \frac{[0,0,1] \times [-\cos(\theta)\cos(\phi), -\sin(\phi)\sin(\theta)\cos(\phi)]}{\|n(p) \times X\|} = \frac{[\sin(\phi), -\cos(\theta)\cos(\phi), 0]}{\sqrt{\sin^2(\phi) + \cos^2(\theta)\cos^2(\phi)}} \quad (10)$$

Alternatively, using equation (2') to calculate $a^0(p)$ we find:

$$a^0(p) = \frac{n(p) \times Y}{\|n(p) \times Y\|} = \frac{[-\cos(\phi), -\cos(\theta)\sin(\phi), 0]}{\sqrt{\cos^2(\phi) + \cos^2(\theta)\sin^2(\phi)}} \quad (10')$$

8) Using equation (5) to calculate $\psi_b(p)$ we find:

$$\psi_b(p) = \arctan\left(\frac{\|b^0 \times y\|}{b^0 \cdot y}\right) = \arctan\left(\frac{\|[\sin(\phi), -\cos(\theta)\cos(\phi), 0] \times [0,1,0]\|}{-\cos(\theta)\cos(\phi)}\right) = \arctan\left(\frac{\tan(\phi)}{-\cos(\theta)}\right) \quad (11)$$

Alternatively, using equation (5') to calculate $\psi_a(p)$ we find:

$$\psi_a(p) = \arctan\left(\frac{\|a^0 \times x\|}{a^0 \cdot x}\right) = -\arctan(\tan(\phi)\cos(\theta)). \quad (11')$$

9 & 10) The polarization orientation angle, $\beta(p)$, can then be found by subtracting $\psi_b$ from the measured diattenuation angle, $\Psi_m$, as shown in equation (4). The measured Mueller matrix can also be rotated into the lens coordinate frame using $\psi_b(p)$ and equations (6) and (7).

Alternatively, the polarization orientation angle, $\alpha(p)$, (based on the projected pass axis reference) can then be found by subtracting $\psi_a$ from the measured diattenuation angle, $\Psi_m$, as shown in equation (4'). The measured Mueller matrix can also be rotated into the lens coordinate frame using $\psi_a(p)$ in place of $\psi_b(p)$ in equations (6) and (7).

The process above was applied to rotational scans of dome shaped spherical film lenses formed from single pieces of film to produce conoscopic plots of the polarization block axis rotation, b, over the entire film surface. Circular and elongated regions of conoscopic plots were then analyzed to find the maximum and minimum block axis rotations, $\beta_{max}$ and $\beta_{min}$ within those regions. The total curvatures of the sampling regions were calculated using equation (1) and the variation in the polarization block axis angle, $\beta_{max}-\beta_{min}$, to produce the graph 300 shown in FIG. 3.

Figure 3:
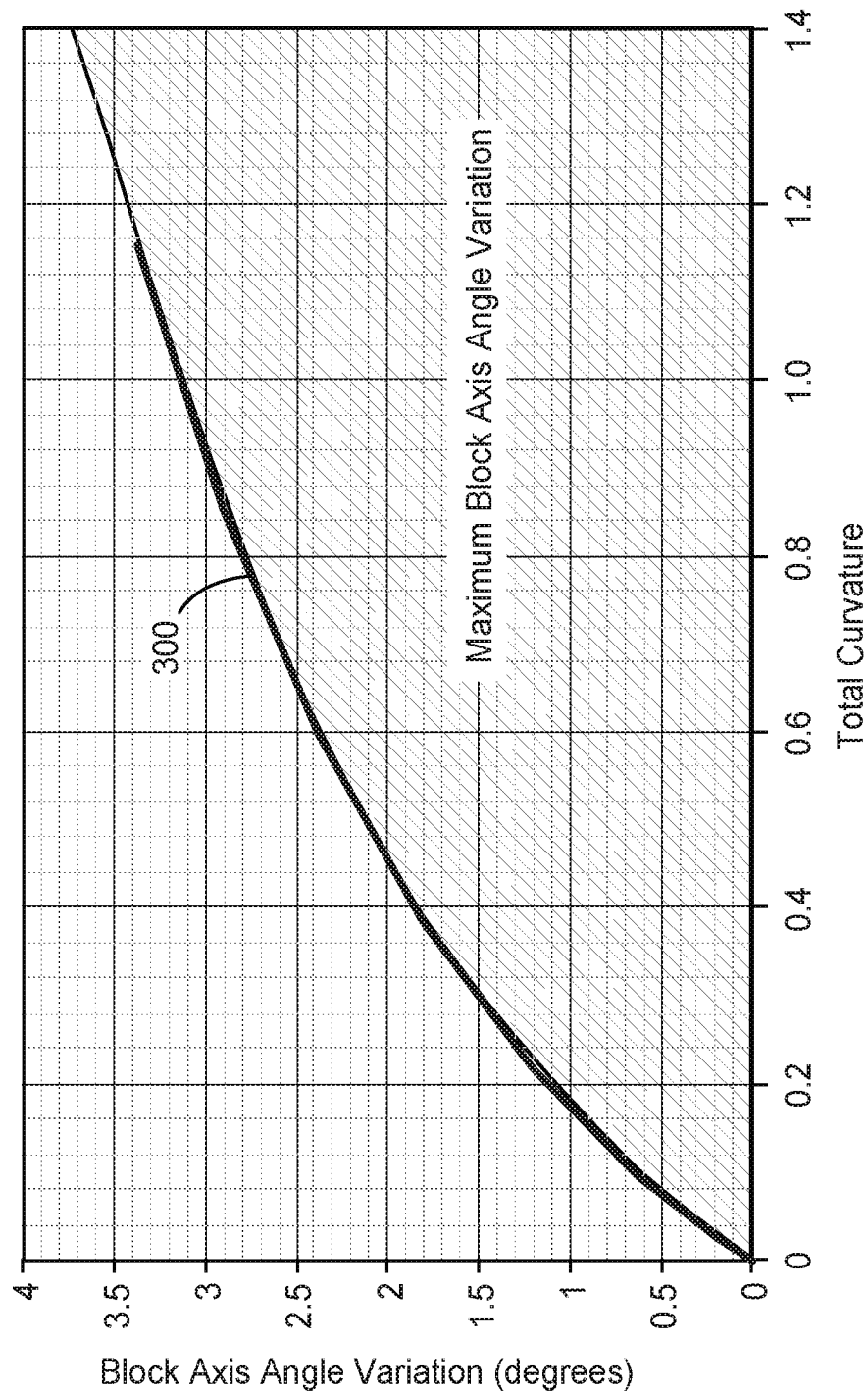
FIG. 3 shows a plot of maximum variation in polarization block axis angle of an optical film in accordance with some embodiments.

FIG. 3 shows a plot 300 of maximum variation in polarization block axis angle of the active area of an optical film in accordance with some embodiments. The polarization block axis angle with respect to a reference axis as discussed in connection with FIGS. 2A and 2B can be measured for each point on the active area as discussed above. The variation in the polarization block axis angle is $\beta_{max}-\beta_{min}$, where $\beta_{max}$ is the maximum polarization block axis angle and $\beta_{min}$, is the minimum polarization block axis angle. The graph 300 shown in FIG. 3 is the maximum variation in the linear polarization block axis angle with respect to the common reference axis for points of the active area of the disclosed optical film as a function of total curvature, C. In accordance with some embodiments, an optical film with an active area having a surface that is curved in two orthogonal directions having a total curvature, C, greater than 0.1 or greater than 0.2, or greater than 0.3, or greater than 0.4, or greater than 0.5, or greater than 0.6. There is at least one point, $p_0$, on the surface of the active area such that a surface normal direction at $p_0$ is parallel to a normal vector of a reference plane of the active area. Each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$. A difference between maximum and minimum linear polarization block axis orientation angles ($\beta_{max}-\beta_{min}$) for all points, p, is less than $2\ln(1+12/\pi)*C$ degrees.

Figure 4:
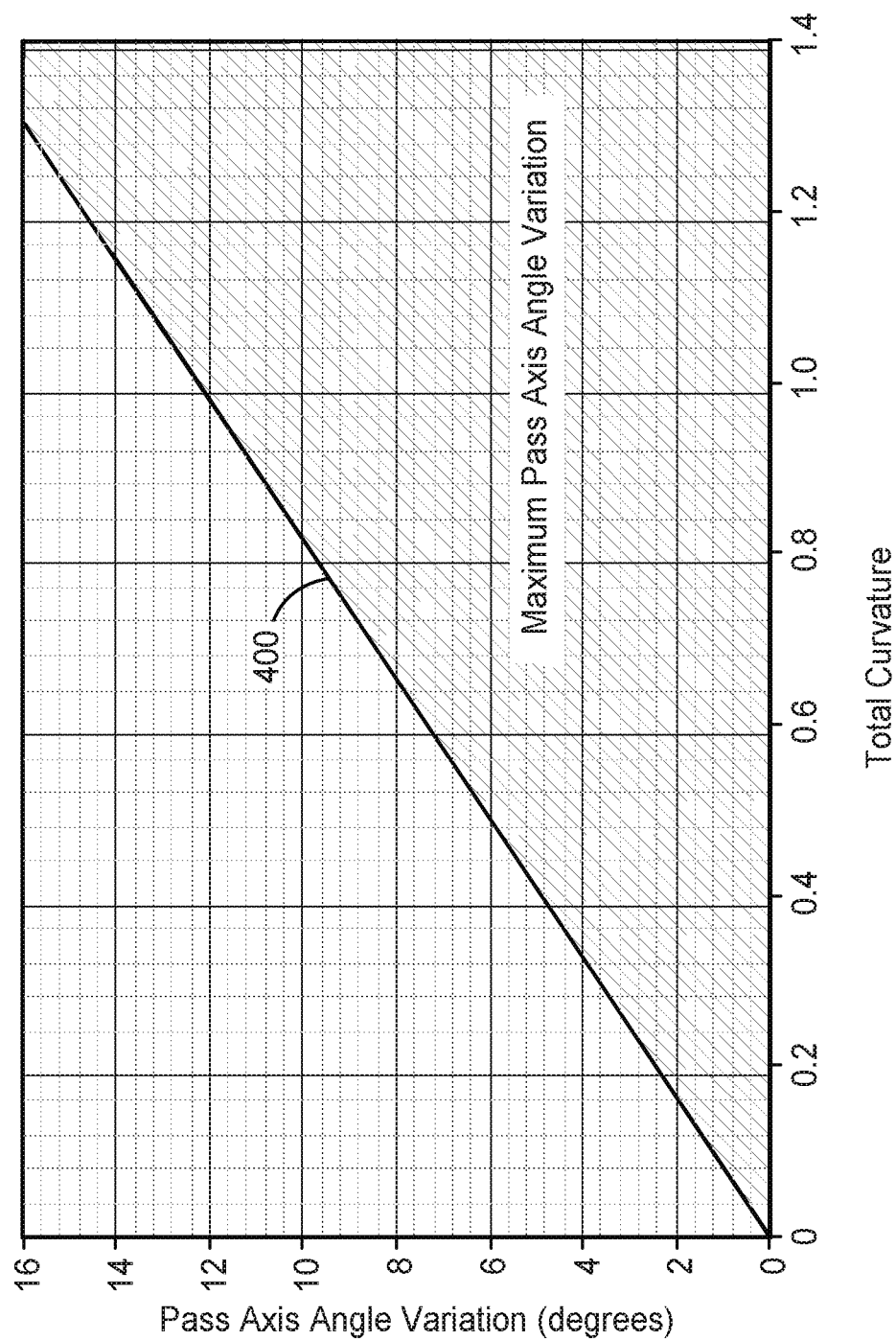
FIG. 4 shows a plot of maximum variation in the polarization pass axis angle for a curved optical film in accordance with some embodiments.

FIG. 4 shows a plot 400 of maximum variation in the polarization pass axis angle for a curved optical film in accordance with some embodiments. The polarization pass axis angle can be measured with respect to the reference axis for each point of the active area of the optical film as discussed above. The variation in polarization pass axis angle is $\alpha_{max}-\alpha_{min}$, where $\alpha_{max}$ is the maximum pass axis angle and $\alpha_{min}$, is the minimum pass axis angle. The graph 400 of FIG. 4 provides the maximum variation in the linear polarization pass axis angles for points of the active area of the disclosed optical film as a function of total curvature, C. In accordance with some embodiments, an optical film with an active area having a surface that is curved in two orthogonal directions having a total curvature, C, greater than 0.1 or greater than 0.2, or greater than 0.3, or greater than 0.4, or greater than 0.5, or greater than 0.6. There is at least one point, $p_0$, on the surface of the active area such that a surface normal direction at $p_0$ is parallel to a normal vector of a reference plane of the active area. Each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$. A difference between maximum and minimum linear polarization pass axis orientation angles ($\alpha_{max}-\alpha_{min}$) for all points, p, is less than $12.2*C$ degrees.

Figure 5:
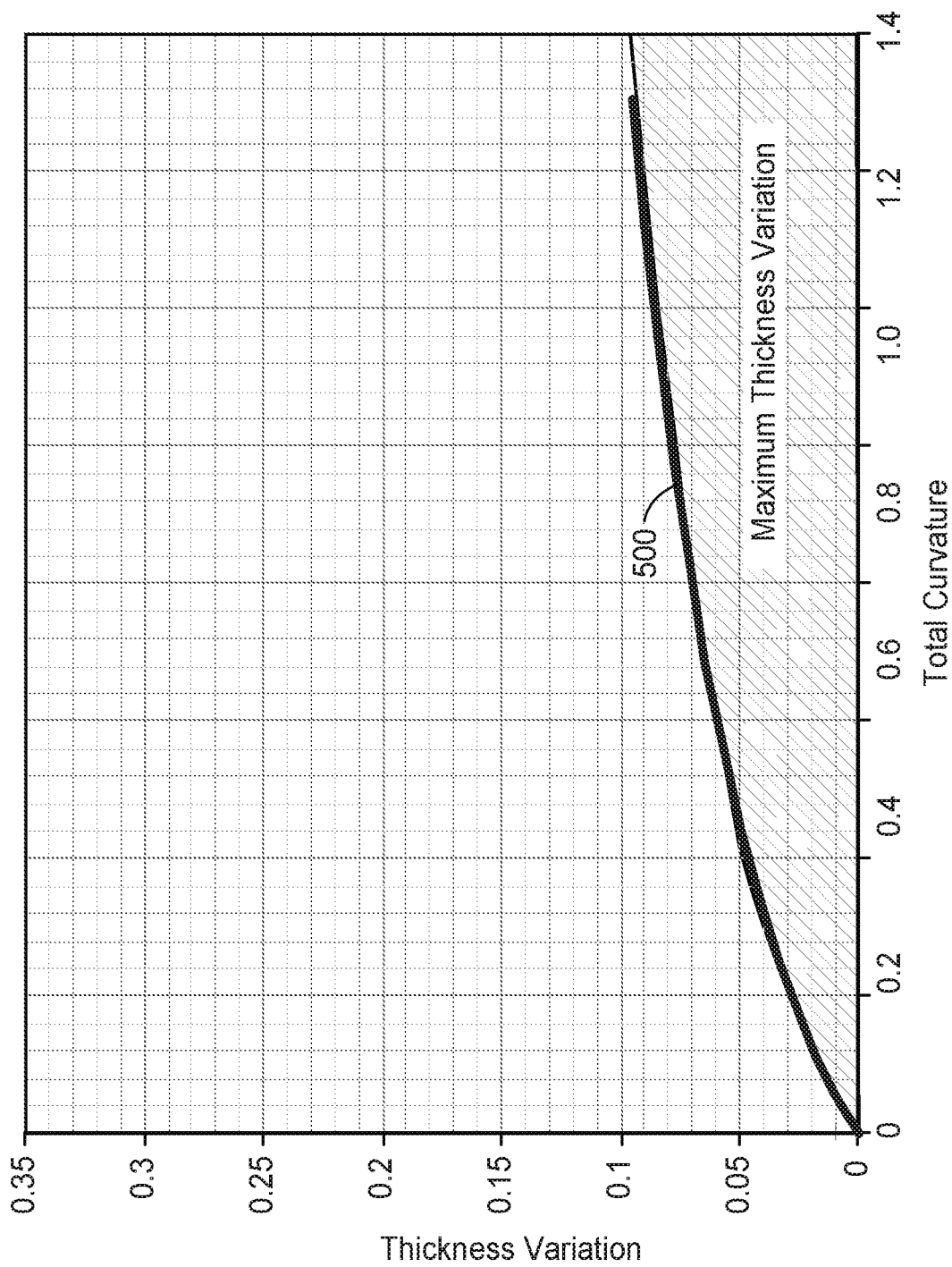
FIG. 5 shows a graph of the maximum variation in thickness $(t_{max}-t_{min})/t_{ave}$ of the active area of the optical film as a function of the total curvature, C in accordance with some embodiments.

The active area of the optical film has a minimum thickness, $t_{min}$, a maximum thickness, $t_{max}$, and an average thickness, $t_{ave}$. FIG. 5 provides a graph 500 of a maximum variation in thickness $(t_{max}-t_{min})/t_{ave}$ of the active area of the disclosed optical film as a function of the total curvature, C. In accordance with various embodiments, the maximum variation in thickness of the active area of the optical film can be mathematically expressed as $\ln[1+(12/\pi)C]/20$, wherein the total curvature of the active area of the film, C, may be greater than 0.1, greater than 0.2, greater than 0.3, greater than 0.4, greater than 0.5, greater than 0.6.

The optical films disclosed herein may be used to form devices such as reflective polarizers and reflective polarizing lenses, for example. The thickness of the optical film is related to the lower and/or upper pass band edges of the reflectance and/or transmittance of the optical film as a function of wavelength. The reflectance and transmittance of the optical film as a function of wavelength can be determined for light normally incident on either side of the optical film. Typically, similar results are obtained for either measurement. The optical film may be shaped for use in a particular application where light is incident on a particular side of the optical film. In this case, the specified reflectance and transmittance is for light incident on this particular side. In cases where a curved optical film could be used in either orientation, the specified reflectance and transmittance can be understood to be for light incident on the side of the optical film such that the optical film is convex toward the incident light.

Figure 6:
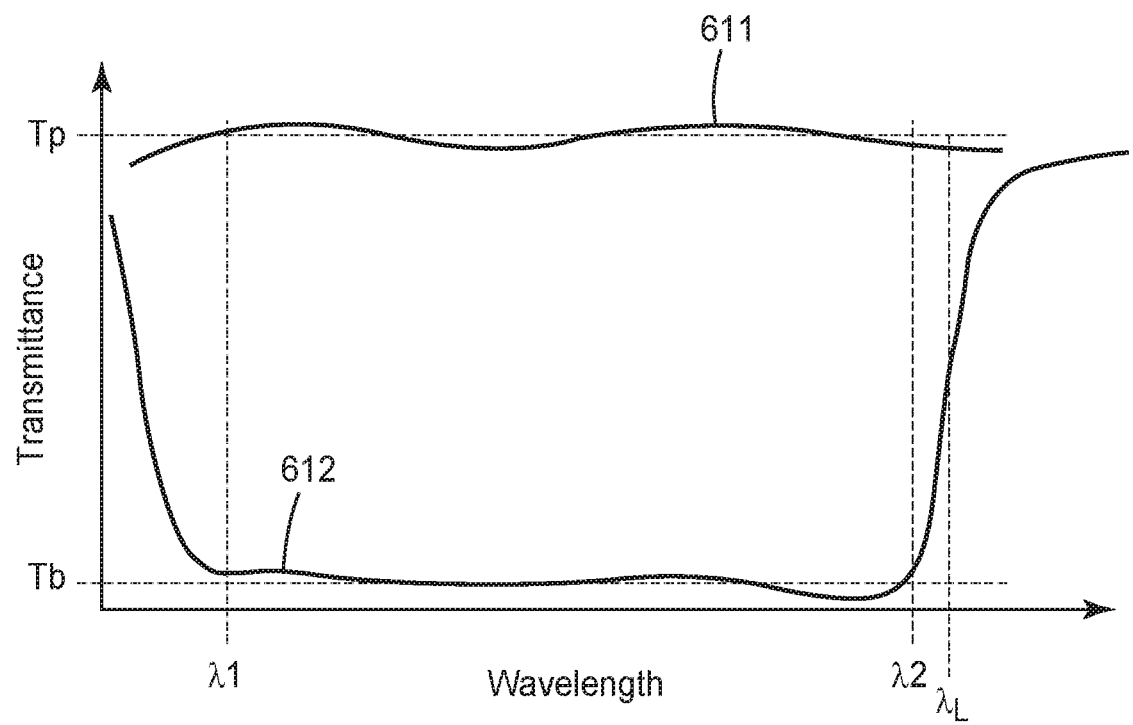
FIG. 6 is a schematic plot of the transmittance as a function of wavelength of an optical film for the pass and block states for light normally incident on a reflective polarizer in accordance with some embodiments.

FIG. 6 are overlaid schematic plots 611, 612 of the transmittance as a function of wavelength of a reflective polarizer optical film for the pass state (plot 611) and the block state (plot 612) for light normally incident on an optical film in accordance with some embodiments. The average of the transmittance over wavelengths is a maximum for normally incident light having a pass polarization state (polarized along a pass axis) and the average of the transmittance over wavelengths is a minimum for normally incident light having a block polarization state (polarized along a block axis). The average of the transmittance over wavelengths in the predetermined wavelength range from $\lambda_1$ to $\lambda_2$ is Tp in the pass state and Tb in the block state. In some embodiments, $\lambda_1$ is about 450 nm and $\lambda_2$ is about 650 nm. In some embodiments, $\lambda_1$ is about 400 nm and $\lambda_2$ is about 700 nm. In some embodiments Tp is at greater than about 80%, or greater than about 85%, or greater than 88%. In some embodiments, Tb is no more than about 10%, or no more than about 5%, or no more than about 2%, or no more than about 1%, or no more than about 0.5%, or no more than 0.2%, or no more than 0.15%, or no more than 0.1%, or no more than 0.05%, or no more than 0.04%, or no more than 0.03%. In some embodiments, Tp and/or Tb is in any of these ranges at each location of the active area of the lens over at least 80%, or at least 85%, or at least 90%, or at least 95% of the active area of the lens.

Figure 7:
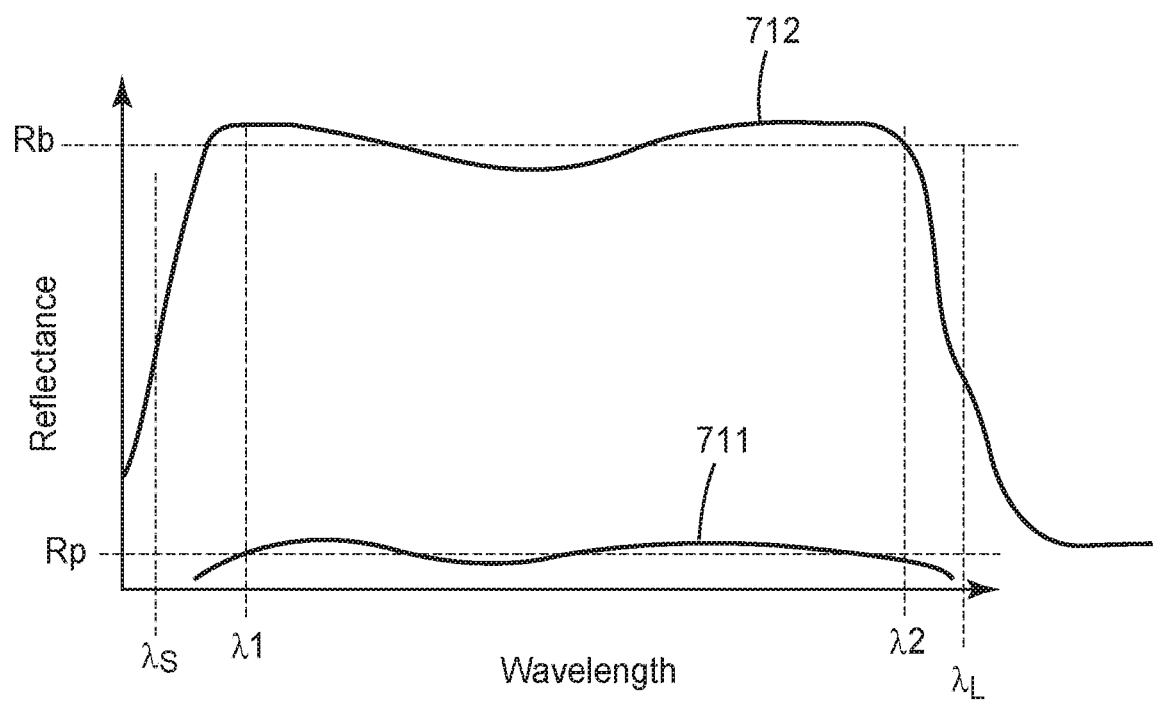
FIG. 7 is a schematic plot of the reflectance of a reflective polarizer for the pass and block states of the reflective polarizer for light normally incident on a reflective polarizer in accordance with some embodiments.

FIG. 7 provides overlaid schematic plots 711, 712 of the reflectance of a reflective polarizer optical film for the pass (plot 711) and block (plot 712) states of the reflective polarizer optical film for light normally incident on the reflective polarizer in accordance with some embodiments. The average of the reflectance over wavelengths is a maximum for normally incident light having the block polarization state, and the average of the reflectance over wavelengths is a minimum for normally incident light having the pass polarization state. The average of the reflectance over wavelengths in the predetermined wavelength range from $\lambda_1$ to $\lambda_2$ is Rp in the pass state and Rb in the block is state. In some embodiments Rb is greater than about 75%, or greater than about 80%, or greater than about 85%, or greater than about 90%. In some embodiments, Rp is no more than about 20%, or no more than about 15%, or no more than about 10%, or no more than about 5%. In some embodiments, Rp and/or Rb is in any of these ranges at each location of the active area of a shaped optical film over at least 80%, or at least 85%, or at least 90%, or at least 95% of a total area of the active area of the optical film.

Reflection and transmission bands typically have both long and short wavelength band edges where the reflectance or transmission rapidly drops. The long wavelength band edge $\lambda_L$ and a short wavelength band edge $\lambda_S$ are indicated in FIGS. 6 and 7. The short wavelength band edge $\lambda_S$ is less than $\lambda_1$ and the long wavelength band edge $\lambda_L$ is greater than $\lambda_2$. The band edges may be determined for normally incident light with the reflective polarizer convex towards the incident light.

The wavelength of a band edge can be defined using several different criteria. The spatial variation patterns exhibited by the band edge typically do not depend on the precise criteria used. The wavelength of the band edge may be taken to be the wavelength where the reflectance for normally incident light having the block polarization state drops to ½ Rb or the wavelength where the transmittance for normally incident light having the block polarization state increases to 10%, for example. Except where indicated differently, the band edge can be understood to refer to the wavelength where the transmittance for normally incident light having the block polarization state increases to 10%.

Figure 8:
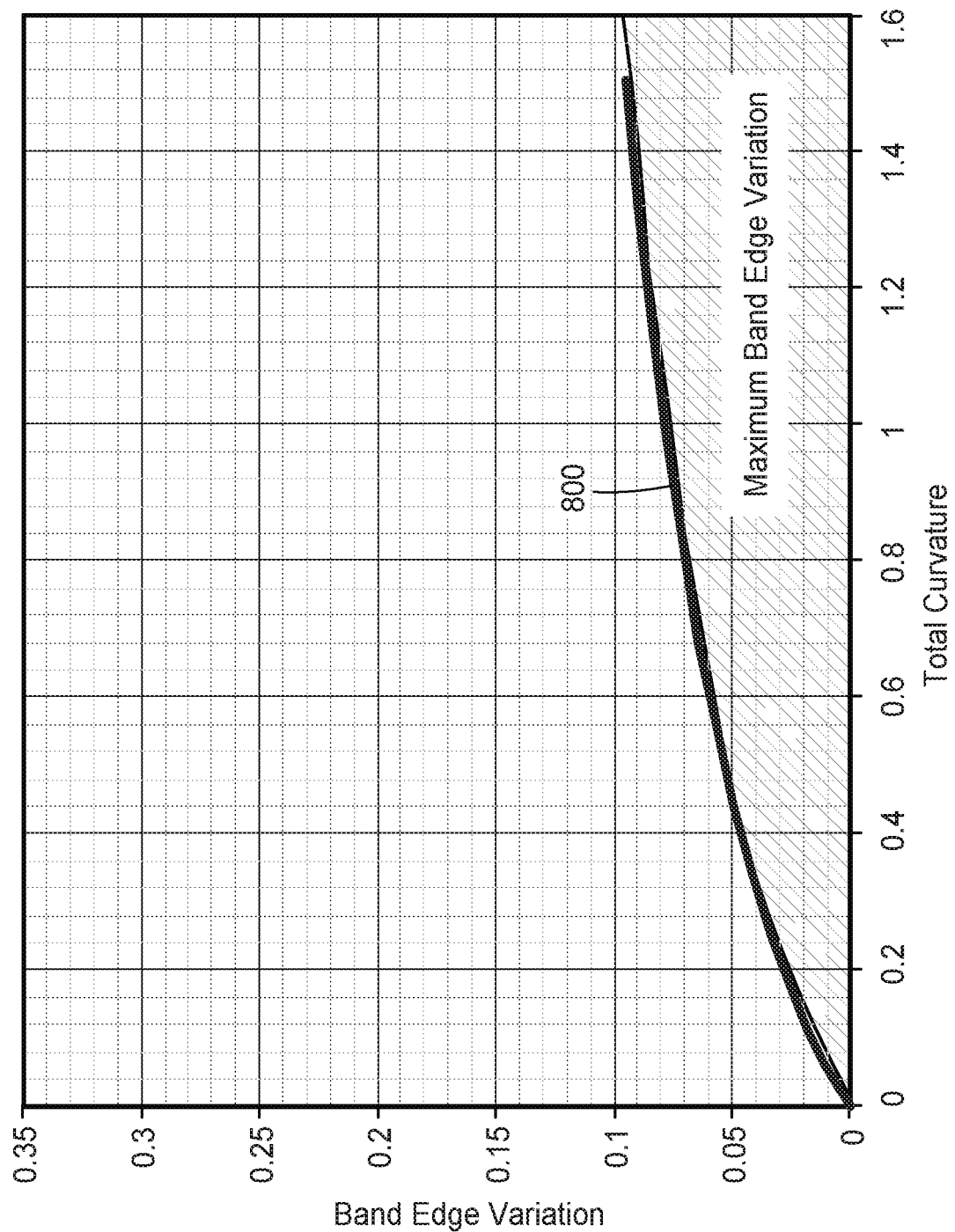
FIG. 8 shows a graph of the maximum variation in the long wavelength band edge, $(\lambda_{Lmax}-\lambda_{min})/\lambda_{Lave}$, with respect to C for an optical film in accordance with some embodiments.

The long wavelength band edge $\lambda_L$ and/or the short wavelength band edge $\lambda_S$ at any point of the active area of the lens is proportional to the thickness of the optical film at that point. Therefore, the variation of the long and/or short wavelength band edge is also proportional to the variation in the thickness. The active area of an optical film has a minimum long wavelength band edge, $\lambda_{Lmin}$, a maximum long wavelength band edge, $\lambda_{Lmax}$. An average of the long wavelength band edge taken at multiple points over the active area is denoted $\lambda_{Lave}$. FIG. 8 shows a graph 800 of the maximum variation in the long wavelength band edge, $(\lambda_{Lmax}-\lambda_{Lmin})/\lambda_{Lave}$, with respect to C for an optical film in accordance with some embodiments. The maximum variation in the long wavelength pass band edge of the active area of the optical film as a function total curvature C can be mathematically expressed as $\ln[1+(12/\pi)C]/20$, wherein the total curvature of the active area of the lens, C, may be greater than 0.1, greater than 0.2, greater than 0.3, greater than 0.4, greater than 0.5, greater than 0.6.

The short wavelength band edge of the active area may exhibit a similar relationship as the long wavelength band edge with respect to the total curvature of the active area of the optical film. The active area of the optical film has a minimum short wavelength band edge, $\lambda_{Smin}$, and a maximum short wavelength band edge, $\lambda_{Smax}$. An average of the short wavelength band edge taken at multiple points over the active area is $\lambda_{Save}$. A maximum variation in the short wavelength band edge, $(\lambda_{Smax}-\lambda_{Smin})/\lambda_{Save}$, is a function of total curvature, C, for an active area of an optical film in accordance with some embodiments. Similarly to the maximum variation in the long wavelength band edge, the maximum variation in short wavelength band edge of the active area of the optical film can be mathematically expressed as $\ln[1+(12/\pi)C]/20$, wherein the total curvature of the active area of the lens, C, may be greater than 0.1, greater than 0.2, greater than 0.3, greater than 0.4, greater than 0.5, greater than 0.6.

Figure 9A:
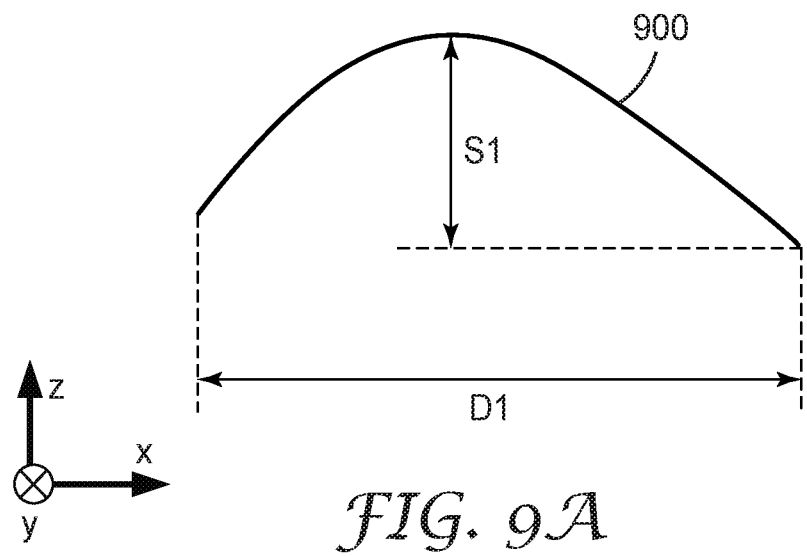
FIGS. 9A and 9B schematically illustrate he sag to diameter ratio of an optical film along first and second orthogonal axes.
Figure 9B:
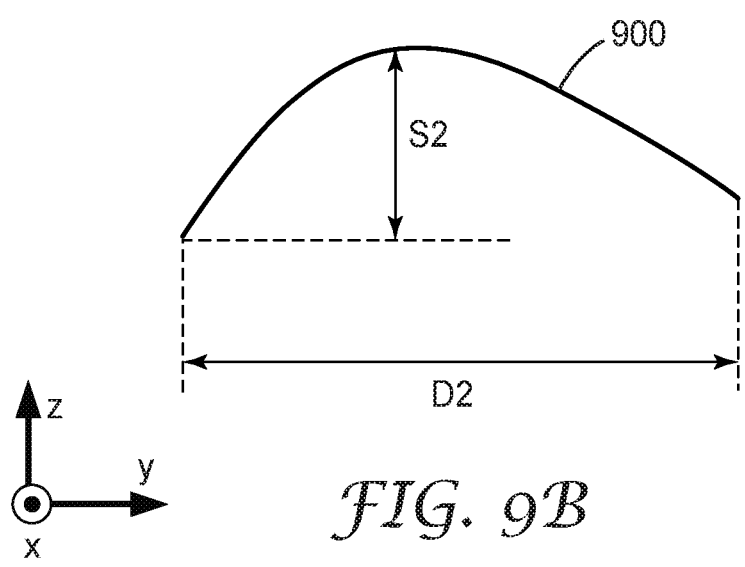

Another useful measure of the curvature of an optical film is the sag to diameter ratio. Sag to diameter ratio of the active area of a curved film can be characterized in terms a first direction and an orthogonal second direction. The maximum sag of the active area of the curved film along the first direction can be described as the maximum displacement of the optical film along a third direction orthogonal to the first and second directions in a plane containing the first and third direction. Similarly, the maximum sag of the active area of the curved film along the second direction can be described as the maximum displacement of the optical film along the third direction in a plane containing the second and third directions. The sag to diameter ratio of a lens along a first direction may differ from the sag to diameter ratio of the lens along the second direction. The sag to diameter ratio of an optical film along two orthogonal axes is schematically illustrated in FIGS. 9A-9B. The first, second, and third directions are the x, y, and z directions, respectively, as indicated in FIGS. 9A and 9B. The optical film 900 has a first maximum sag S1 and a corresponding first diameter D1 along the first direction (see FIG. 9A), and has a second maximum sag S2 and a corresponding second diameter D2 along the second direction (see FIG. 9B).

In some embodiments a first ratio, S1/D1, of the first maximum sag S1 to the corresponding first diameter D1 along the first direction may be at least 0.025, or at least 0.05, or at least 0.075, or at least 0.1, or at least 0.15, or at least 0.125, or at least 0.2, or at least 0.3, or at least 0.4, or at least 0.5, or at least 0.7. In some embodiments, the first ratio S1/D1 is less than 1, or less than 0.9, or less than 0.8. In some embodiments a second ratio, S2/D2, of the second maximum sag S2 to the corresponding second diameter D2 along the second direction is at least 0.025, or at least 0.05, or at least 0.075, or at least 0.1, or at least 0.15, or at least 0.125, or at least 0.2, or at least 0.3, or at least 0.4. In some embodiments, the second ratio is less than 0.8, or less than 0.7, or less than 0.6, or less than 0.5. In some embodiments, the second ratio is less than the first ratio. In some embodiments, the first ratio is substantially larger (e.g., a factor of 1.5, or a factor of 2 larger) than the second ratio. In some embodiments, the second ratio is about equal to the first ratio.

Figure 10A:
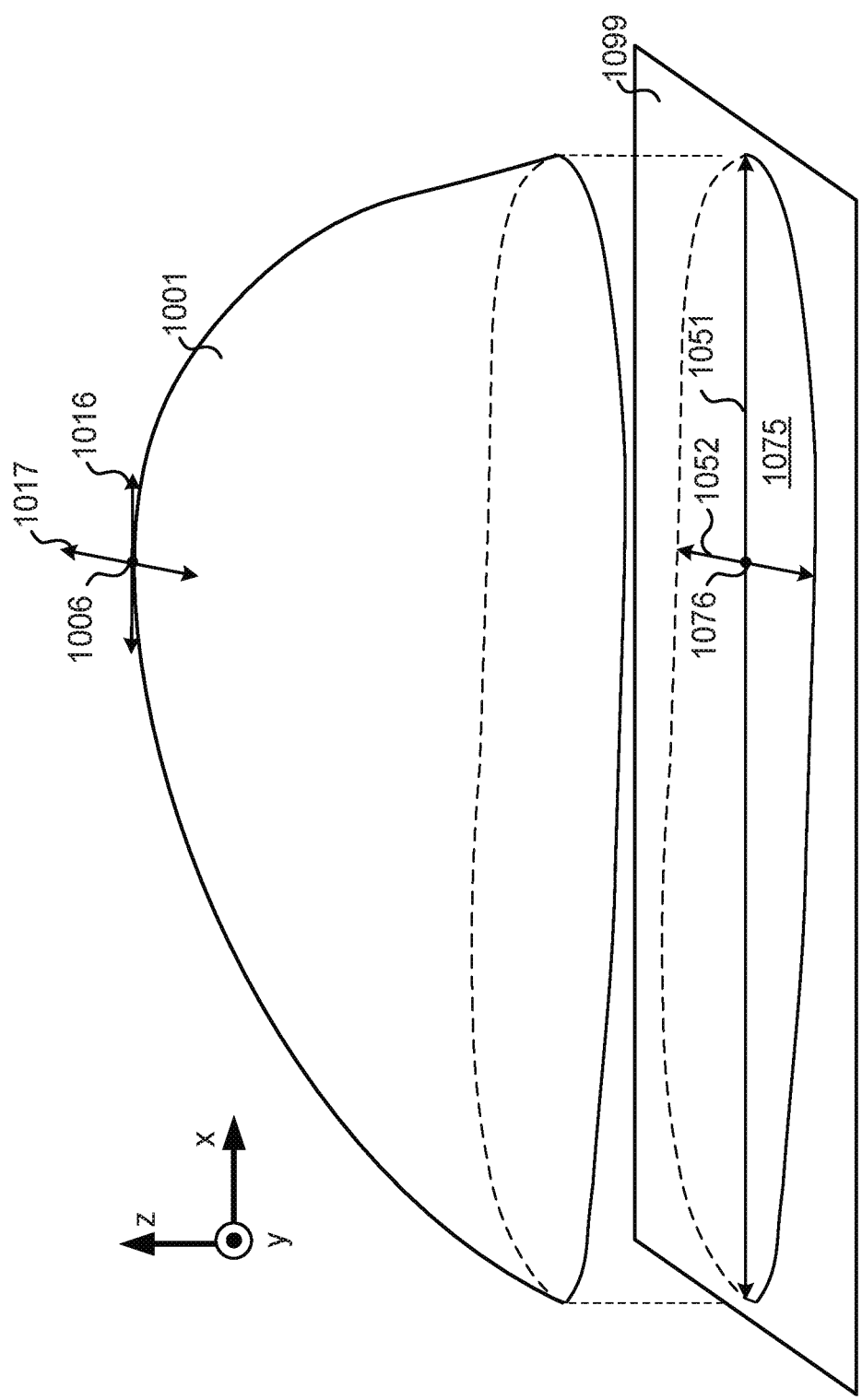
FIGS. 10A through 10C are schematic views of the active area of an optical film in accordance with some embodiments.
Figure 10B:
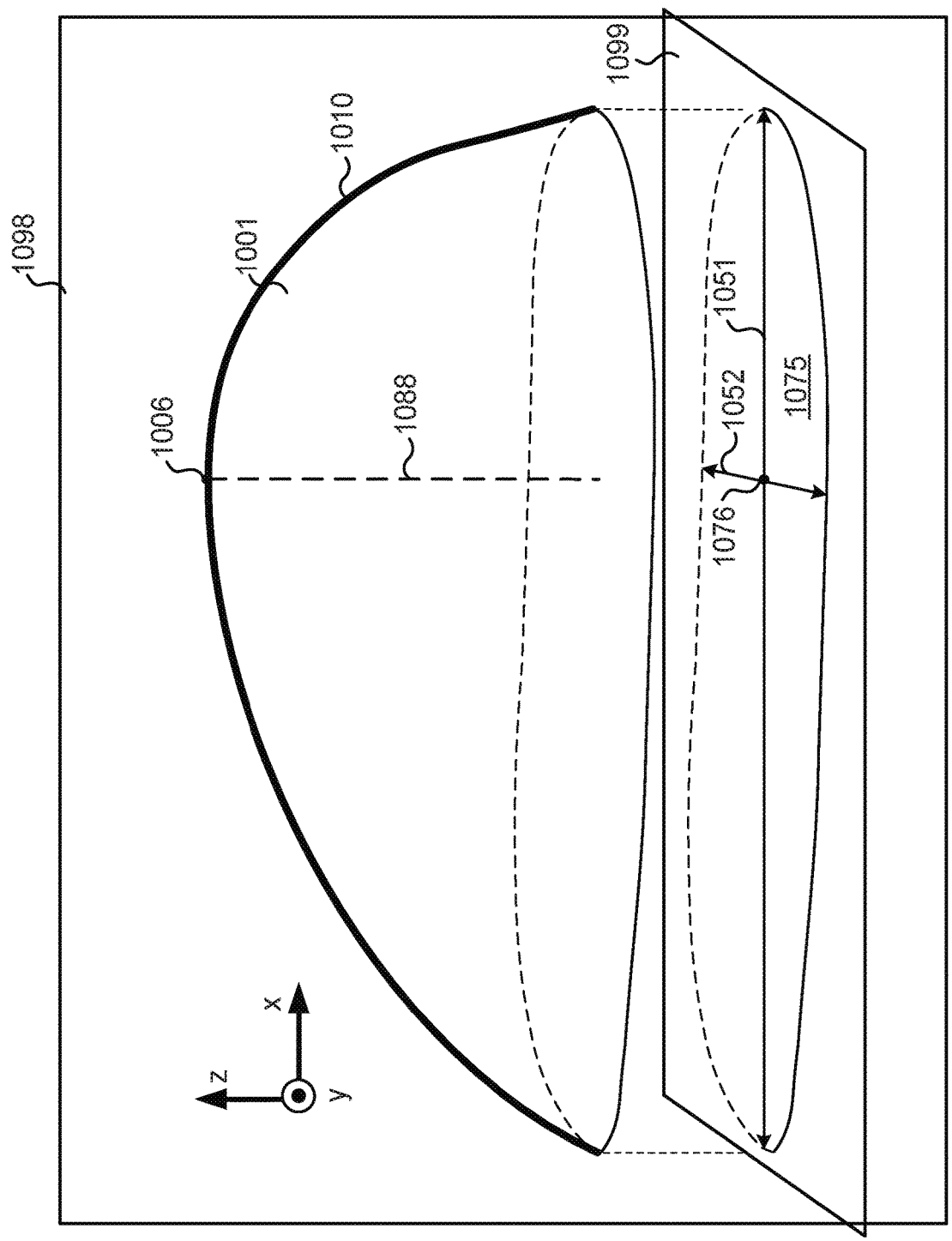
Figure 10C:
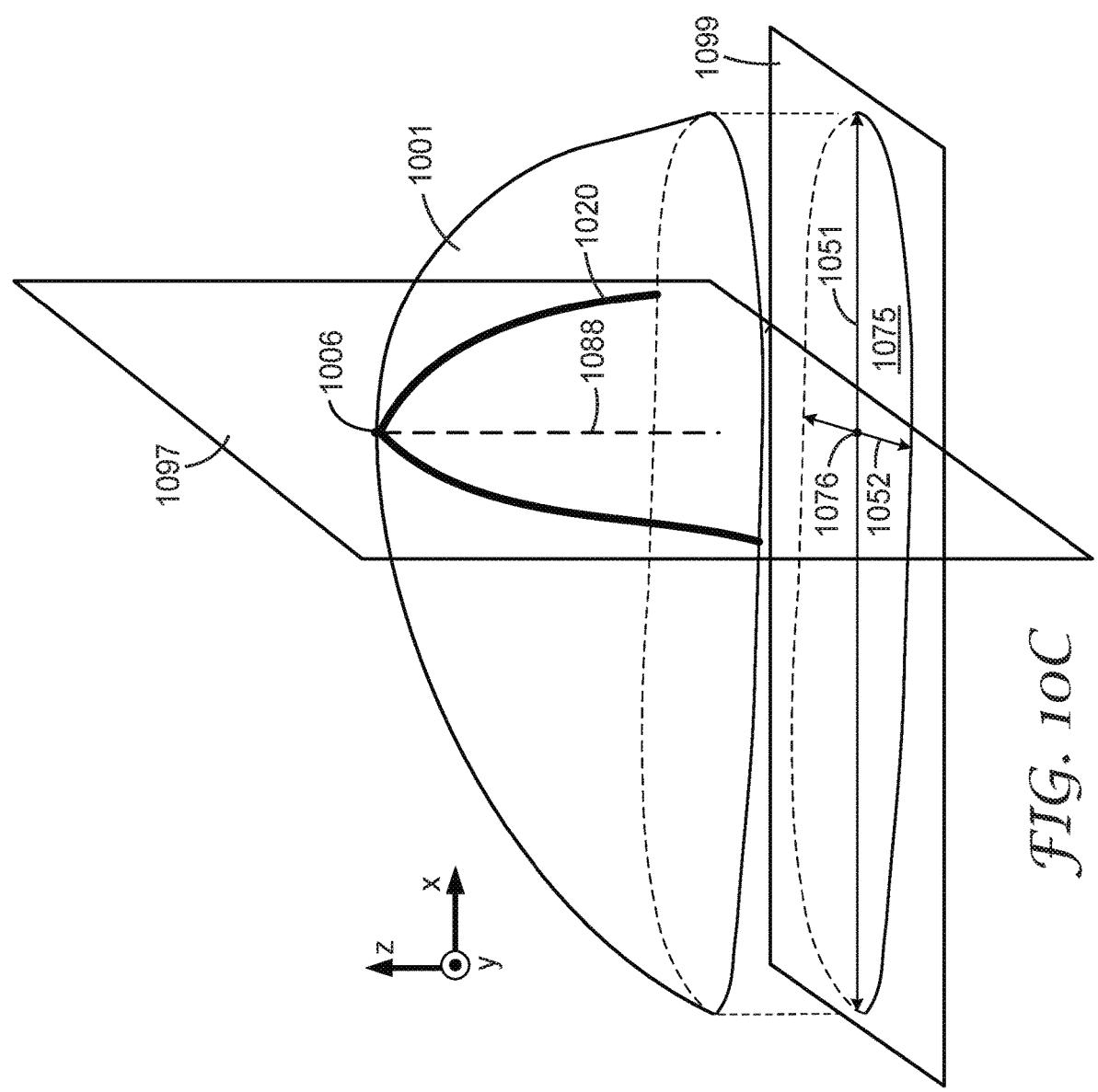
Figure 10D:
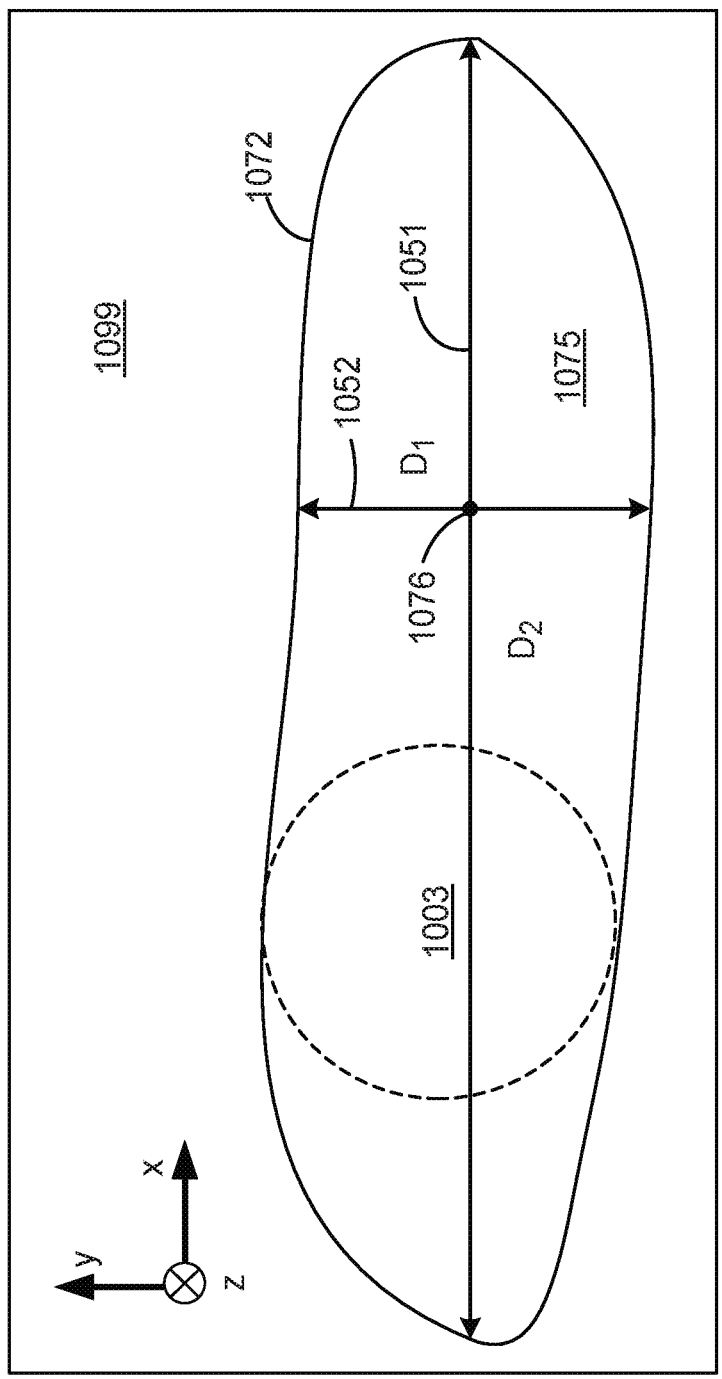
FIG. 10D shows in more detail a projection of the active area of the optical film of FIGS. 10A through 10C on a reference plane.

FIGS. 10A through 10D illustrate a methodology for specifying physical and/or optical properties of optical films having a general or irregular shape. FIGS. 10A through 10C are schematic views of the active area 1001 of an optical film. FIG. 10D shows in more detail a projection 1075 of the active area 1001 of the optical film on a reference plane 1099. The reference plane 1099 is defined such that the area of the projection 1075 of the active area 1001 of the optical film is maximum in the reference plane 1099, the active area 1001 and the reference plane 1099 do not intersect, and at least a majority (e.g., at least 60%, or at least 80%, or all) of the total area of the active area 1001 is concave toward the reference plane 1099. The active area 1001 has an apex 1006 which is the farthest point on the active area 1001 from the reference plane 1099. A projection 1076 of the apex 1006 onto the reference plane 1099 is illustrated.

First and second directions 1051 and 1052 in the reference plane 1099 are illustrated. Each of the first and second directions 1051 and 1052 are in the reference plane 1099 and pass through the projection 1076 of the apex 1006 onto the reference plane 1075. First and second directions 1016 and 1017 in a tangent plane at the apex 1006 are illustrated in FIG. 10A. First direction 1016 may be parallel to first direction 1051, and second direction 1017 may be parallel to second direction 1052. Typically, properties of the active area 1001 of an optical film can be equivalently specified in terms of first and second directions in the reference plane and in terms of first and second directions in the tangent plane.

In general, when the optical film 1001 has some specified variations along orthogonal first and second directions, the first and second directions 1051 and 1052 can be taken to be any orthogonal directions where optical film 1001 has the specified variations. In some cases, it is convenient to specifically define the first and second directions 1051 and 1052 in terms of properties of the active area 1001. There are at least two useful definitions of the first and second directions 1051 and 1052.

In some embodiments, properties of the active area 1001 (e.g., first and second sag to diameter ratios described further elsewhere herein) are specified relative to first and second directions 1051 and 1052 where the second direction 1052 is along a shortest distance between opposing sides of the projected area 1075 through the projection 1076 of the apex 1006 onto the reference plane 1099 and the first direction 1051 is along an orthogonal direction in the reference plane 1099 through the projection 1076 of the apex 1006.

In some embodiments, the active area 1001 is a reflective polarizer. In some embodiments, properties of the reflective polarizer (e.g., first and second sag to diameter ratios described further elsewhere herein) are specified relative to first and second directions 1016 and 1017 where the first direction 1016 is along a block axis of the reflective polarizer at the apex 1006 and the second direction 1017 is along the pass axis of the reflective polarizer at the apex 1006.

Planes parallel to the reference plane 1099 that satisfy the conditions that the optical film and the plane do not intersect and that at least a majority of the total area of the optical film is concave toward the plane result in equivalent definitions of first and second directions. If there is more than one non-parallel plane having a same maximum projected area and satisfying these conditions, then the first and second directions may be taken to be orthogonal directions where the specified variations (e.g., sag ratios) hold and which are in a plane parallel to one of the planes having the maximum projected area. If one of these planes results in apex closer to a center of the film along each of the first and second directions as defined relative to that plane than the other planes having the maximum projected area, then that plane may be used to define the first and second directions.

In some embodiments, properties of an optical film are specified for first and second curves or along the first and second curves. The first curve may be given as an intersection of the optical film with a first plane orthogonal to the second direction and to the reference plane. The first plane may contain the first direction and may contain an apex of the optical film. Similarly, the second curve may be an intersection of the optical film with a second plane orthogonal to the first direction and to the reference plane. The second plane may contain the second direction and may contain the apex of the optical film. Here, the first and second directions may correspond to the first and second directions 1051 and 1052 or may correspond to the first and second directions 1016 and 1017.

FIG. 10B shows a first plane 1098 which is orthogonal to the second direction 1052 and to the reference plane 1099. In the illustrated embodiment, the first plane 1098 contains the first direction 1051 and the apex 1006. A first curve 1010 that is an intersection of the optical film active area 1001 with the first plane 1098 is illustrated.

FIG. 10C shows a second plane 1097 which is orthogonal to the first direction 1051 and to the reference plane 1099. In the illustrated embodiment, the second plane 1097 contains the second direction 1052 and the apex 1006. A second curve 1020 that is an intersection of the optical film active area 1001 with the second plane 1097 is illustrated. In some embodiments, the intersection of the first and second planes 1098 and 1097 defines a line 1088 which is normal to the active area 1001 at an intersection of the first and second curves 1010 and 1020.

As previously discussed, in some cases, it is useful to characterize the shape of the optical film in terms of Gaussian curvature and/or total curvature. The Gaussian curvature is the product of the principle curvatures. For example, if the principle curvatures at the apex 1006 of the active area 1001 of an optical film occur in the first and second planes 1098 and 1097, the Gaussian curvature at the apex can be expressed as the product of the curvatures at the apex 1006 of the first and second curves 1010 and 1020. If, in addition, the first and second curves 1010 and 1020 have radii of curvature of r1 and r2 at the apex 1006, the Gaussian curvature at the apex can be expressed as $1/(r1*r2)$. In some embodiments, each location over at least 80%, or at least 90%, or at least 95% of the total area of the optical film has a Gaussian curvature of at least 0.0001 $cm^{-2}$, or at least 0.001 $cm^{-2}$, or at least 0.005 $cm^{-2}$. In some embodiments, each location over at least 80%, or at least 90%, or at least 95% of the total area of the optical film has a Gaussian curvature of no more than 100 $cm^{-2}$, or no more than 1 $cm^{-2}$, or no more than 0.2 $cm^{-2}$. As previously discussed, the curvature of the active area of the optical film can also be characterized in terms of the total curvature which is the surface integral of the Gaussian curvature of the active area over the total area of the active area. In some embodiments, the active area of the optical film has a total curvature of at least 0.25, or at least 0.5, or at least 1, or at least 2, or at least 3. In some embodiments, the total curvature is no more than 10, or no more than 9, or no more than 8.

As illustrated in FIG. 10D, in some embodiments, the sag to diameter ratio of a the active area 1001 of a curved optical film may be specified in terms of the sag to diameter ratio of the portion of the active area 1001 of an optical film that maps to the largest circle 1003 that can be inscribed within the boundary of a projection 1075 of the active area 1001 of the optical film on the reference plane 1099.

The variation in physical and/or optical characteristics within the portion of the active area can be expressed as a function of the sag to diameter ratio of the portion of the active area as discussed above. The optical characteristics discussed herein may be expressed as a function of sag to diameter ratio (S/D) which may be either of the first or the second sag to diameter ratios (S1/D1 or S2/D2) as previously discussed.

Figure 10E:
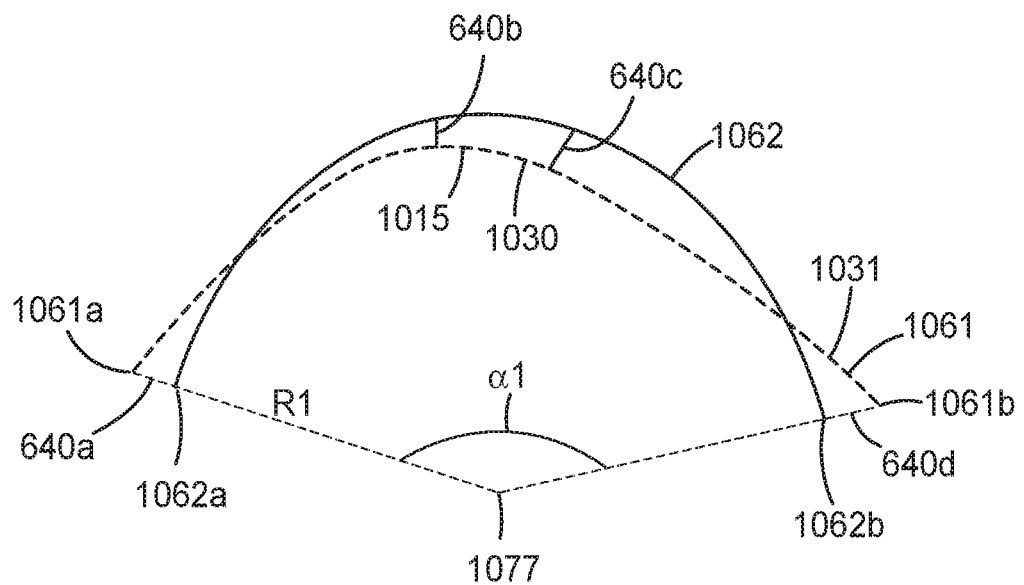
FIG. 10E is a schematic illustration of a first curve and a best-fit first circular arc in accordance with some embodiments.

FIG. 10E is a schematic illustration of a first curve 1061 and a best-fit first circular arc 1062. First curve 1961 may correspond to first curve 1010, for example. The best-fit first circular arc 1062 subtends an angle $\alpha 1$ at the center of curvature 1077 of the first circular arc 1061. The angle $\alpha 1$ is determined by the first curve 1061 since both a longer and a shorter circular arc would provide a poorer fit to the first curve 1061. The first circular arc 1062 has a radius R1 which is a distance from any point on the best-fit first circular arc 1062 (e.g., a first endpoint 1062a) to the center of curvature 1177. In some embodiments, the best-fit first circular arc 1120 is the circular arc that minimizes a sum of squared distances along normal vectors (e.g., distances along vectors 640a-640d) from the first circular arc 1062 to points on the first curve 1061. In some embodiments, a first endpoint 1061a of first curve 1061 is along a first normal vector 640a to the first circular arc 1062 at a first endpoint 1062a of the first circular arc 1062, and an opposite second endpoint 1061b of the first curve 1061 is along a second normal 640d to the first circular arc 1062 at an opposite second endpoint 1062b of the first circular arc 1062. In some embodiments, the points on the first curve 1061 used in the best-fit minimization are selected from a predetermined set of points uniformly distributed over the first curve 1061. In some embodiments, the points on the first circular arc 1062 used in the minimization are selected from a predetermined set of points uniformly distributed over the first circular arc 1062. In some embodiments, the predetermined set of points is a set of 10 to 500 points.

Figure 10F:
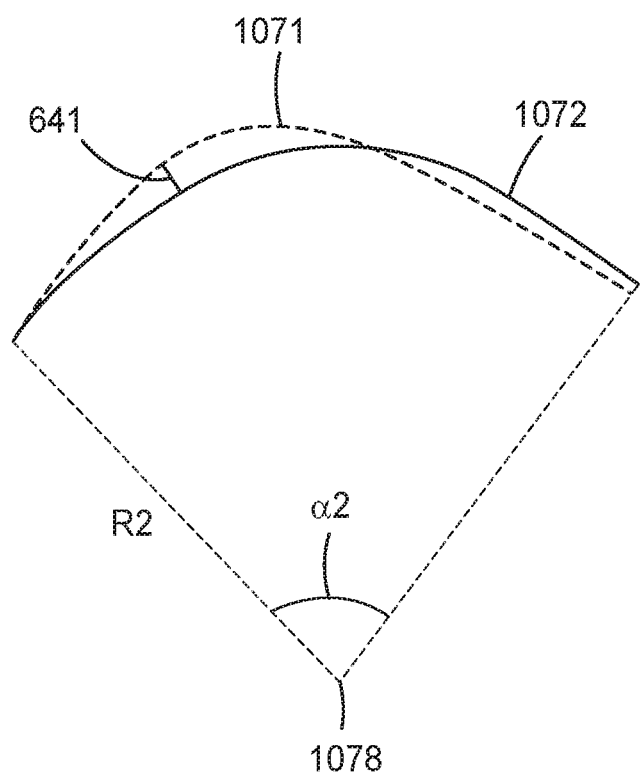
FIG. 10F is a schematic illustration of a second curve and a best-fit second circular arc in accordance with some embodiments.

FIG. 10F is a schematic illustration of a second curve 1071 and a best-fit second circular arc 1072. Second curve 1072 may correspond to second curve 1020, for example. The best-fit circular arc subtends an angle $\alpha 2$ at the center of curvature 1078 of the second circular arc 1072. The angle $\alpha 2$ is determined by the second curve 1071 since both a longer and a shorter circular arc would provide a poorer fit to the second curve 1071. The second circular arc 1072 has a radius R2 which is a distance from any point on the best-fit second circular arc 1072 to the center of curvature 1078. The best fit can be determined as described for the first curve 1061. In some embodiments, the best-fit second circular arc 1072 is the circular arc that minimizes a sum of squared distances along normal vectors (e.g., distances along vector 641) from the second circular arc 1072 to points on the second curve 1071. In some embodiments, a first endpoint of the second curve 1071 is along a first normal vector to the second circular arc 1072 at a first endpoint of the second circular arc 1072, and an opposite second endpoint of the second curve 1071 is along a second normal to the second circular arc 1072 at an opposite second endpoint of the second circular arc 1072. In some embodiments, the points on the second curve 1071 used in the best-fit minimization are selected from a predetermined set of points uniformly distributed over the second curve 1071. In some embodiments, the points on the second circular arc 1072 used in the minimization are selected from a predetermined set of points uniformly distributed over the second circular arc 1072. In some embodiments, the predetermined set of points is a set of 10 to 500 points.

A center 1015 of the active area of the optical film and first and second location 1030 and 1031 on the first curve 1061 are illustrated in FIG. 10E. The center 1015 may be where the first and second curves 1061 and 1071 cross and may be at an apex of the optical film as described further elsewhere herein. The second location 1031 is separated from the first location 1030 by a distance along the first curve 1061 of at least 0.6 R1, or at least 0.7 R1, or at least 0.8 R1, or at least R1, or at least 1.2 R1. A distance from the center 1015 of the optical film to the first location 1030 along the first curve is no more than 0.2 R1, or no more than 0.1 R1. A distance from the second location 1031 to an edge of the optical film (endpoint 1061b) along the first curve 1061 is no more than 0.2 R1, or no more than 0.1 R1. In some embodiments, the active area of the optical film has a first thickness at the first location 1030 and a second thickness at the second location 1031, where the first and second thicknesses differ by no more than 5%, or no more than 3%, or no more than 2%. In some embodiments, the optical film has a first long wavelength band edge at the first location 1030 and a second long wavelength band edge at the second location 1031, where the first and second long wavelength band edges differ by no more than 5%, or no more than 3%, or no more than 2%.

The largest angles $\alpha 1$ and $\alpha 2$ achievable by the methods of the present description are higher than those achievable in conventional thermoforming methods. For example, in some embodiments, $\alpha 1$ is greater than 180 degrees, or greater than 185 degrees, or greater than 190 degrees, or greater than 195 degrees, or greater than 200 degrees. Such large angles may be useful in head-mounted display applications, for example. In other embodiments, $\alpha 1$ is less than or equal to 180 degrees. In some embodiments, $\alpha 1$ is at least 90 degrees, or at least 100 degrees, or at least 110 degrees, or at least 120 degrees, or at least 130 degrees, or at least 140 degrees, or at least 150 degrees, or at least 160 degrees, or at least 170 degrees, or at least 180 degrees. In some embodiments, $\alpha 2$ is at least 30 degrees, or at least 40 degrees, or at least 50 degrees, or at least 60 degrees, or at least 70 degrees, or at least 80 degrees, or at least 90 degrees, or at least 100 degrees, or at least 110 degrees, or at least 120 degrees. In some embodiments, $\alpha 1$ is no more than 350 degrees, or no more than 320 degrees, or no more than 300 degrees, or no more than 280 degrees. In some embodiments, $\alpha 2$ is no more than 220 degrees, or no more than 200 degrees, or no more than 180 degrees, or no more than 160 degrees, or no more than 140 degrees. In some embodiments, $\alpha 1$ is greater than or equal to $\alpha 2$.

Figure 11:
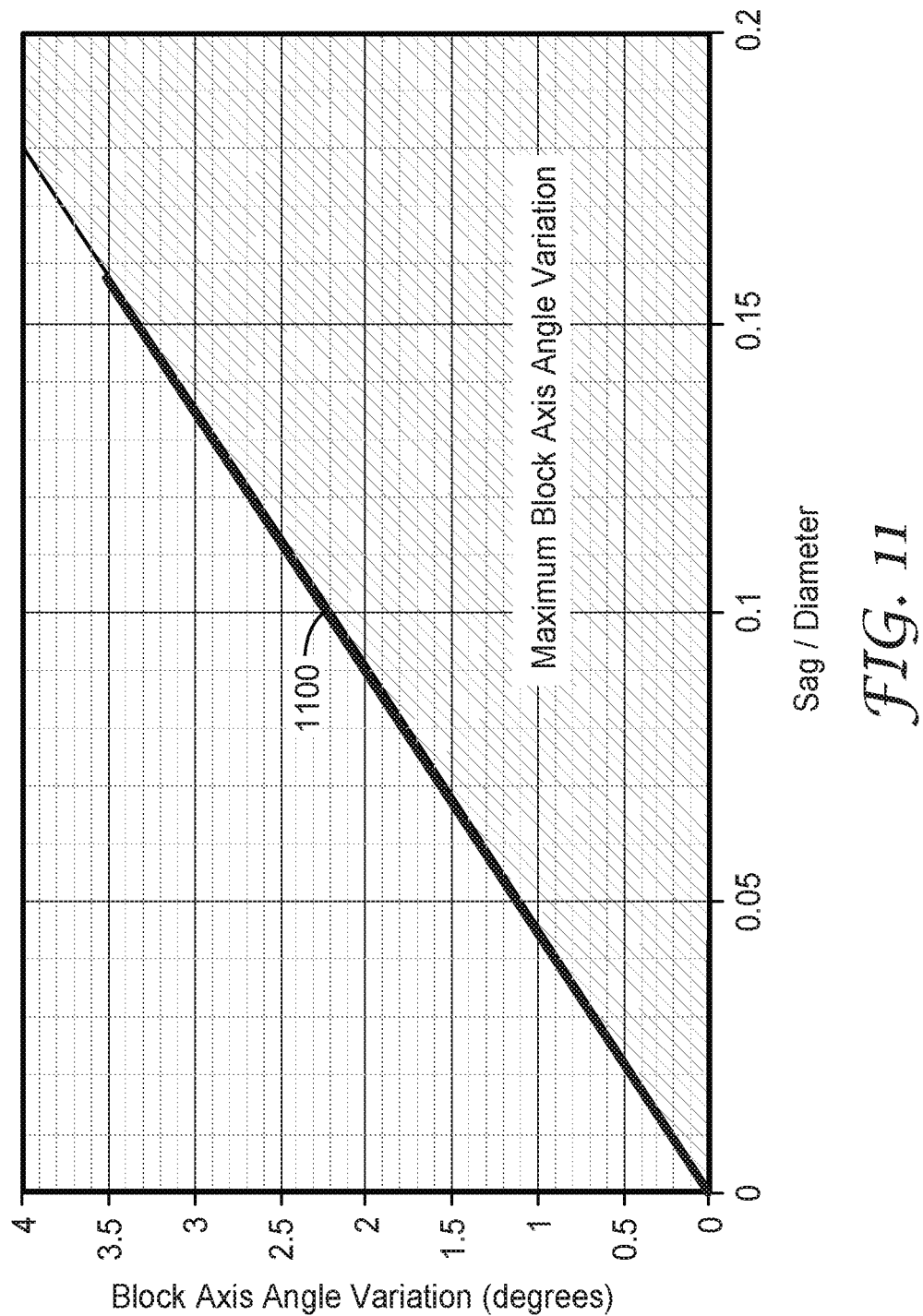
FIG. 11 shows a plot of maximum variation in polarization block axis angle of a portion of an active area of an optical film as a function of sag to diameter ratio (S/D) of the portion of the active area in accordance with some embodiments.

FIG. 11 shows a graph 1100 of maximum variation in polarization block axis angle of a portion of an active area of an optical film as a function of sag to diameter ratio (S/D) of the portion of the active area in accordance with some embodiments. The polarization block axis angle with respect to a reference axis, as discussed in connection with FIGS. 2A and 2B, can be measured for each point of the portion of the active area as discussed above. The maximum variation in the polarization block axis angle is $\beta_{max}-\beta_{min}$, where $\beta_{max}$ is the maximum polarization block axis angle and $\beta_{min}$, is the minimum polarization block axis angle. The maximum variation in the polarization block axis angle of the portion of the active area is $\beta_{max}-\beta_{min}$, can be expressed mathematically as 22(S/D). According to various embodiments, S/D may be greater than 0.05, greater than 0.075, greater than 0.1, greater than 0.125, greater than 0.2, greater than 0.3, or even greater than 0.4. The portion of the optical film may be curved so that the optical film has a substantially spherical or a substantially paraboloid shape.

Figure 12:
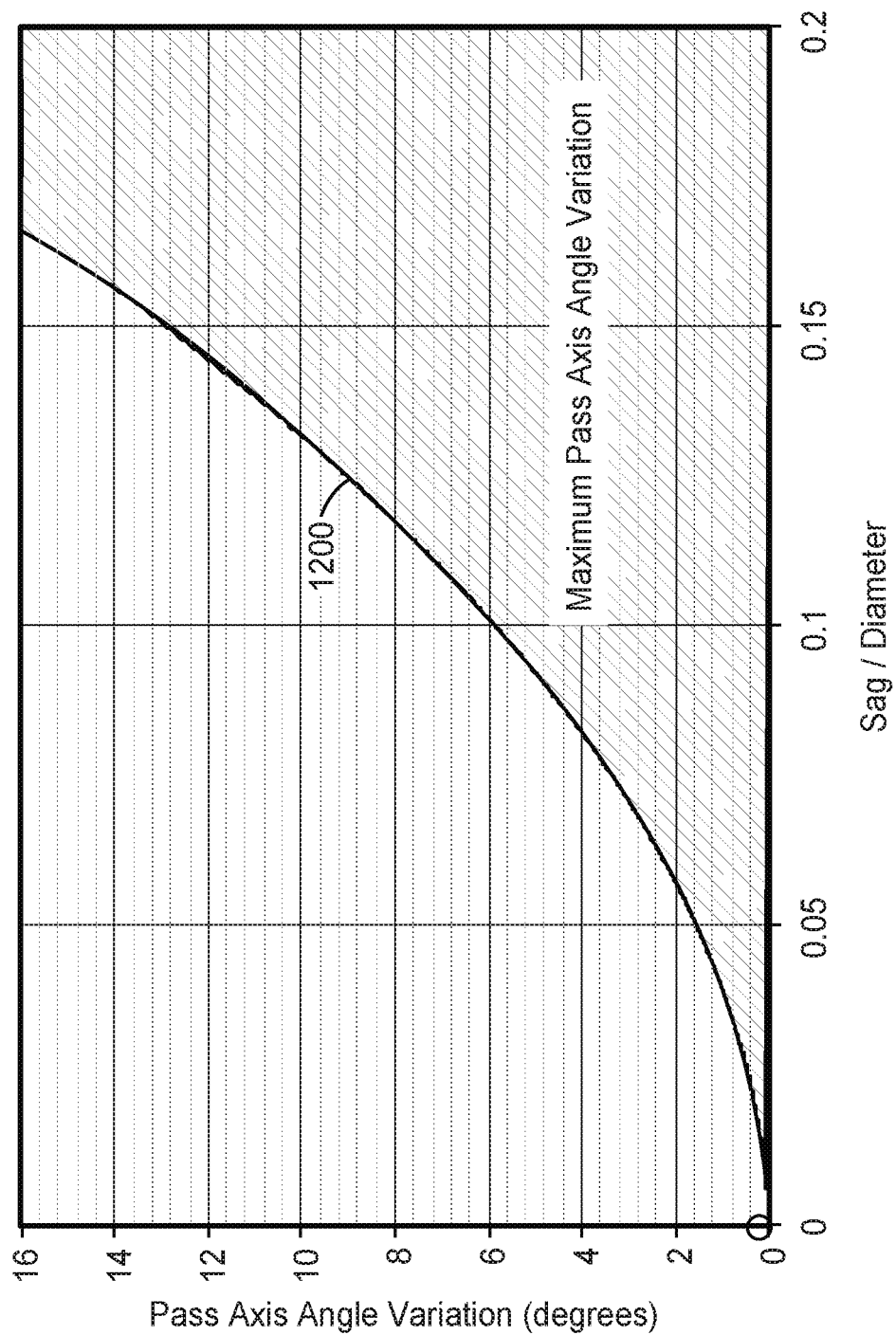
FIG. 12 shows a plot of maximum variation in polarization pass axis angle of a portion of an active area of an optical film as a function of sag to diameter ratio (S/D) of the portion of the active area in accordance with some embodiments.

FIG. 12 shows a graph 1200 of maximum variation in polarization pass axis angle of a portion of an active area of an optical film as a function of sag to diameter ratio (S/D)

of the portion of the active area in accordance with some embodiments. The polarization pass axis angle with respect to a reference axis, as discussed in connection with FIGS. 2A and 2B, can be measured for each point of the portion of the active area as discussed above. The maximum variation in the polarization pass axis angle is $\alpha_{max}-\alpha_{min}$, where $\alpha_{max}$ is the maximum polarization block axis angle and $\alpha_{min}$, is the minimum polarization block axis angle. The maximum variation in the polarization block axis angle of the portion of the active area is $\alpha_{max}-\alpha_{min}$, can be expressed mathematically as $550(S/D)^2+3.5(S/D)$ degrees. As previously discussed, the portion of the active area maps onto a largest circle that can be inscribed within the boundary of the projection of the active area on the reference plane. According to various embodiments, S/D is greater than 0.05, greater than 0.075, greater than 0.1, or greater than 0.125, greater than 0.2, greater than 0.3, or even greater than 0.4. The portion of the optical film may have a substantially spherical or a substantially paraboloid shape. In some embodiments, a maximum variation of linear polarization block or pass axis angles is less than 2.5, less than 2.0, less than 1.5, or even less than 1 degrees for all points of the active area.

Figure 13:
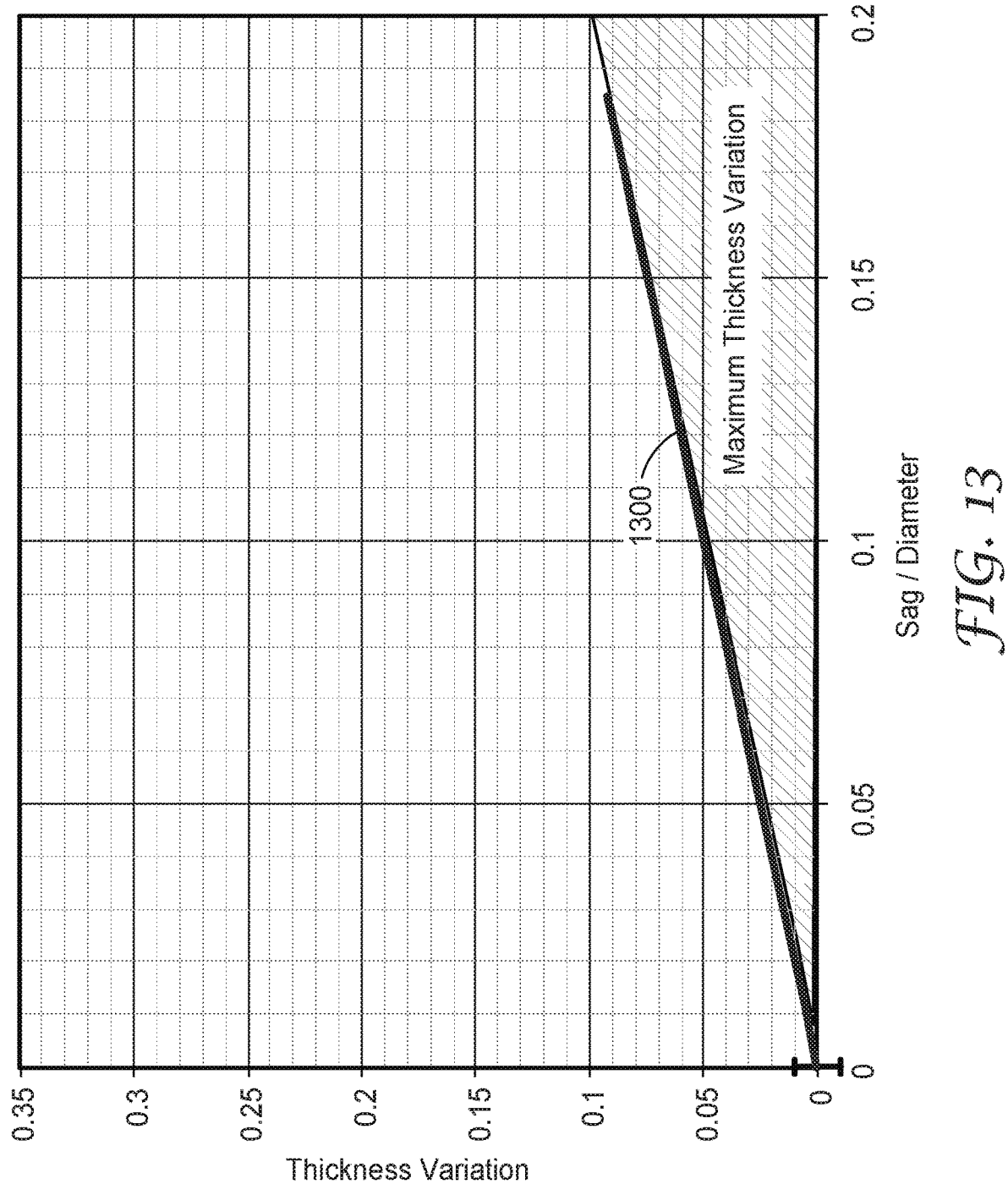
FIG. 13 is a graph of the thickness variation of a portion of an active area of an optical film in accordance with some embodiments.

FIG. 13 is a graph 1300 of the thickness variation of a portion of an active area of an optical film. The portion of the active area is curved along a first direction and along an orthogonal second direction. The portion of the active area maps onto a largest circle inscribed within a boundary of a projection of the active area on a reference plane. The portion of the active area has a sag to diameter ratio, S/D, a minimum thickness, $t_{min}$, a maximum thickness, $t_{max}$, and an average thickness, $t_{ave}$. The variation in thickness, $(t_{max}-t_{min})/t_{ave}$ in the portion of the active area is less $\frac{1}{2}*(S/D)$. According to various embodiments, S/D may be greater than 0.025, greater than 0.05, greater than 0.075, greater than 0.1, or greater than 0.125, greater than 0.2, greater than 0.3, or even greater than 0.4, for example. The portion of the active area may have a substantially spherical or a substantially paraboloid shape.

Figure 14:
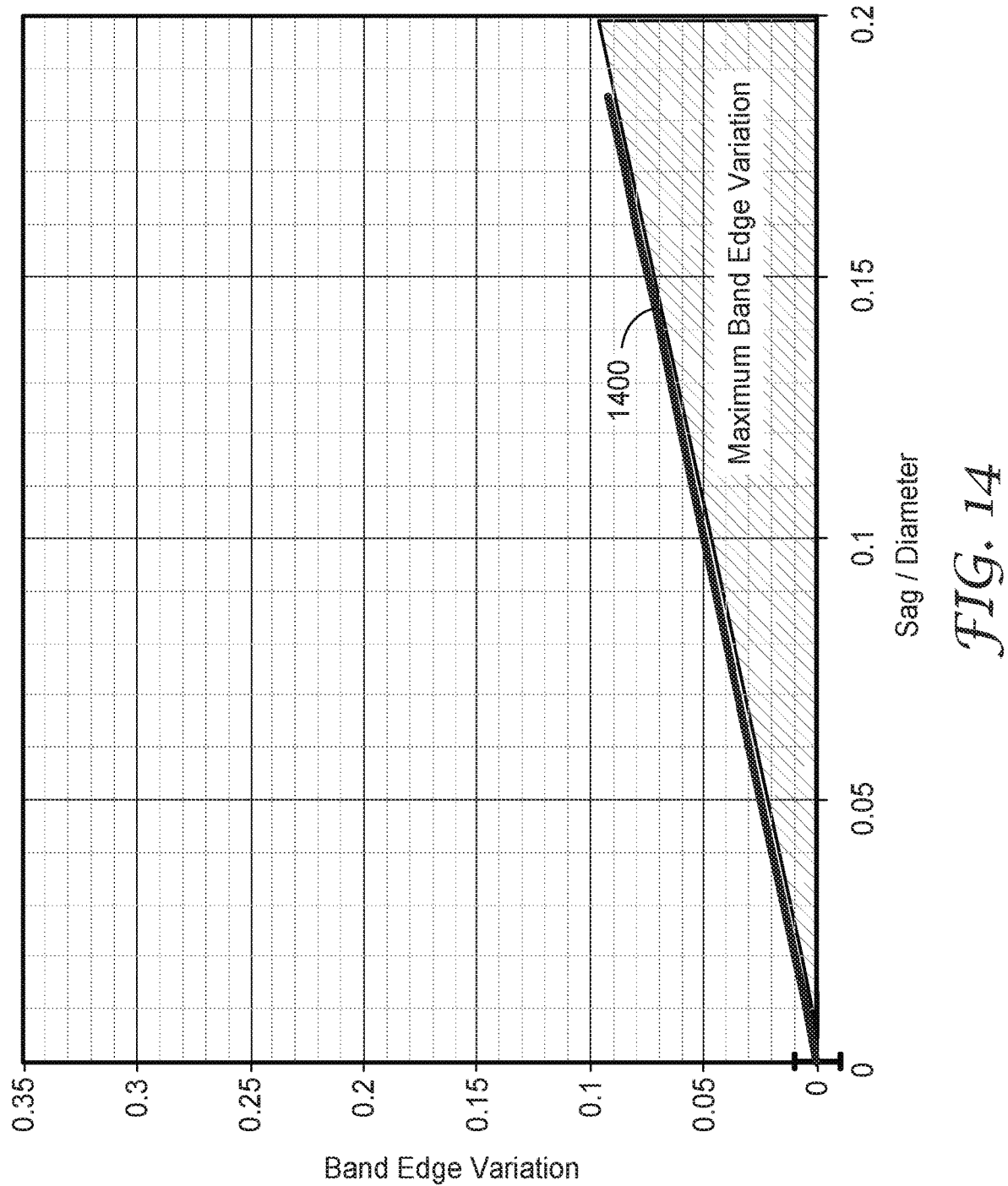
FIG. 14 is a graph of the variation of the band edge for a portion of an active area of an optical film in accordance with some embodiments.

FIG. 14 is a graph 1400 of the variation of the band edge for a portion of an active area of an optical film. The variation in the band edge may be associated with either the long wavelength passband edge or the short wavelength passband edge. The portion of the active area is curved along a first direction and along an orthogonal second direction. The portion of the active area maps onto a largest circle inscribed within a boundary of a projection of the active area on a reference plane. The portion has area has a sag to diameter ratio, S/D, a minimum band edge, $\lambda_{Emin}$, a maximum band edge, $\lambda_{Emax}$, and an average band edge, $\lambda_{Eave}$. The variation in band edge, $(\lambda_{Emax}-\lambda_{Emin})/\lambda_{Eave}$ in the portion of the active area is less $\frac{1}{2}*(S/D)$. According to various embodiments, S/D may be greater than 0.025, greater than 0.05, greater than 0.075, greater than 0.1, or greater than 0.125, greater than 0.2, greater than 0.3, or even greater than 0.4, for example. The portion of the active area may have a substantially spherical or a substantially paraboloid shape. The variation in the band edge may be a variation in the upper and/or lower band edge, for example.

As the total curvature (or sag to diameter ratio) of an optical film increases, it becomes increasingly difficult to manufacture the optical film and retain low variation in physical and/or optical characteristics. For example, a molded curved optical film comprising an optical film with high total curvature may have an unacceptably large variation in polarization block axis angle, polarization pass axis orientation, thickness, band edge, and/or other physical and/or optical characteristics. One solution to this manufacturing difficulty is to form the curved optical film from multiple segments of optical film. The optical film segments are arranged such that edges of adjacent segments form one or more seams. The adjacent segments may be joined together at seams. Each individual segment can have a sag to diameter or total curvature which is less than the sag to diameter ratio or total curvature of the curved optical film. Forming optical films from optical film segments can reduce the variation in the optical and/or physical characteristics of the optical film and can reduce or eliminate buckling of the film.

FIGS. 15A through 20B provide several examples of segmented optical films in accordance with some embodiments. The illustrated optical films of FIGS. 15 through 20B are curved in two orthogonal directions. The approaches described herein can be applied optical films comprising segments of various shapes, such as flat segmented optical films, or segmented optical films having a three-dimensional shape, e.g., spherical, paraboloid, cylindrical, aspherical, or other three-dimensional shape. The number and/or configuration of the segments that make up the optical films is not limited to those shown here, as many other segment configurations are possible and are included within the scope of the disclosure. Any number of segments can be used to form the optical film, although in many implementations, the number of segments is less than 20 or less than 5 and/or greater than or equal to 2.

In some embodiments, optical and/or physical characteristics of the segments may be substantially uniform from segment-to-segment. For example, the block axis orientation angle, pass axis orientation angle, band edge, reflectance, transmittance, thickness, etc. may be substantially uniform from segment-to-segment. In some embodiments, the optical and/or physical characteristics of the segments of the optical film may vary from segment-to-segment to achieve a desired functionality of the optical device incorporating the optical film.

Optical films as discussed herein may be manufactured by forming segments of an optical film and arranging the segments to form a surface, e.g., a flat surface or surface that is curved along one direction or along two orthogonal directions. For example, the segments shown in FIGS. 15A through 20B may be cut from an optical film and then arranged into a curved shape in a mold or on a form. According to some embodiments, portions of the initially flat optical film are removed to allow the film to conform to a curved surface with minimal stretching but creating seams between different regions of the same optical film. In some embodiments, an optical layer may be disposed over the segments after they are arranged in the mold or on the form. The optical films shown as examples in FIGS. 15A through 20B may be optically rotationally symmetric, although rotationally asymmetric optical films are also possible and are included within the scope of the disclosure.

Figure 15A:
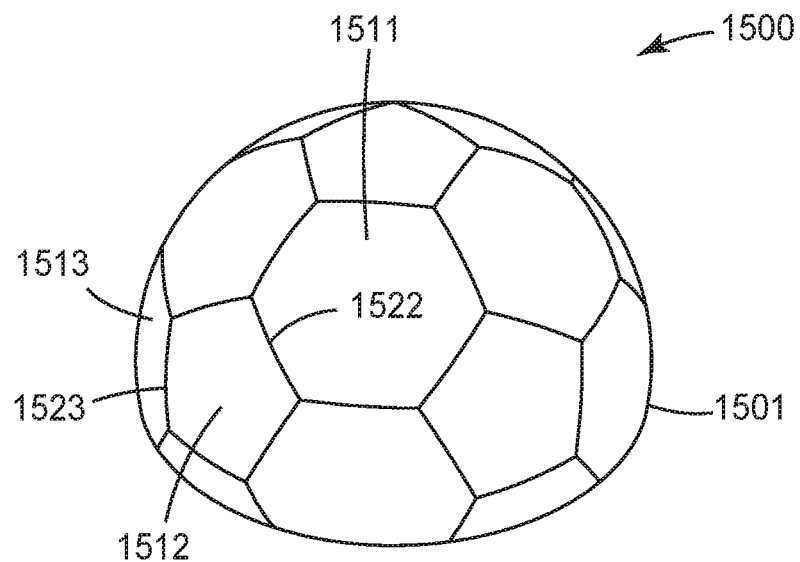
FIG. 15A shows the active area of an optical film comprising a plurality of separate polygonal optical film segments in accordance with some embodiments.
Figure 15B:
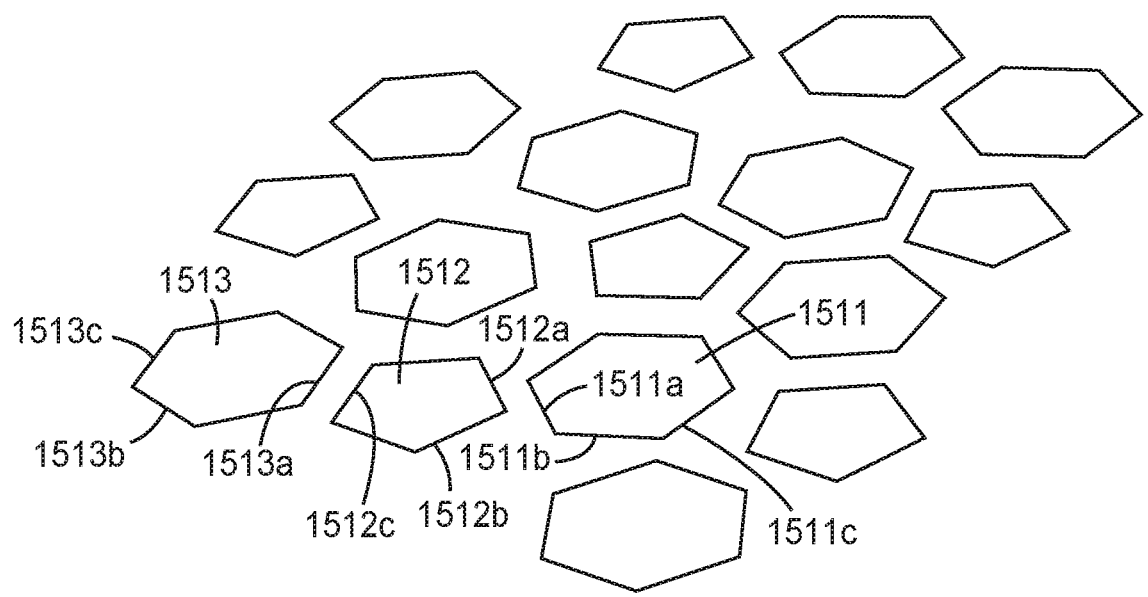
FIG. 15B shows an exploded view of the optical film segments of the active area of the optical film of FIG. 15A.

FIG. 15A shows the active area 1501 of an optical film 1500 comprising a plurality of separate polygonal optical film segments 1511, 1512, 1513 of an optical film. FIG. 15B shows an exploded view of the optical film segments of 1511, 1512, 1513 of the active area 1501 of FIG. 15A. As best seen in FIG. 15B, each segment 1511, 1512, 1513 has at least one edge 1511a, 1511b, 1511c, 1512a, 1512b, 1512c, 1513a, 1513b, 1513c. To form the optical film 1500, the edges 1511a, 1511b, 1511c, 1512a, 152b, 1512c, 1513a, 1513b, 1513c are arranged to form seams adjacent segments. For example, as shown in FIGS. 15A and 15B, edge 1511a of segment 1511 and edge 1512a of segment 1512 are arranged to form seam 1522 between adjacent segments 1511 and 1512. Edge 1512c of segment 1512 and edge 1513a of segment 1513 are arranged to form seam 1523 between adjacent segments 1512 and 1513. The segments 1511, 1512, 1513 are arranged to form a three-dimensional surface of the active area 1501 that is curved along two orthogonal axes. In some embodiments, the surface of the active area may be a spherical or paraboloid surface.

Figure 16A:
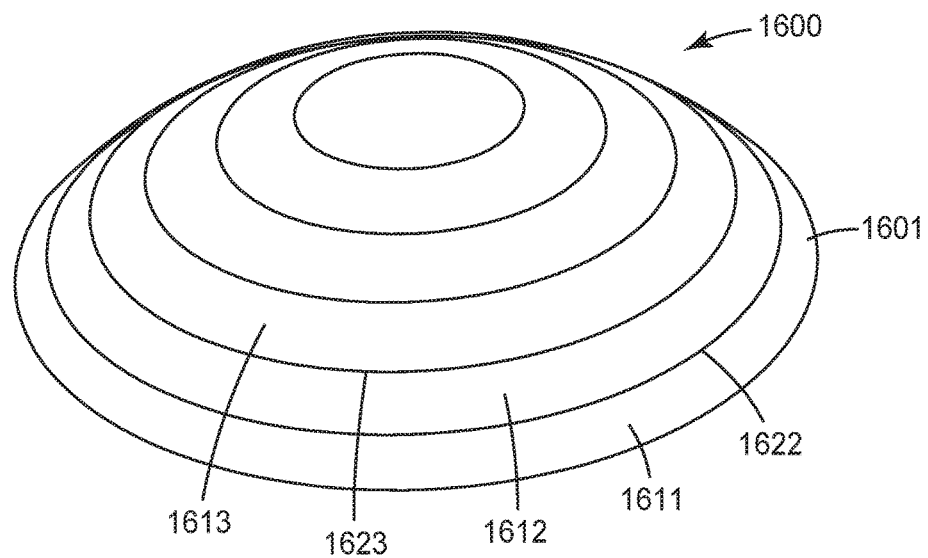
FIG. 16A shows the active area of an optical film comprising a plurality of separate concentric segments of an optical film in accordance with some embodiments.
Figure 16B:
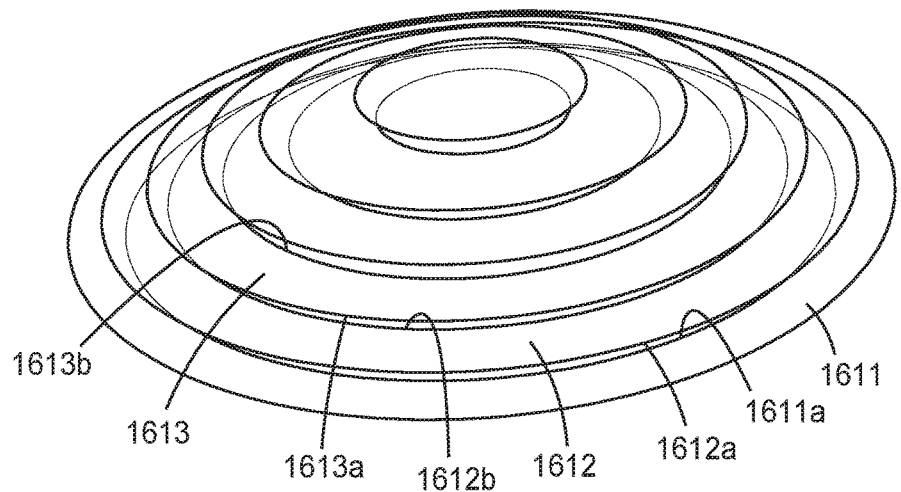
FIG. 16B shows an exploded view of the optical film segments of the optical film of FIG. 16A.

FIG. 16A shows the active area 1601 of an optical film 1600 comprising a plurality of separate concentric segments 1611, 1612, 1613 of an optical film. FIG. 16B shows an exploded view of the optical film segments of 1611, 1612, 1613. Each segment 1611, 1612, 1613 has at least one edge 1611a, 1612a, 1612b, 1613a, 1613b. To curved active surface, the edges 1611a, 1612a, 1612b, 1613a, 1613b of the segments 1611, 1612, 1613 are arranged to form seams 1622, 1623 between adjacent segments 1611, 1612, 1613. For example, as shown in FIGS. 16A and 16B, edge 1611a of segment 1611 and edge 1612a of segment 1612 are arranged to form seam 1622. Edges 1612b and 1613a are arranged to form seam 1623 between adjacent segments 1612 and 1613. As shown in FIG. 16A, the concentric optical film segments 1611, 1612, 1613 can be arranged to form a curved surface of an active area 1601.

Figure 17A:
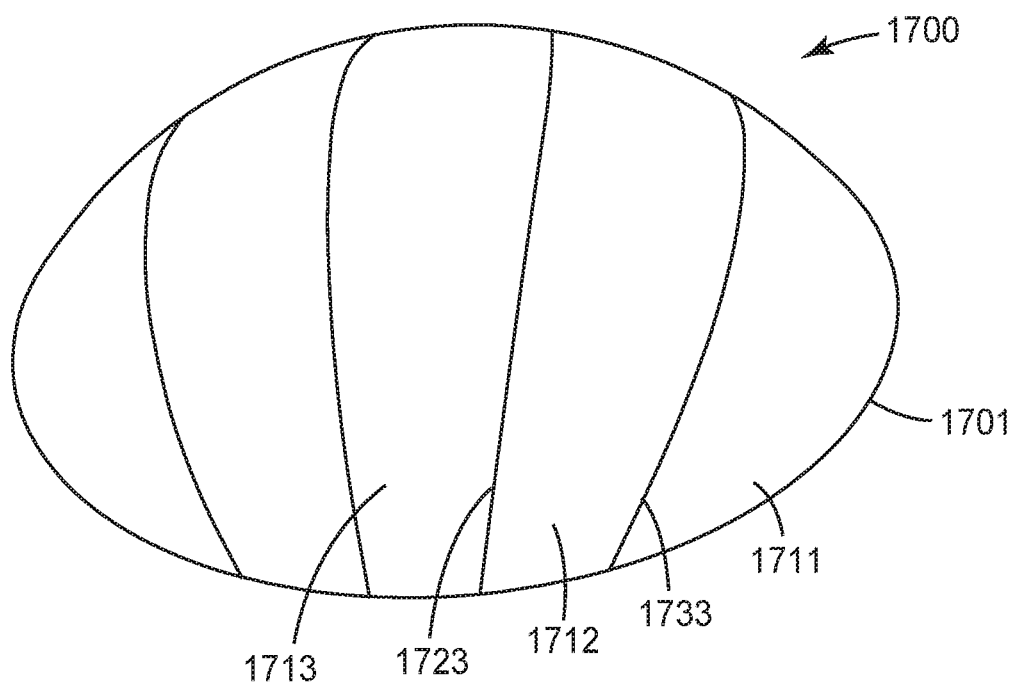
FIG. 17A shows the active area of an optical film comprising a plurality of separate segments in accordance with some embodiments.
Figure 17B:
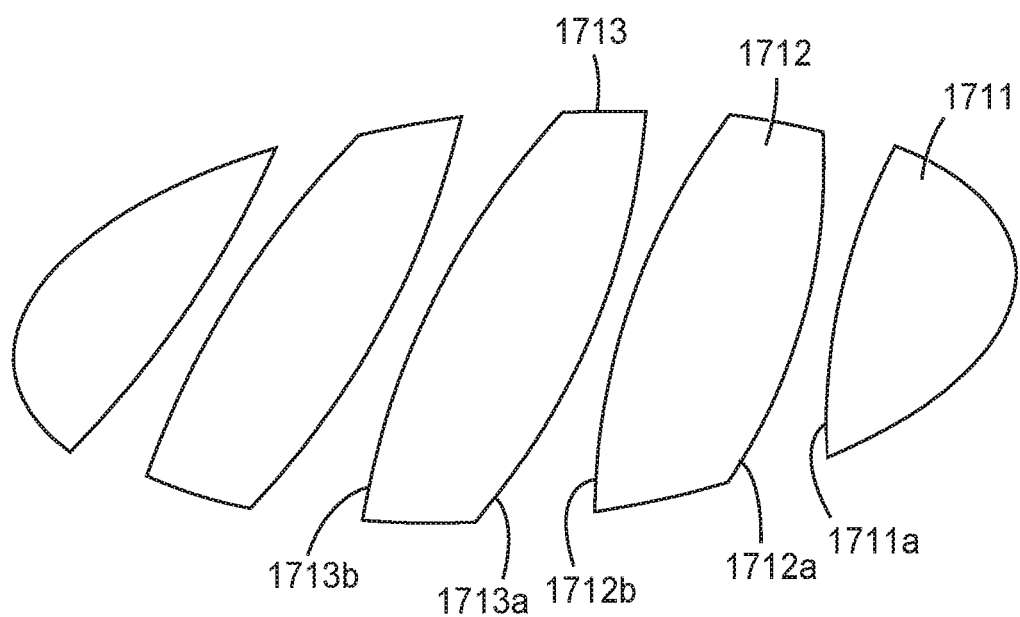
FIG. 17B shows an exploded view of the separate segments of the optical film of FIG. 17A.

FIG. 17A shows the active area 1701 of an optical film 1700 comprising a plurality of separate segments 1711, 1712, 1713 of an optical film wherein the segments 1711, 1712, 1713 are arranged to form an active area that is curved along two orthogonal axes. FIG. 17B shows an exploded view of the separate segments of 1711, 1712, 1713. As shown in FIGS. 17A and 17B, the segments 1711, 1712, 1713 have curved edges 1711a, 1711b, 1712a, 1712b, 1713a, 1713b. Each segment 1711, 1712, 1713 has at least one edge 1711a, 1712a, 1712b, 1713a, 1713b. To form the active area 1701, the edges 1711a, 1712a, 1712b, 1713a of the segments 1711, 1712, 1713 are arranged to form seams 1722, 1723 between adjacent segments 1711, 1712, 1713. For example, as shown in FIGS. 17A and 17B, edge 1711a of segment 1711 and edge 1712a of segment 1712 are arranged to form seam 1722. Edges 1712b and 1713a are arranged to form seam 1723 between adjacent segments 1712 and 1713.

In the embodiments illustrated by FIGS. 15A through 17B, each optical film segment is physically separate from other segments before the segments are arranged to form the active area of the optical film. In some embodiments, as illustrated by FIGS. 18A through 20B, the optical film that forms the active area includes segments that are physically connected to one another. Edges of the connected optical film segments are arranged to form seams of the lens.

Figure 18A:
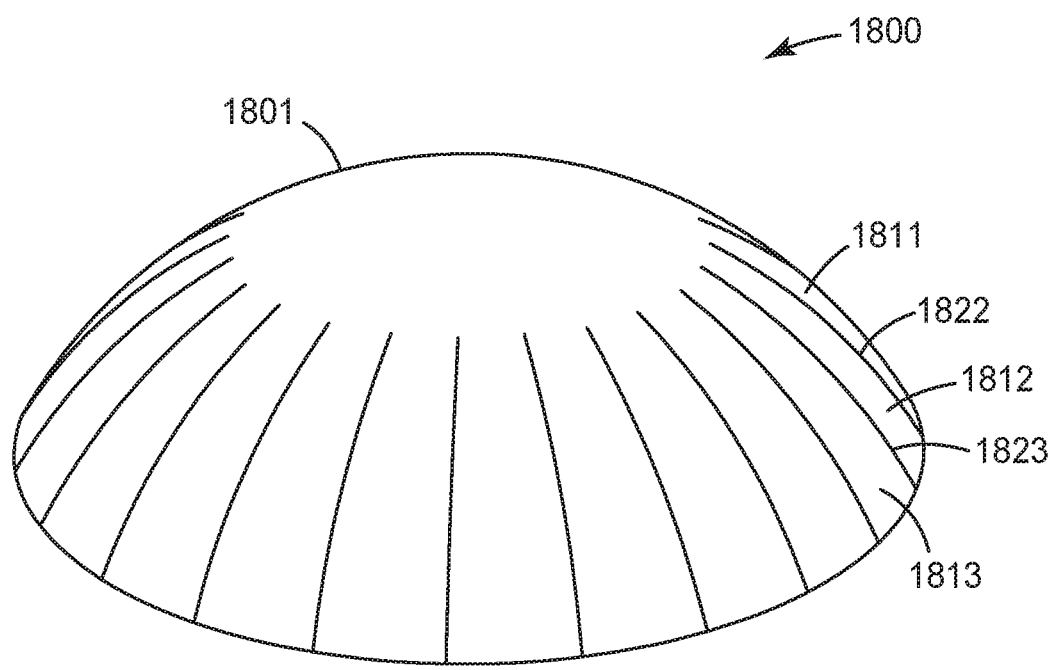
FIG. 18A depicts the three-dimensional surface of an active area of a segmented optical film in accordance with some embodiments.
Figure 18B:
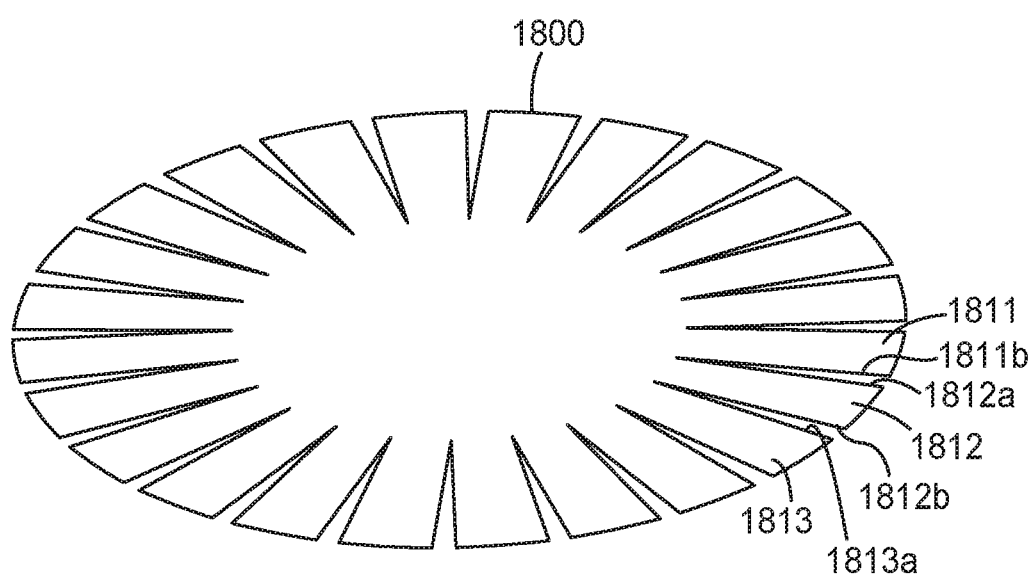
FIG. 18B shows the optical film that forms the curved active area of the optical film of FIG. 18A when the optical film is laid flat.

FIG. 18A depicts the three-dimensional surface of an active area 1801 of a segmented optical film 1800. The active area 1801 is formed from single continuous piece 1810 optical film as shown in FIG. 18B. FIG. 18B shows the optical film 1810 that forms curved active area 1801 when it is laid flat. Optical film 1810 includes connected segments 1811, 1812, 1813. When laid flat, the segments 1810, 1812, 1813 have substantially straight edges 1811a, 1812a, 1812b, 1813a. The optical film segments 1811, 1812, 1813 are connected to one another before the optical film 1810 is formed into the active area 1801 of the optical film 1800. To form the active area 1801, the edges 1811a, 1812a, 1812b, 1813a of the segments 1811, 1812, 1813 of the single continuous piece of optical film 1810 are arranged to form seams 1822, 1823 between adjacent segments 1811, 1812, 1813. For example, as shown in FIGS. 18A and 18B, edge 1811a of segment 1811 and edge 1812a of segment 1812 are arranged to form seam 1822. Edges 1812b and 1813a are arranged to form seam 1823 between adjacent segments 1812 and 1813.

Figure 19A:
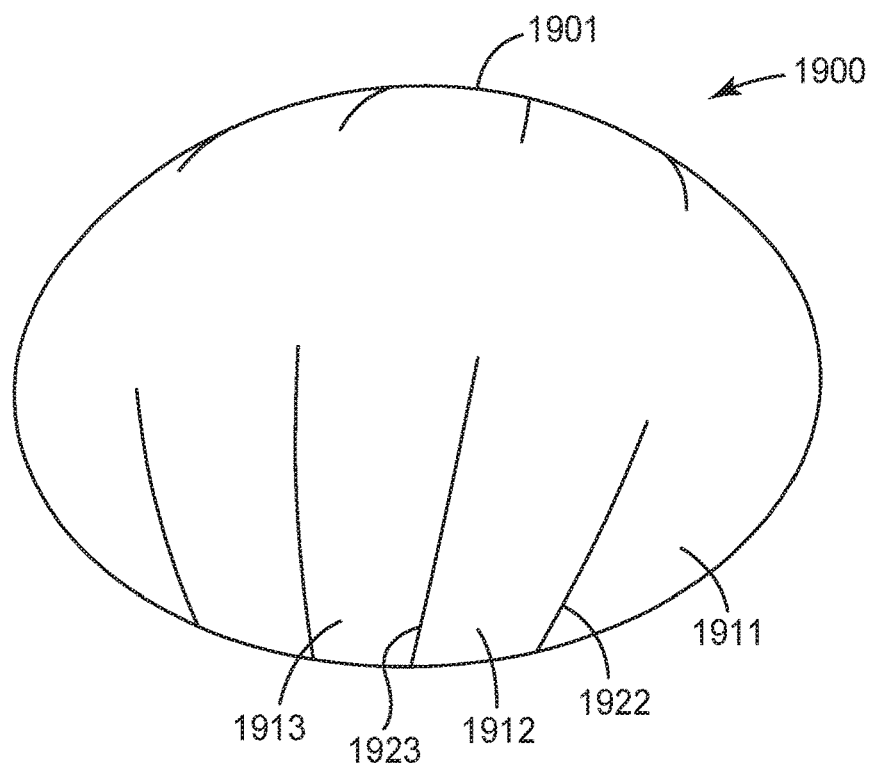
FIG. 19A depicts the three-dimensional surface of an active area of a segmented optical film in accordance with some embodiments.
Figure 19B:
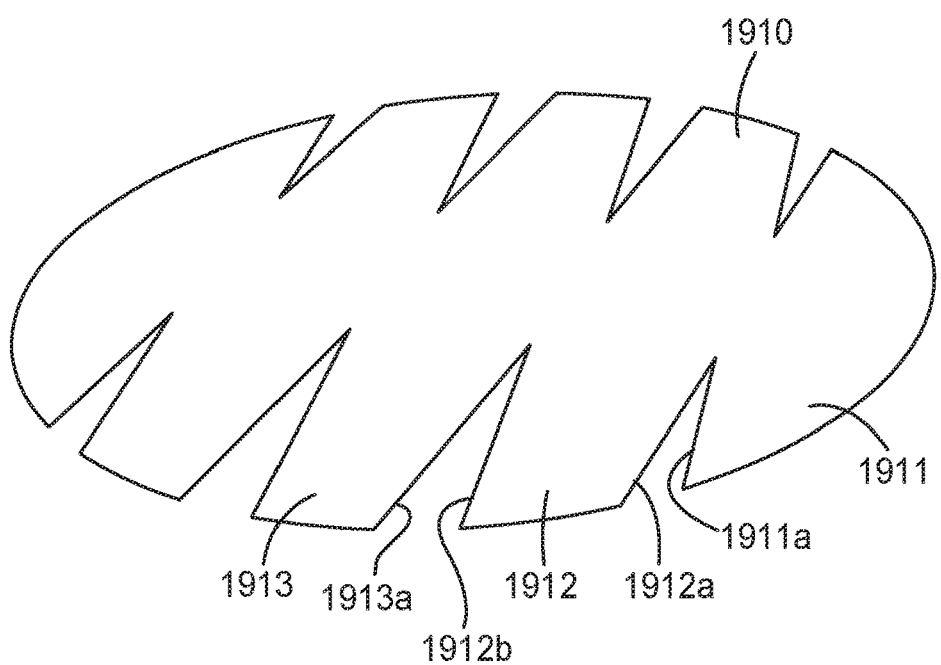
FIG. 19B shows the optical film that forms curved active area of the optical film of FIG. 19A when the optical film is laid flat.

FIGS. 19A and 19B are diagrams that provide an example of an active area 1901 of an optical film 1900 having a surface that is curved in two orthogonal directions. The active area is formed from a single continuous piece of optical film 1910. In this case, when the single piece of optical film 1910 is laid flat, the edges 1911a, 1912a, 1912b, 1913a of the segments are curved. When laid flat, as in FIG. 19B, optical film 1910 includes multiple connected segments 1911, 1912, 1913. To form the active area 1901, the edges 1911a, 1912a, 1912b, 1913a of the segments 1911, 1912, 1913 are arranged to form seams 1922, 1923 between adjacent segments 1911, 1912, 1913. For example, as shown in FIGS. 19A and 19B, edge 1911a of segment 1911 and edge 1912a of segment 1912 are arranged to form seam 1922. Edges 1912b and 1913a are arranged to form seam 1923 between adjacent segments 1912 and 1913.

In some embodiments, it can be useful to position the seams in a peripheral region of the active area of the lens away from the main viewing path of the optical film. FIGS. 18A and 19A provide examples of optical films 1801, 1901 having seams 1822, 1823, 1922, 1923 located in a peripheral region 1801a, 1901a of the active area 1801, 1901. In some examples, a majority (more than 50% of the total length of the seams in the active area) are located in the peripheral region of the active area. In some embodiments, all the seams are in the peripheral region of the active area. In some examples, the central region of the active area is devoid of seams.

Figure 20A:
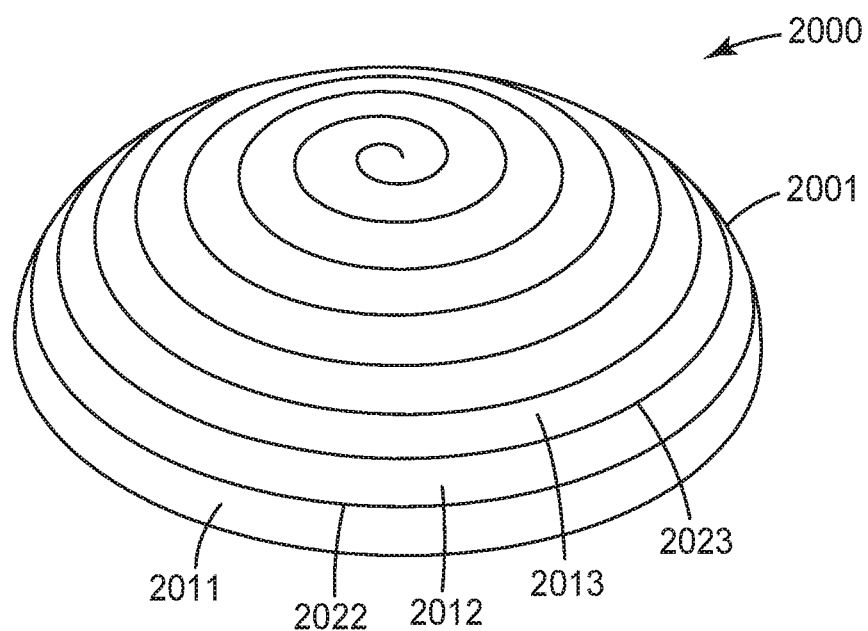
FIG. 20A is a diagram of an optical film having a three-dimensional surface formed from a continuous spiral shaped optical film in accordance with some embodiments.
Figure 20B:
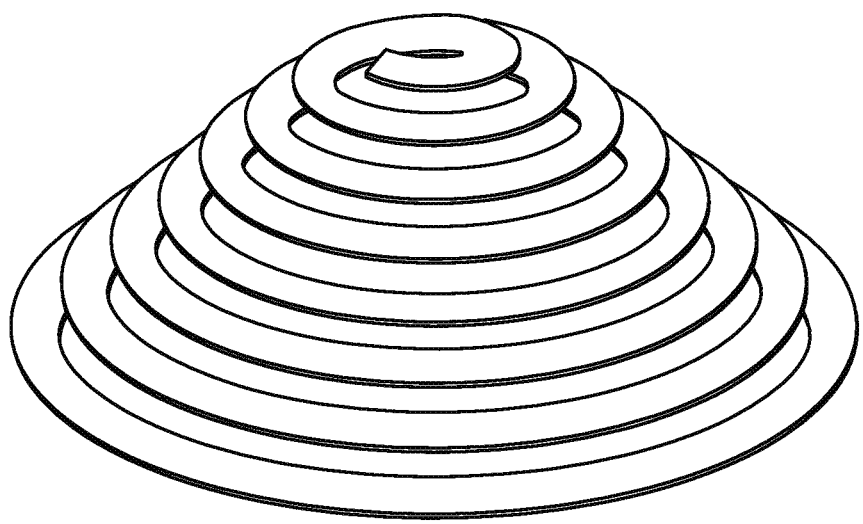
FIG. 20B shows an exploded view of the continuous spiral shaped optical film that forms the curved active surface shown in FIG. 20A.

FIGS. 20A and 20B are diagrams that provide an example of an optical film 2000 having a three-dimensional surface formed from a continuous spiral shaped optical film 2010. FIG. 20B shows an exploded view of the continuous spiral shaped optical film 2010 that forms the curved active surface 2001 shown in FIG. 20A. When formed into the active area 2001 of optical film 2000, edges 2011a, 2012a, 2012b, 2013a of the spiral shaped optical film 2010 forms seams 2022, 2023 between adjacent segments 2011, 2012, 2013 of the optical film 2010. Optical film 2010 includes multiple connected segments 2011, 2012, 2013 with edges 2011a, 2012a, 2012b, 2013a. To form the curved active area 2001, the edges 2011a, 2012a, 2012b, 2013a of the segments 2011, 2012, 2013 are arranged to form seams 2022, 2023 between adjacent segments 2011, 2012, 2013. For example, as shown in FIGS. 20A and 20B, edge 2011a of segment 2011 and edge 2012a of segment 2012 are arranged to form seam 2022. Edges 2012b and 2013a are arranged to form seam 2023 between adjacent segments 2012 and 2013.

In many embodiments, the optical films described are useful to form reflective polarizing lenses (RPLs). For example, a reflective polarizer lens may a segmented multi-layer optical film as discussed above, wherein the multi-layer optical film has multiple layers with differing indices of refraction. For example, a suitable multi-layer optical film is APF (Advanced Polarizing Film) available from 3M Company (St. Paul, Minn.). The lens may be a reflective polarizer lens comprising a segmented wire grid polarizer film, or other type of segmented polarizer film in accordance with embodiments disclosed herein.

The optical films illustrated in FIGS. 15A through 20B may have one or more of the optical and/or physical properties according to the discussion above with reference to the graphs of FIGS. 1A through 14. The optical films shown in FIGS. 15A through 20B can have an overall sag to diameter ratio along an axis that is greater than the sag to diameter ratio of each of the segments that make up the optical film along the same axis. The sag to diameter ratio of the active area of an optical film may be characterized by the sag to diameter ratio of the largest circle that will fit within the active area of the optical film. The sag to diameter ratio of a segment may be characterized by the sag to diameter ratio of the largest circle that will fit within the segment. With this reference in mind, the sag to diameter ratio of the each of the segments that make up the active area optical film may be no more than 90%, no more than 85%, no more than 80%, no more than 70%, or no more than 60% of the sag to diameter ratio of the active area of the optical film.

In many embodiments, the optical films described herein have an active area that is curved in two orthogonal directions as previously discussed herein. Alternatively, in some embodiments, the active area of the optical film may be substantially flat. In some embodiments, the active area of the optical film may be curved along only one direction and not curved along another orthogonal direction. For example, the active area may be a half cylinder.

In some implementations of a flat or curved optical film, at least some segments of the optical film forming the optical film have one or more properties that differ from the optical properties of other segments. For example, the band edge, polarization pass axis angle, polarization block axis angle and/or thickness of a first set of segments may differ from the band edge, polarization pass axis angle, polarization block axis angle and/or thickness of a second set of segments.

Figure 21:
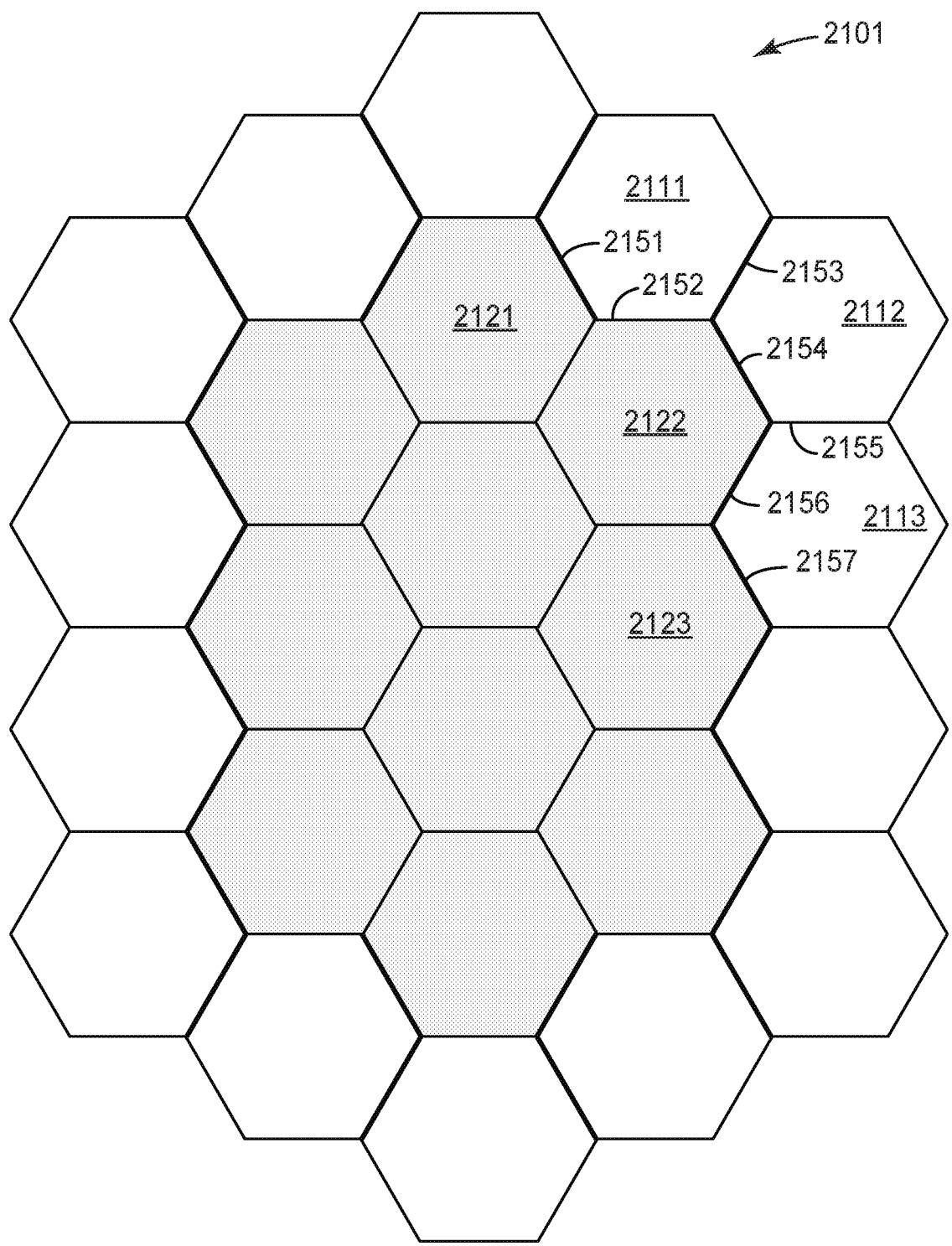
FIG. 21 shows a portion of an active area of an optical film comprising a plurality of segments that arranged with seams between the segments in accordance with some embodiments.

FIG. 21 shows a portion of an active area 2101 of an optical film comprising a plurality of segments 2111, 2112, 2113, 2121, 2122, 2123 that arranged with seams 2151, 2152, 2153, 2154, 2155, 2156, 2157 between the segments 2111, 2112, 2113, 2121, 2122, 2123. The segments 2111, 2112, 2113, 2121, 2122, 2123 can be configured and arranged such that the active area 2101 is substantially flat.

A first set of segments 2111, 2112, 2113 has one or more optical and/or mechanical properties that differ from the optical and/or mechanical properties of another set of the segments 2121, 2122, 2123. For example, the band edge, polarization pass axis angle, polarization block axis angle, thickness and/or other property of the segments 2111, 2112, 2113 may differ from the band edge, polarization pass axis angle, polarization block axis angle, thickness, and/or other property of the segments 2121, 2122, 2123.

In various embodiments, each seam has a width less than about 1 mm, less than about 0.5 mm, less than about 0.25, or even less than about 0.1 mm. The seams can be overlapping or non-overlapping as discussed in more detail with reference to FIGS. 22 and 23. The segments of the active area of an optical film may comprise one or more of polygonal segments (see e.g. optical film 1500 shown in FIG. 15A), radial segments (see e.g. optical film 1800 shown in FIG. 18A) circular segments (see e.g., optical film 1600 shown in FIG. 16A), spiral shaped segments (see e.g. optical film 2000 shown in FIG. 20A), among other possible segment shapes. The edges of the segments may be straight (see e.g. the segments of optical film 1500 shown in FIGS. 15A and 15B, the segments of optical film 1700 shown in FIGS. 17A and 18B, and the segments of optical film 1800 shown in FIGS. 18A and 18B). In some embodiments, the edges of the segments may be curved (see e.g. the segments of optical film 1600 shown in FIGS. 16A and 16B, the segments of optical film 1900 1800 shown in FIGS. 19A and 19B), and the segments of optical film 2000 shown in FIGS. 20A and 20B).

Figure 22:
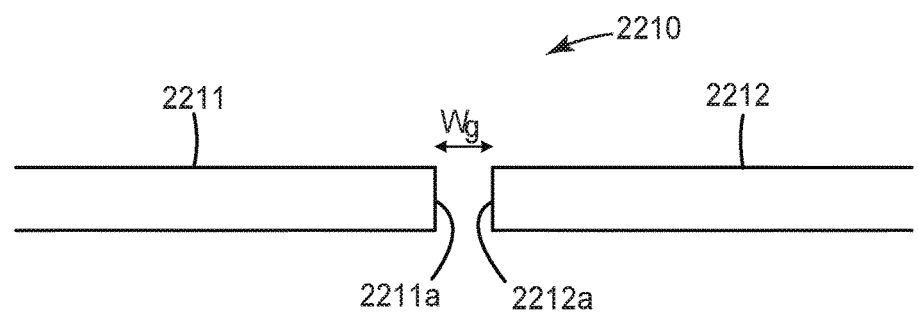
FIG. 22 is a cross sectional view of a portion of an active area of an optical film showing a seam between an edge of a first optical film segment and an edge of a second optical film segment in accordance with some embodiments.

FIG. 22 is a cross sectional view of a portion of an active area of an optical film showing a seam 2210 between an edge 2211a of a first optical film segment 2211 and an edge 2212a of a second optical film segment 2212. In this example, the edges 2211a, 2212a of the adjacent segments 2211, 2212 are non-overlapping. The edges 2211a, 2212b may contact one another or may be separated by a gap having a width, $w_g$. The width of the gap may be less than about 1 mm, for example. In some embodiments in which there is a gap between the edges 2211a, 2212a, a transparent material may be disposed within the gap. For example, the transparent material may be an adhesive such as an optically clear adhesive or an index matching adhesive. In some embodiments a dye may be disposed within the gap. For example, the dye may be an absorptive dye.

Figure 23:
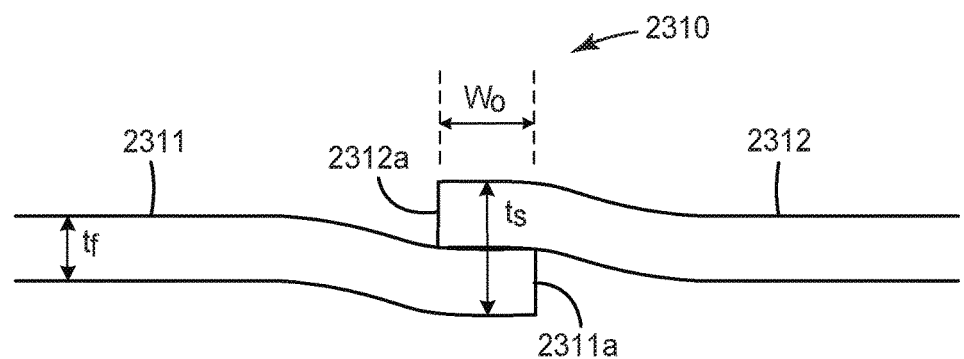
FIG. 23 is a cross sectional view of a portion of an active area of an optical film illustrating a seam comprising an edge of a first optical film segment overlapped with an edge of a second optical film segment in accordance with some embodiments.

FIG. 23 is a cross sectional view of a portion of an active area of an optical film illustrating a seam 2310 between an edge 2311a of a first optical film segment 2311 and an edge 2312a of a second optical film segment 2312. In this example, the edges 2311a, 2312a of the adjacent segments 2311, 2312 are overlapping. The width of the overlap of the segments, $w_o$, at the seam 2310 may be between about 0.01 mm and about 10 mm, for example. The thickness at the seam 2310, $t_s$, may be greater than the thickness of the optical film segments, $t_f$, in some embodiments.

Figure 24:
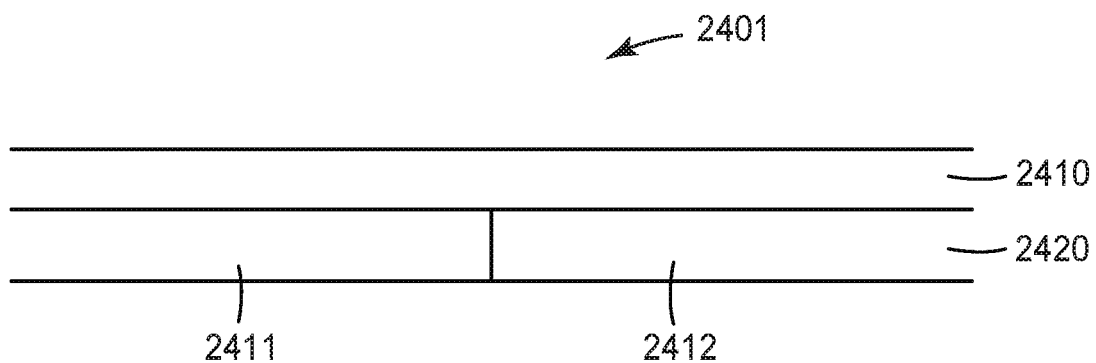
FIG. 24 shows a cross sectional view of a portion of an active area of multi-layer optical film in accordance with some embodiments.

In some embodiments, a segmented optical film may be a multi-layer structure. FIG. 24 shows a cross sectional view of a portion of an active area 2401 of multi-layer optical film. The portion of the active area 2401 shown in FIG. 24 has at least one first layer 2410 comprising optical film segments 2411, 2412 and at least one non-segmented second layer 2420. Each of the first and second layers 2410, 2420 may itself be a multi-layer film, such as a multi-layer interference film, for example. The non-segmented second layer 2420 may be a single or multi-layer film or coating. In some embodiments, the non-segmented second layer 2420 is or comprises a polymeric resin. In some embodiments, the adjacent segments 2411, 2412 are arranged to form the active area that is curved in two orthogonal directions, e.g., by placing the segments in a mold or on a form. Subsequent to the arrangement of the segments of the active area into the curved shape, the second optical layer can be disposed over the segments, e.g., by coating or molding. The second optical layer may comprise an optical modification layer. In some embodiments, the second optical layer may have anisotropic optical properties. For example, optical devices that incorporate optical films as discussed herein may comprise optical films having a second optical layer with anisotropic optical properties. These optical devices can include lenses, absorptive polarizers, birefringent phase retarders, infrared mirrors, and reflective polarizers, among other examples.

Figure 25:
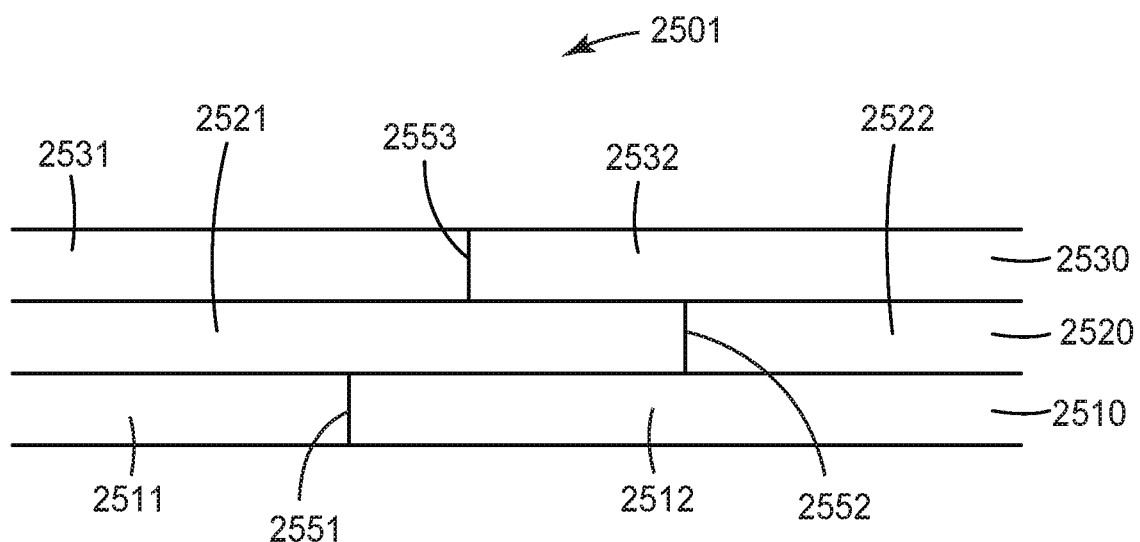
FIG. 25 shows a cross sectional view of a portion of an active area of an optical film having first, second, and third segmented layers according to some embodiments.

In some embodiments, an optical film may include multiple segmented layers. FIG. 25 shows a cross sectional view of a portion of an active area 2501 of an optical film having first, second, and third segmented layers 2510, 2520, 2530. The segments of each layer may themselves be made of a multi-layer film as previously discussed. The layers 2510, 2520, 2530 may be adhered to the one or more adjacent layers. As depicted in FIG. 25, layer 2510 comprises optical film segments 2511, 2512 with a seam 2551 between the adjacent segments 2511, 2512; layer 2520 comprises optical film segments 2521, 2522 with a seam 2552 between the adjacent segments 2521, 2522; and layer 2530 comprises optical film segments 2531, 2532 with a seam 2553 between the adjacent segments 2531, 2532. As shown in FIG. 25, in some embodiments, the seams 2551, 2552, 2552 of the layers 2510, 2520, 2530 may be offset. Offsetting the seams of segmented layers can reduce the visual effect of the seams in some implementations. For example, offsetting the seams may make them less noticeable in a VR or AR system.

Unsegmented optical films that have a relatively high total curvature or overall sag to diameter ratio may exhibit buckles in the active area of the optical film. Segmented optical films can be made with active areas in which buckling is eliminated or reduced when compared to an unsegmented optical film having the same total curvature or overall sag to diameter ratio.

Figure 26A:
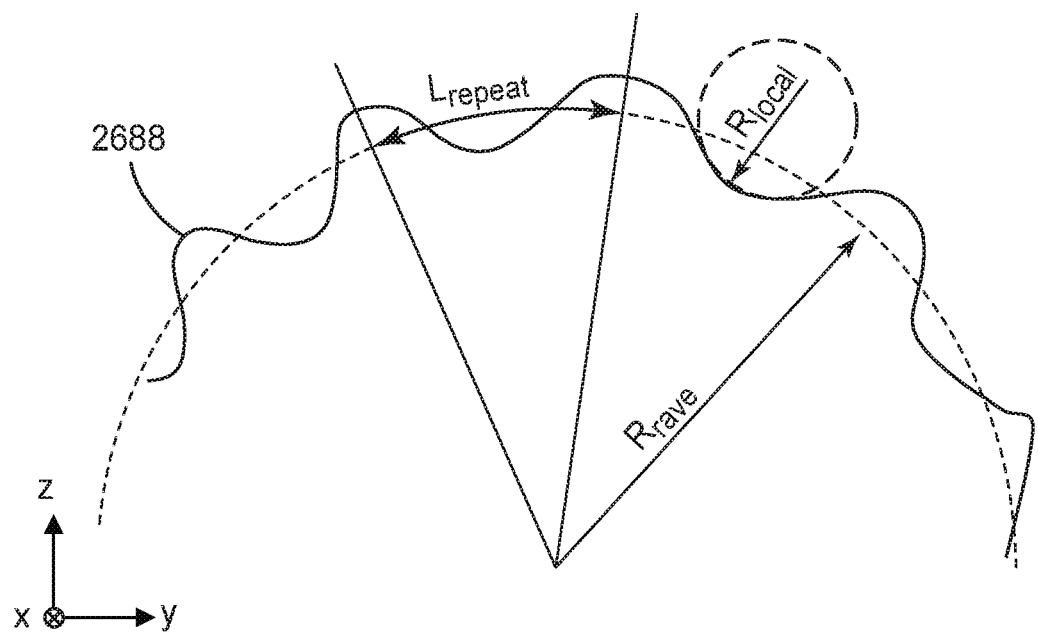
FIG. 26A is a schematic top view of a portion of the active area of an optical film exhibiting buckling.
Figure 26B:
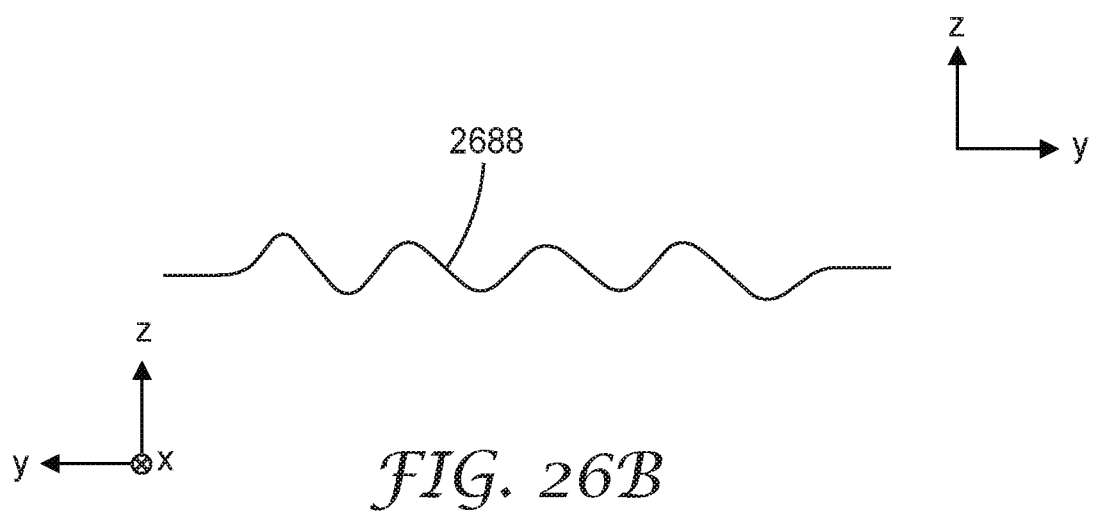
FIG. 26B is a cross-sectional view through the buckles of FIG. 26A.

FIG. 26A is a schematic top view of a portion of the active area 2601 of an optical film exhibiting buckling. Buckles 2588 are conceptually illustrated in FIG. 26A. A cross-sectional view through buckles 2688 in an optical film is schematically illustrated in FIG. 26B. The buckling exhibited in FIGS. 26A-26B is along the y-direction. Buckles are characterized by a locally oscillating curvature, $1/R_{local}$, in one direction, repeating on a length scale, $L_{repeat}$, smaller than the average radius of curvature, $R_{ave}$, of the buckled region. In the direction orthogonal to the buckling direction, the curvature may become smaller than the average radius of curvature of the surrounding film and may even become zero. Buckles 2688 oscillate about an average radius of curvature of the buckled region. If the average radius of curvature of the buckled region is subtracted from the local curvatures within the buckled region, the buckles may be perceived as a region where the differential curvature, $1/R_{local}-1/R_{ave}$, changes sign along the buckling direction. Reducing the amplitude of the buckle oscillations shown in FIG. 26B and/or reducing the number of buckles 2688 can be described as reducing the buckling in the optical film. In some embodiments, the approaches described herein reduce or eliminate buckling of the optical film. In some embodiments, there is substantially no bucking of the optical film in the active area.

The optical films disclosed herein can be used in imaging lenses of a display system. For example, the disclosed optical films may be employed in folded optical systems such as virtual reality or augmented reality head mounted displays. The optical system 2700 schematically illustrated in FIG. 27 is used as an example of a possible application for the disclosed optical films, however, it will be appreciated that many other implementations are possible and are within the scope of this disclosure.

Figure 27:
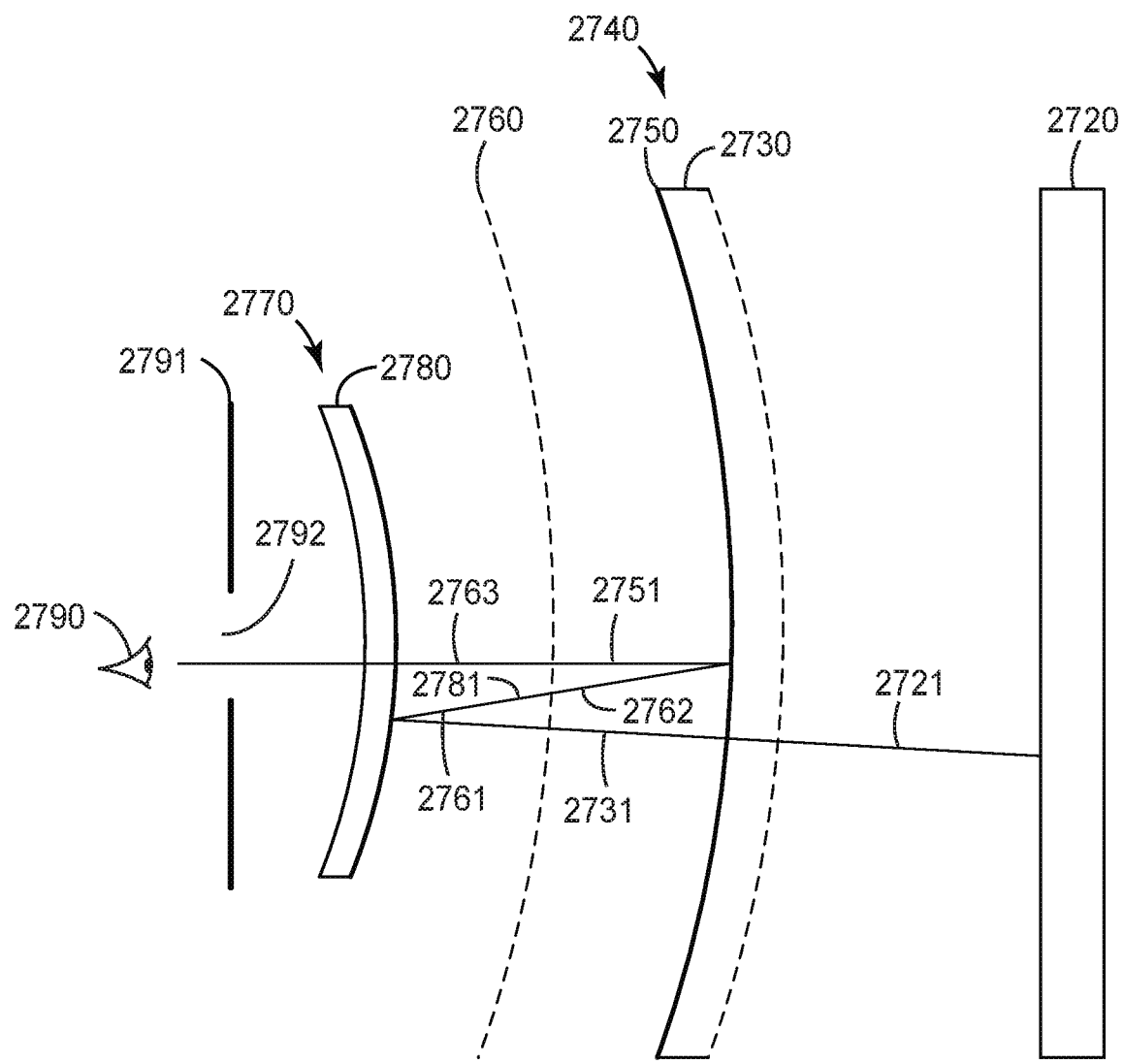
FIG. 27 illustrates a folded optical system that can include one or more optical films in accordance with embodiments disclosed herein.

FIG. 27 illustrates a folded optical system 2700 that can include one or more optical films as disclosed herein. In some embodiments, a folded VR or AR optical system uses a flat display such as a cell phone. Images from the display are collimated and focused on the human eye to provide VR or AR functionality. Such collimation and focusing could be accomplished with standard optics, but such systems would be bulky and heavy, thus not as suitable for VR or AR applications. The folded optics approach replaces solid optical elements with dome-shaped, multi-layered, polarizing films that alternatively reflect or transmit light depending on the polarization state of the light. A folded optical system as illustrated in FIG. 27 reduced the weight of the system and allows the flat display to be positioned closer to the eye when compared to a non-folded optical system.

FIG. 27 illustrates a folded optical system 2700 for a head mounted display. System 2700 includes first and second curved optical stacks 2740, 2770. In this example, at least device 2770 comprises an optical film having the optical and physical characteristics as disclosed herein. Linearly P-polarized light 2721 leaves the display 2720 (image surface) and travels through a quarter wave plate (QWP) 2730 where the light is converted to circularly polarized light 2731. The circularly polarized light 2731 passes through a 50/50 mirror 2750 and travels through another QWP 2760 where it is converted to S-polarized light 2761. The S-polarized light 2761 reflects off of a curved polarizer film 2780. The reflected S-polarized light 2781 travels back through a QWP 2760 where the light is once again converted to circularly polarized light 2762. The circularly polarized light 2762 reflects off of the 50/50 mirror 2750 where it changes handedness 2751 and travels once more through the QWP 2760 where the light is converted to P-polarized light 2763. The P-polarized light 2763 is able to pass through the APF 2780, through an exit pupil 2792 in a stop surface 2791 and into the eye 2790.

The reflective polarizing lens (RPL) 2770 illustrated in FIG. 27 includes an optical film in accordance with embodiments disclosed herein and serves two purposes in the device 2700. First, the RPL 2770 reflects incident S-polarized light 2761 coming from the QWP 2760 back to the QWP 2760. That reflected light passes through the QWP 2760 and reflects from a 50/50 mirror 2750 and back through the QWP 276 toward the RPL 2770 a second time. In the second pass, the light 2763 has been properly focused on the user's eye 2790 and its polarization state is converted to a P-polarized state. Additionally, the RPL 2770 allows the P-polarized light 2763 to transmit through the RPL 2770 to the human eye 2790. Performance of the optical system 2700 depends on the RPL 2770 having both high reflection efficiency for the S-polarized light and high transmission efficiency for the P-polarized light consistently across the active area of the RPL 2770. The curved shape of the RPL 2770 allows the image to extend to a higher field of view (FOV) for the end user while reducing the size of the display. In some embodiments, the distance between the reflective polarizer 2770 and the image surface 2720 is substantial, for example, greater than about 10 mm or about 25 mm. In some implementations, the distance between the reflective polarizer 2770 and the image surface 2720 can be about 1 mm or about 5 mm to about 50 mm.

Additional information regarding optical systems which may incorporate the optical films as described herein which used to form lenses (e.g., reflective polarizing lenses) is provided in commonly owned U.S. Pat. No. 9,581,827 which is incorporated herein by reference.

Items discussed herein include the following items:

Item 1. A device, comprising:
  at least one optical film with an active area having a surface that is curved in two orthogonal directions, wherein:
    the surface of the active area has a total curvature, C, greater than 0.1;
    there is at least one point, $p_0$, on the surface of the active area such that a surface normal direction at $p_0$ is parallel to a normal vector of a reference plane of the active area;
    each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and
    a difference between maximum and minimum linear polarization block axis orientation angles for all points, p, is less than $2 \ln(1+12/\pi)*C$ degrees.

Item 2. The device of item 1, wherein C is greater than 0.2.
Item 3. The device of item 1, wherein C is greater than 0.3.
Item 4. The device of item 1, wherein C is greater than 0.4.

Item 5. The device of item 1, wherein C is greater than 0.5.
Item 6. The device of item 1, wherein C is greater than 0.6.
Item 7. A device, comprising:
 at least one optical film with an active area having a surface that is curved in two orthogonal directions, wherein:
  the surface of the active area has a total curvature, C, greater than 0.1;
  there is at least one point, $p_0$, on the surface of the active area such that a surface normal direction at $p_0$ is parallel to a normal vector of a reference plane of the active area;
  each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and
  a difference between maximum and minimum linear polarization pass axis orientation angles for all points, p, is less than 12.2*C degrees.
Item 8. The device of item 7, wherein C is greater than 0.2.
Item 9. The device of item 7, wherein C is greater than 0.3.
Item 10. The device of item 7, wherein C is greater than 0.4.
Item 11. The device of item 7, wherein C is greater than 0.5.
Item 12. The device of item 7, wherein C is greater than 0.6.
Item 13. A device, comprising:
 at least one optical film having an active area that is curved in two orthogonal directions such that the active area has a total curvature, C, greater than 0.1, the active area having a minimum thickness, $t_{min}$, a maximum thickness, $t_{max}$, and an average thickness, $t_{ave}$, wherein a variation in thickness, a $(t_{max}-t_{min})/t_{ave}$ of the optical film in the active area is less than $\ln[1+(12/\pi)C]/20$.
Item 14. The device of item 13, wherein C is greater than 0.2.
Item 15. The device of item 13, wherein C is greater than 0.3.
Item 16. The device of item 13, wherein C is greater than 0.4.
Item 17. The device of item 13, wherein C is greater than 0.5.
Item 18. The device of item 13, wherein C is greater than 0.6.
Item 19. A device, comprising:
 at least one optical film having an active area that is curved in two orthogonal directions such that the active area has a total curvature, C, greater than 0.1, the active area having a minimum pass band edge, $\lambda_{Emin}$, a maximum pass band edge, $\lambda_{Emax}$, an average pass band edge, $\lambda_{ave}$, wherein a variation in upper pass band edge, $(\lambda_{Emax}-\lambda_{Emin})/\lambda_{Eave}$, in the active area is less than $\ln[1+(12/\pi)C]/20$.
Item 20. The device of item 19, wherein C is greater than 0.2.
Item 21. The device of item 19, wherein C is greater than 0.3.
Item 22. The device of item 19, wherein C is greater than 0.4.
Item 23. The device of item 19, wherein C is greater than 0.5.
Item 24. The device of item 19, wherein C is greater than 0.6.
Item 25. The device of item 19, wherein the maximum and minimum pass band edges are maximum and minimum upper pass band edges.
Item 26. The device of item 19, wherein the maximum and minimum pass band edges are maximum and minimum lower pass band edges.
Item 27. A device, comprising:
 at least one optical film having an active area that is curved along a first direction and along an orthogonal second direction, wherein:
  a portion of the active area has a sag to diameter ratio, S/D, greater than 0.025;
  there is at least one point, $p_0$, on the surface of the active area such that a surface normal direction at $p_0$ is parallel to a normal vector of a reference plane of the active area;
  each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and
  a maximum variation of linear polarization block axis angles for all points of the portion of the active area, $\beta_{max}-\beta_{min}$, is less than 22(S/D) degrees.
Item 28. The device of item 27, wherein C is greater than 0.2.
Item 29. The device of item 27, wherein C is greater than 0.3.
Item 30. The device of item 27, wherein C is greater than 0.4.
Item 31 The device of item 27, wherein C is greater than 0.5.
Item 32. The device of item 27, wherein C is greater than 0.6.
Item 33. The device of any of items 27 through 32, wherein the portion of the optical film has a substantially spherical or a substantially parabolic shape.
Item 34. A device, comprising:
 at least one optical film having an active area that is curved along a first direction and along an orthogonal second direction, wherein:
  a portion of the active area has a sag to diameter ratio, S/D, greater than 0.025;
  there is at least one point, $p_0$, on the surface of the active area such that a surface normal direction at $p_0$ is parallel to a normal vector of a reference plane of the active area;
  each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and
  a maximum variation of linear polarization pass axis angles for all points of the portion of the active area, $\alpha_{max}-\alpha_{min}$, is less than $550(S/D)^2+3.5(S/D)$ degrees.
Item 35. The device of item 34, wherein S/D is greater than 0.05.
Item 36. The device of item 34, wherein S/D is greater than 0.1.
Item 37. The device of item 34, wherein S/D is greater than 0.2.
Item 38. The device of item 34, wherein S/D is greater than 0.3.
Item 39. The device of item 34, wherein S/D is greater than 0.4.

Item 40. The device of any of items 34 through 39, wherein the portion of the active area has a substantially spherical or paraboloidal shape.

Item 41. A device, comprising:
at least one optical film having an active area that is curved along a first direction and along an orthogonal second direction, a portion of the active area having a sag to diameter ratio, S/D, greater than 0.025, the optical film in the portion of the active area having a minimum thickness, $t_{min}$, a maximum thickness, $t_{max}$, and an average thickness, $t_{ave}$, wherein a variation in thickness, $(t_{max}-t_{min})/t_{ave}$ in the portion of the active area is less than $\frac{1}{2}*(S/D)$, and wherein the portion of the active area maps onto a largest circle inscribed within a boundary of a projection of the active area on a reference plane.

Item 42. The device of item 41, wherein S/D is greater than 0.05.

Item 43. The device of item 41, wherein S/D is greater than 0.1.

Item 44. The device of item 41, wherein S/D is greater than 0.2.

Item 45. The device of item 41, wherein S/D is greater than 0.3.

Item 46. The device of item 41, wherein S/D is greater than 0.4.

Item 47. The device of any of items 41 through 46, wherein the portion of the active area has a substantially spherical or a substantially paraboloidal shape.

Item 48. A device, comprising:
at least one optical film having an active area that is curved along a first direction and along an orthogonal second direction, a portion of the active area having a sag to diameter ratio, S/D, greater than 0.025, the optical film in the portion of the active area having a minimum pass band edge, $\lambda_{Emin}$, a maximum pass band edge, $\lambda_{Emax}$, an average pass band edge, $\lambda_{ave}$, wherein a variation in pass band edge, $(\lambda_{Emax}-\lambda_{Emin})/\lambda_{Eave}$, in the portion of the active area is less than $\frac{1}{2}*(S/D)$, and wherein the portion of the active area maps onto a largest circle inscribed within a boundary of a projection of the active area on a reference plane.

Item 49. The device of item 48, wherein S/D is greater than 0.05.

Item 50. The device of item 48, wherein S/D is greater than 0.1.

Item 51. The device of item 48, wherein S/D is greater than 0.2.

Item 52. The device of item 48, wherein S/D is greater than 0.3.

Item 53. The device of item 48, wherein S/D is greater than 0.4.

Item 54. The device of item 48, wherein the maximum and minimum pass band edges are maximum and minimum upper pass band edges.

Item 55. The device of item 48, wherein the maximum and minimum pass band edges are maximum and minimum lower pass band edges.

Item 56. A reflective polarizing imaging lens comprising:
at least one optical film having an active area that is curved in two orthogonal directions, edges of the optical film arranged to form one or more seams between segments of the optical film in the active area of the reflective polarizing imaging lens.

Item 57. The lens of claim 56, wherein:
the surface of the active area has a total curvature, C, greater than 0.1;
there is at least one point, $p_0$, on the surface of the active area such that a surface normal direction at $p_0$ is parallel to a normal vector of a reference plane of the active area;
each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and
a difference between maximum and minimum linear polarization block axis orientation angles for all points, p, is less than $2\ln(1+12/\pi)*C$ degrees.

Item 58. The lens of any of items 56 through 57, wherein:
the surface of the active area has a total curvature, C, greater than 0.1;
there is at least one point, $p_0$, on the surface of the active area such that a surface normal direction at $p_0$ is parallel to a normal vector of a reference plane of the active area;
each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and
a difference between maximum and minimum linear polarization pass axis orientation angles for all points, p, is less than $12.2*C$ degrees.

Item 59. The lens of any of items 56 through 58, wherein the active area has a total curvature, C, greater than 0.1, the optical film in the active area having a minimum thickness, $L_{min}$, a maximum thickness, $t_{max}$, and an average thickness, $t_{ave}$, wherein a variation in thickness, $(t_{max}-t_{min})/t_{ave}$ of the optical film in the active area is less than $\ln[1+(12/\pi)C]/20$.

Item 60. The lens of any of items 56 through 59, wherein the active area has a total curvature, C, greater than 0.1, the active area having a minimum pass band edge, $\lambda_{Emin}$, a maximum pass band edge, $\lambda_{Emax}$, an average pass band edge, $\lambda_{ave}$, wherein a variation in upper pass band edge, $(\lambda_{Emax}-\lambda_{Emin})/\lambda_{Eave}$, in the active area is less than $\ln[1+(12/\pi)C]/20$.

Item 61. The lens of item 60, wherein the maximum and minimum pass band edges are maximum and minimum upper pass band edges.

Item 62. The lens of item 60, wherein the maximum and minimum pass band edges are maximum and minimum lower pass band edges.

Item 63. The lens of any of items 56 through 62, wherein:
a portion of the active area has a sag to diameter ratio, S/D, greater than 0.025;
there is at least one point, $p_0$, on the surface of the active area such that a surface normal direction at $p_0$ is parallel to a normal vector of a reference plane of the active area;
each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and
a maximum variation of linear polarization block axis angles for all points of the portion of the active area, $\beta_{max}-\beta_{min}$, is less than $22(S/D)$ degrees.

Item 64. The lens of item 63, wherein the portion of the optical film has a substantially spherical or a substantially paraboloid shape.

Item 65. The lens of any of items 56 through 64, wherein:
a portion of the active area has a sag to diameter ratio, S/D, greater than 0.025;
there is at least one point, $p_0$, on the surface of the active area such that a surface normal direction at $p_0$ is parallel to a normal vector of a reference plane of the active area;
each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and
a maximum variation of linear polarization pass axis angles for all points of the portion of the active area, $\alpha_{max} - \alpha_{min}$, is less than $550(S/D)^2 + 3.5(S/D)$ degrees.

Item 66. The lens of item 65, wherein the portion of the active area has a substantially spherical or a substantially parabolic shape.

Item 67. The lens of any of items 56 through 66, wherein a portion of the active area has a sag to diameter ratio, S/D, greater than 0.025, the optical film in the portion of the active area having a minimum thickness, $t_{min}$, a maximum thickness, $t_{max}$, and an average thickness, $t_{ave}$, wherein a variation in thickness, $(t_{max} - t_{min})/t_{ave}$ in the portion of the active area is less than $\frac{1}{2}*(S/D)$, and wherein the portion of the active area maps onto a largest circle inscribed within a boundary of a projection of the active area on a reference plane.

Item 68. The lens of item 67, wherein the portion of the active area has a substantially spherical or a substantially parabolic shape.

Item 69. The lens of any of items 56 through 68, wherein a portion of the active area has a sag to diameter ratio, S/D, greater than 0.025, the optical film in the portion of the active area having a minimum pass band edge, $\lambda_{Emin}$, a maximum pass band edge, $\lambda_{Emax}$, an average pass band edge, $\lambda_{ave}$, wherein a variation in pass band edge, $(\lambda_{Emax} - \lambda_{Emin})/\lambda_{Eave}$, in the portion of the active area is less than $\frac{1}{2}*(S/D)$, and wherein the portion of the active area maps onto a largest circle inscribed within a boundary of a projection of the active area on a reference plane.

Item 70. The lens of item 69, wherein the maximum and minimum pass band edges are maximum and minimum upper pass band edges.

Item 71. The lens of item 69, wherein the maximum and minimum pass band edges are maximum and minimum lower pass band edges.

Item 72. The lens of any of items 56 through 71, wherein a maximum variation of linear polarization block axis angles for all points of the active area is less than 2.5 degrees.

Item 73. The lens of any of items 56 through 72, wherein a maximum variation of linear polarization block axis angles for all points of the active area is less than 2 degrees.

Item 74. The lens of any of items 56 through 72, wherein a maximum variation of linear polarization block axis angles for all points of the active area is less than 1.5 degrees, Item 75. The lens of any of items 56 through 72, wherein a maximum variation of linear polarization block axis angles for all points of the active area is less than 1 degree.

Item 76. The lens of any of items 56 through 75, wherein the optical film comprises a multi-layer optical film (MOF) having alternating layers of differing indices of refraction.

Item 77. The lens of any of items 56 through 76, wherein the optical film comprises a wire-grid film.

Item 78. The lens of any of items 56 through 77, wherein the optical film is spherical.

Item 79. The lens of any of items 56 through 78, wherein the optical film is aspherical.

Item 80. The lens of any of items 56 through 79, wherein there is substantially no buckling of the optical film in the active area.

Item 81. The lens of any of items 56 through 80, wherein the lens is optically rotationally symmetric.

Item 82. The lens of any of items 56 through 80, wherein the lens is optically rotationally asymmetric.

Item 83. The lens of any of items 56 through 82, wherein a sag to diameter ratio of each segment is less than 90% of a sag to diameter ratio of the active area.

Item 84. The lens of any of items 56 through 82, wherein a sag to diameter ratio of each segment is less than 85% of a sag to diameter ration of the active area.

Item 85. The lens of any of items 56 through 82, wherein a sag to diameter ratio of each segment is less than 80% of a sag to diameter ratio of the active area.

Item 86. A reflective polarizing imaging lens comprising an optical film comprising a plurality of polymeric layers, edges of the optical film arranged to form one or more seams between segments of the optical film in an active area of the reflective polarizing imaging lens.

Item 87. The lens of item 86, wherein the optical film is flat.

Item 88. The lens of item 86, wherein the optical film is curved.

Item 89. The lens of item 86, wherein the optical film is curved in two orthogonal directions.

Item 90. The lens of any of items 86 through 89, wherein at least one optical characteristic of a first segment differs from the optical characteristic of a second segment.

Item 91. The lens of any of items 86 through 90, wherein the optical film is a single continuous piece.

Item 92. The lens of any of items 86 through 90, wherein at least some of the segments are discrete pieces of the optical film that are joined at the edges by the seams.

Item 93. The lens of any of items 86 through 92, wherein each seam has a width less than about 1 mm.

Item 94. The lens of any of items 86 through 92, wherein each seam has a width less than about 0.5 mm.

Item 95. The lens of any of items 86 through 92, wherein each seam has a width less than about 0.25 mm.

Item 96. The lens of any of items 86 through 92, wherein each seam has a width less than about 0.1 mm.

Item 97. The lens of any of items 86 through 96, wherein the edges of adjacent segments forming the seam are non-overlapping.

Item 98. The lens of any of items 86 through 96, wherein the edges of the adjacent segments forming the seam overlap.

Item 99. The lens of any of items 86 through 98, wherein the segments comprise one or more of polygonal, radial, circular, and spiral shaped segments.

Item 100. The lens of any of items 86 through 99, wherein the segments have straight edges.

Item 101. The lens of any of items 86 through 99, wherein the segments have curved edges.

Item 102. The lens of any of items 86 through 101, further comprising an optical layer disposed over the optical film.

Item 103. The lens of item 102, wherein the optical layer is a polymeric resin.

Item 104. The lens of any of items 86 through 103, wherein the optical film comprises:
a first sub-film including multiple first segments, each first segment having at least one edge, edges of adjacent first segments forming first seams between the adjacent first segments and located in an active area of the lens; and a second sub-film adhered to the first sub-film, the second sub-film including multiple second segments, each second segment having at least one edge, edges of adjacent second segments forming second seams between the adjacent second segments and located in an active area of the lens, wherein each first seam is offset with respect to each second seam.

Item 105. The lens of any of items 86 through 104, wherein a number of the segments is greater than 2 and less than 20.

Item 106. The lens of any of items 86 through 105, wherein a substantial majority of the seams are located in a peripheral region of the active area of the lens.

Item 107. The lens of any of items 86 through 106, wherein none of the seams are located in a central region of the active area of the lens.

Item 108. The lens of any of items 86 through 107, wherein:
the seams include a gap between the edges forming the seam; and
the gap is filled with a dye.

Item 109. The lens of any of items 86 through 107, wherein:
the seams include a gap between the edges forming the seam; and
the gap is filled with a transparent material.

Item 110. The lens of item 109, wherein the transparent material is an optically clear adhesive.

Item 111. The lens of item 109, wherein the transparent material is an index matching material.

Item 112. A folded optical system comprising:
an image surface configured to emit an image;
a stop surface having an exit pupil; and
a reflective polarizer as in claim 1 disposed between the image surface and the stop surface.

Item 113. The system of item 112, wherein a distance between the reflective polarizer and the image surface is greater than about 24 mm.

Item 114. A folded optical system comprising:
an image surface configured to emit an image;
a stop surface having an exit pupil; and
a reflective polarizer as in claim 7 disposed between the image surface and the stop surface.

Item 115. A folded optical system comprising:
an image surface configured to emit an image;
a stop surface having an exit pupil; and
a reflective polarizer as in claim 13 disposed between the image surface and the stop surface.

Item 116. A folded optical system comprising:
an image surface configured to emit an image;
a stop surface having an exit pupil; and
a reflective polarizer as in claim 19 disposed between the image surface and the stop surface.

Item 117. A folded optical system comprising:
an image surface configured to emit an image;
a stop surface having an exit pupil; and
a reflective polarizer as in claim 27 disposed between the image surface and the stop surface.

Item 118. A folded optical system comprising:
an image surface configured to emit an image;
a stop surface having an exit pupil; and
a reflective polarizer as in claim 34 disposed between the image surface and the stop surface.

Item 119. A folded optical system comprising:
an image surface configured to emit an image;
a stop surface having an exit pupil; and
a reflective polarizer as in claim 41 disposed between the image surface and the stop surface.

Item 120. A folded optical system comprising:
an image surface configured to emit an image;
a stop surface having an exit pupil; and
a reflective polarizer as in claim 56 disposed between the image surface and the stop surface.

Item 121. A folded optical system comprising:
an image surface configured to emit an image;
a stop surface having an exit pupil; and
a reflective polarizer as in claim 56 disposed between the image surface and the stop surface.

Item 122. A folded optical system comprising:
an image surface configured to emit an image;
a stop surface having an exit pupil; and
a reflective polarizer as in claim 86 disposed between the image surface and the stop surface.

Item 123. A method of forming a reflective polarizing imaging lens, comprising:
forming segments of a reflective polarizer film; and
arranging the segments such that edges of the segments form seams between adjacent segments of the reflective polarizer film.

Item 124. The method of item 123, wherein forming the segments comprises cutting a single continuous reflective polarizer film into the segments.

Item 125. The method of any of items 123 through 124, wherein arranging the segments comprising forming a segmented film that is curved along at least two orthogonal axes.

Item 126. The method of any of items 123 through 125, wherein:
arranging the segments comprises arranging the segments onto a form; and
after arranging segments onto the form, molding an optical layer over the segments.

Item 127. The method of any of items 123 through 126, wherein the reflective polarizer film comprises a plurality of polymeric layers.

Item 128. The method of any of items 123 through 126, wherein the reflective polarizer film comprises a wire grid film.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A device, comprising:
at least one optical film with an active area having a surface that is curved in two orthogonal directions, wherein:

the surface of the active area has a total curvature, C, greater than 0.1;

there is at least one point, $p_0$, on the surface of the active area such that a surface normal direction at $p_0$ is parallel to a normal vector of a reference plane of the active area;

each point, p, on the surface of the active area has a linear polarization block axis orientation angle between a measured block axis tangent direction at p and a local reference tangent direction at p, the local reference tangent direction being coplanar with the normal vector of the reference plane and the measured block axis tangent direction at $p_0$; and a difference between maximum and minimum linear polarization block axis orientation angles for all points, p, is less than $2\ln(1+12/\pi)*C$ degrees.

2. The device of claim 1, wherein C is greater than 0.2.
3. The device of claim 1, wherein C is greater than 0.3.
4. The device of claim 1, wherein C is greater than 0.4.
5. The device of claim 1, wherein C is greater than 0.5.
6. The device of claim 1, wherein C is greater than 0.6.
7. A device, comprising:

at least one optical film with an active area having a surface that is curved in two orthogonal directions, wherein:

the surface of the active area has a total curvature, C, greater than 0.1;

there is at least one point, $p_0$, on the surface of the active area such that a surface normal direction at $p_0$ is parallel to a normal vector of a reference plane of the active area;

each point, p, on the surface of the active area has a linear polarization pass axis orientation angle between a measured pass axis tangent direction at p and a local reference tangent direction at p, the local reference tangent direction being coplanar with the normal vector of the reference plane and the measured pass axis tangent direction at $p_0$; and a difference between maximum and minimum linear polarization pass axis orientation angles for all points, p, is less than $12.2*C$ degrees.

8. The device of claim 7, wherein C is greater than 0.2.
9. The device of claim 7, wherein C is greater than 0.3.
10. The device of claim 7, wherein C is greater than 0.4.
11. The device of claim 7, wherein C is greater than 0.5.
12. The device of claim 7, wherein C is greater than 0.6.
13. A device, comprising:

at least one optical film and having an active area that is curved in two orthogonal directions such that the active area has a total curvature, C, greater than 0.1, the active area having a minimum thickness, $t_{min}$, a maximum thickness, $t_{max}$, and an average thickness, $t_{ave}$, wherein a variation in thickness, $(t_{max}-t_{min})/t_{ave}$ of the optical film in the active area is less than $\ln[1+(12/\pi)C]/20$.

14. The device of claim 13, wherein C is greater than 0.2.
15. The device of claim 13, wherein C is greater than 0.3.
16. The device of claim 13, wherein C is greater than 0.4.
17. The device of claim 13, wherein C is greater than 0.5.
18. The device of claim 13, wherein C is greater than 0.6.

* * * * *